United States Patent
Small

(10) Patent No.: US 6,239,941 B1
(45) Date of Patent: May 29, 2001

(54) CARTRIDGE LIBRARY AND METHOD OF OPERATION THEREOF

(75) Inventor: Steve Small, Golden, CO (US)

(73) Assignee: Exabyte Corporation, Boulder, CO (US)

( * ) Notice: Subject to any disclaimer, the term of this patent is extended or adjusted under 35 U.S.C. 154(b) by 0 days.

(21) Appl. No.: 09/121,819

(22) Filed: Jul. 24, 1998

Related U.S. Application Data

(63) Continuation-in-part of application No. 08/971,043, filed on Nov. 14, 1997, now Pat. No. 6,008,964.

(51) Int. Cl.[7] ............ G11B 17/22; G11B 15/68; G11B 33/10
(52) U.S. Cl. ............... 360/92; 312/9.51; 369/36
(58) Field of Search ............... 360/92; 369/36, 369/38, 178, 191; 312/9.1, 9.9, 9.47, 9.48, 9.51, 9.64; 211/40, 41.12

(56) References Cited

U.S. PATENT DOCUMENTS

| | | | | |
|---|---|---|---|---|
| 3,757,944 | * | 9/1973 | Goodman | 209/583 |
| 4,807,208 | * | 2/1989 | Geiger | 369/39 |
| 4,934,891 | * | 6/1990 | Hawkswell | 414/223 |
| 4,937,690 | * | 6/1990 | Yamashita et al. | 360/92 |
| 5,654,838 | * | 8/1997 | Motoyama et al. | 360/71 |
| 5,790,338 | * | 8/1998 | Kanai et al. | 360/71 |

FOREIGN PATENT DOCUMENTS

| 6-76453 | * | 3/1994 | (JP) . |
|---|---|---|---|
| 10-312619 | * | 11/1998 | (JP) . |

* cited by examiner

Primary Examiner—William Klimowicz
(74) Attorney, Agent, or Firm—Nixon & Vanderhye, P.C.

(57) ABSTRACT

An automated cartridge library (30) comprises a magazine mounting assembly (60) which holds at least one magazine (70) to a library frame (32), the magazine accommodating at least one cartridge (90) of information storage media. A cartridge transport system (40) transports cartridges between the magazine and a drive section (38). The magazine mounting assembly (60) comprises a magazine mounting surface (100) having a reflection region which is of contrasting reflectivity with another region of the magazine mounting assembly. A magazine guide flange (112) extends from the magazine mounting surface and has a label-bearing facet (123) formed thereon for each cell of the magazine, each facet being aligned with a corresponding cell. The magazine mounting assembly (60) further has two side walls (103) extending from a rear of the magazine mounting surface, planes of the two side walls being angularly inclined toward one another whereby a rear section of the magazine mounting assembly forms a wedge.

25 Claims, 52 Drawing Sheets

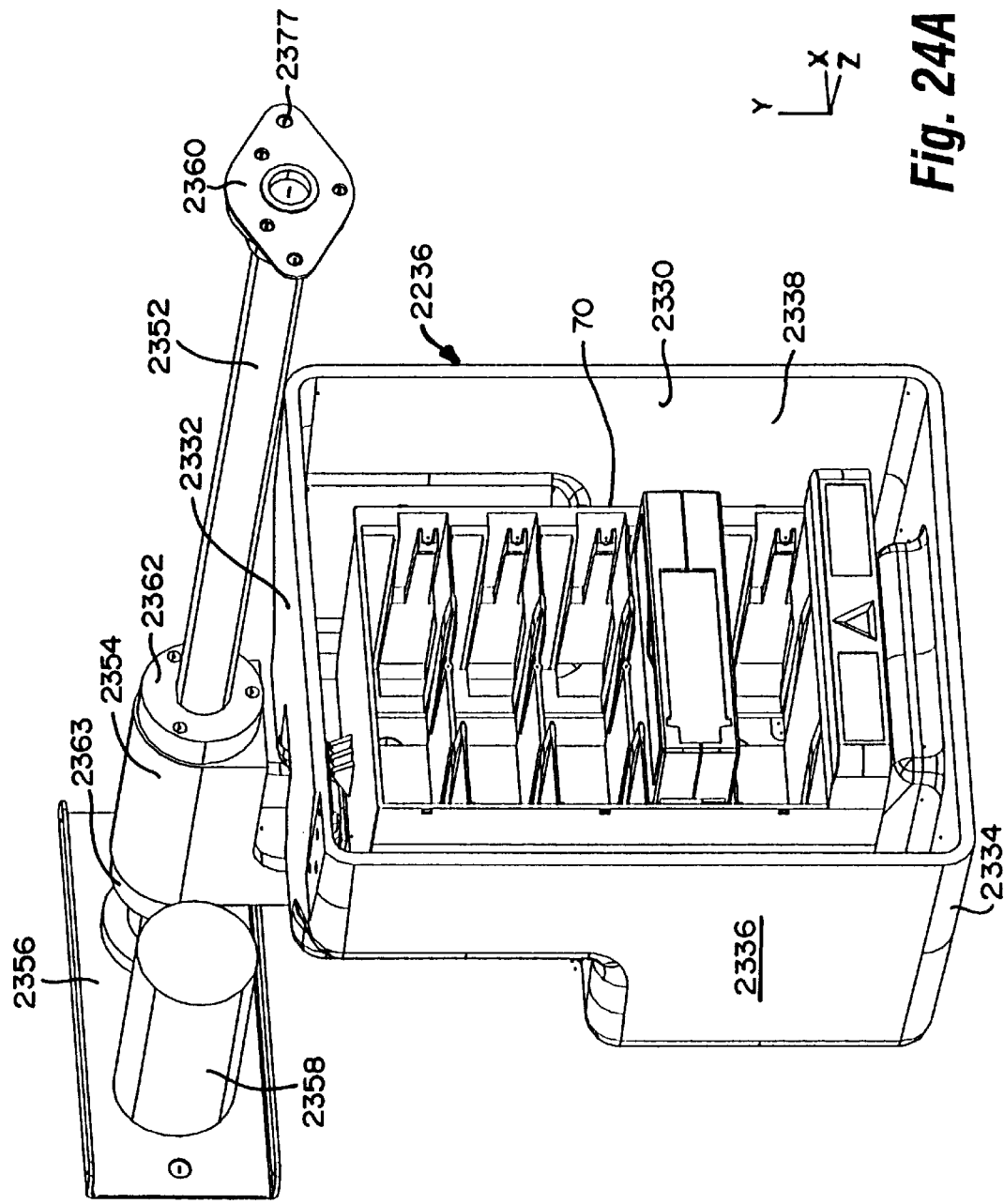

Fig. 25
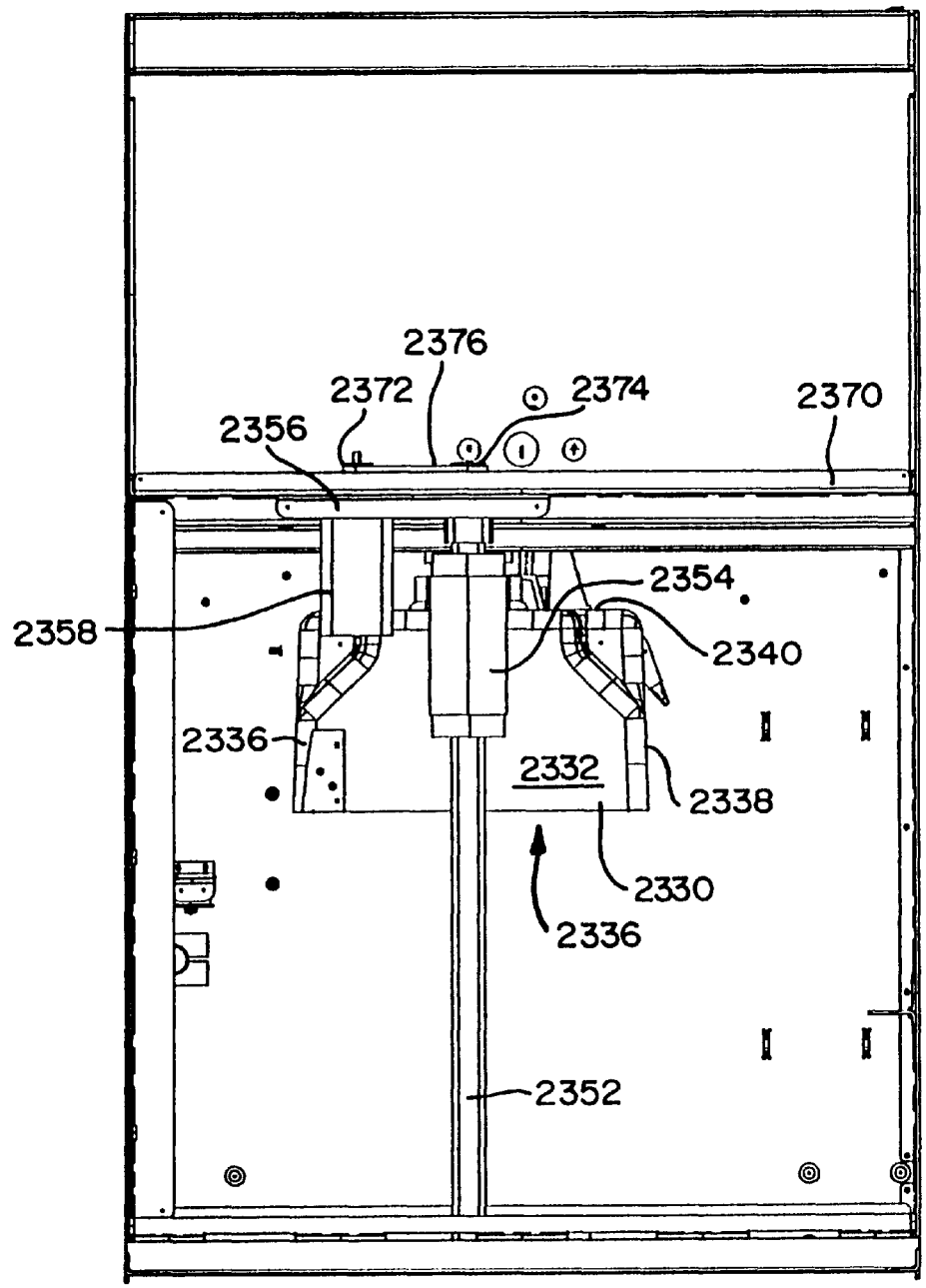
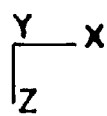

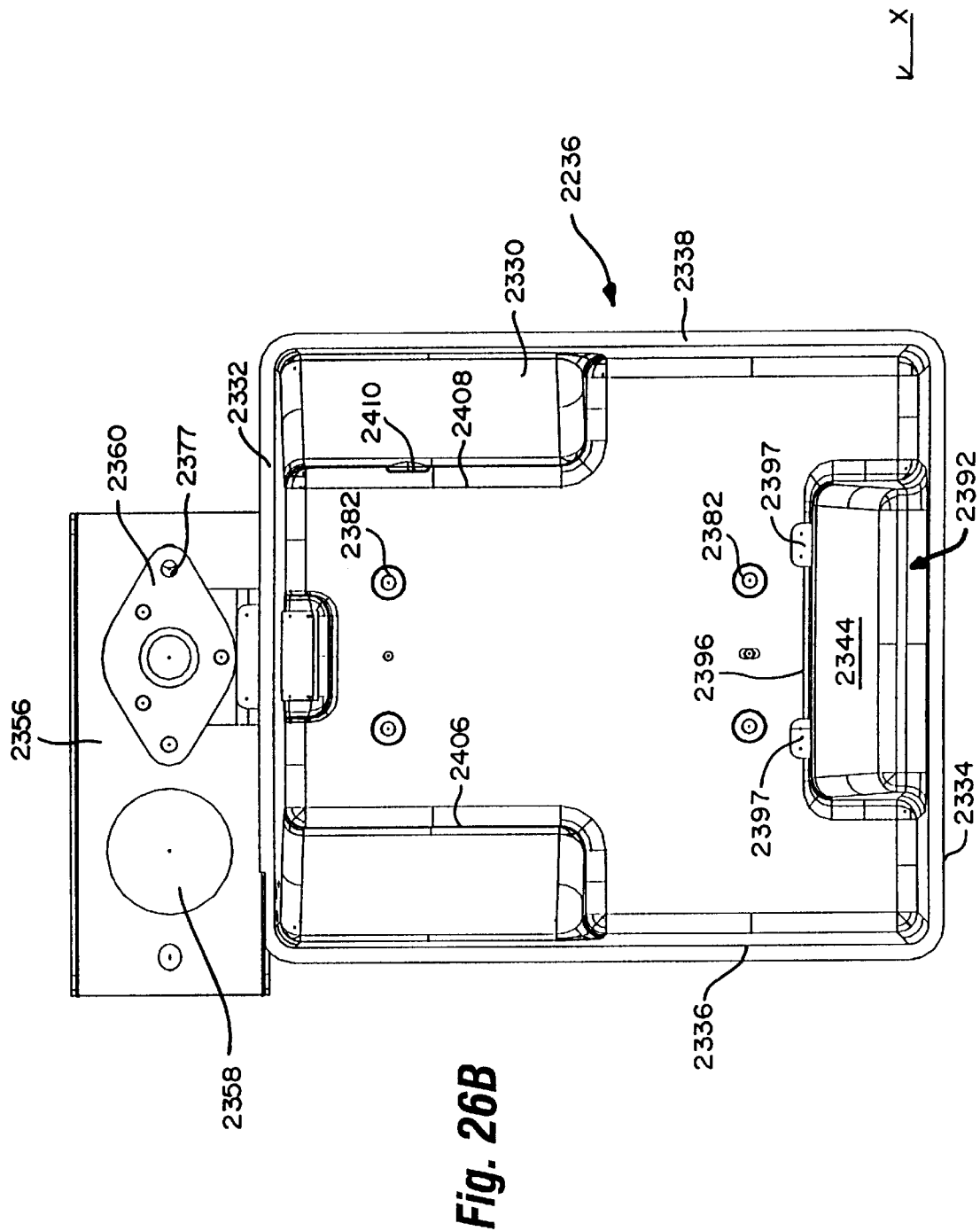

CARTRIDGE LIBRARY AND METHOD OF OPERATION THEREOF

This application is a continuation-in-part of U.S. patent application Ser. No. 08/971,043 filed Nov. 14, 1997 and entitled "CARTRIDGE LIBRARY AND METHOD OF OPERATION THEREOF", now U.S. Pat. No. 6,008,464, which is incorporated herein by reference.

BACKGROUND

1. Field of the Invention

The present invention pertains to the storage of information, and particularly to automated cartridge handling systems such as cartridge libraries which store cartridges or cassettes of magnetic tape.

2. Related Art and other Considerations

The economic and compact storage of information is increasingly important in the computer industry, particularly so as the computer unleashes new potentials in numerous fields such as audio visual and/or multimedia.

In the early days of computers, information requiring storage could be transmitted from a computer to a tape drive, whereat the information was magnetically recorded on or read from a large reel of tape. Upon completion of an operation of recording on the tape, for example, the reel would be removed manually from the tape drive and mounted in a rack. Another reel from the rack could then be manually mounted, if necessary, in the drive for either an input (tape reading) or output (recording to tape) operation.

Eventually it became popular to enclose magnetic tape in a cartridge, the cartridge being considerably smaller than the traditional tape reels. While many persons are familiar with tape cartridges of a type which can be loaded into a "tape deck" for reproduction of audio information (e.g., music), it is not as commonly realized that similar cartridges, although of differing sizes, can be used to store such information as computer data. For years now magnetic tape cartridges have proven to be an efficient and effective medium for data storage, including but not limited to computer back-up.

Large computer systems have need to access numerous cartridges. To this end, automated cartridge handling systems or libraries for cartridges have been proposed for making the cartridges automatically available to the computer. Many of these automated libraries resemble juke boxes. Typically, prior art automated cartridge libraries have an array of storage positions for cartridges, one or more tape drives, and some type of automated changer or cartridge engagement/transport mechanism for picking or gripping a cartridge and moving the cartridge between a storage position and the tape drive.

The following United States patents, all commonly assigned herewith and incorporated herein by reference, disclose various configurations of automated cartridge libraries, as well as subcomponents thereof (including cartridge engagement/transport mechanisms and storage racks or magazines for housing cartridges):

U.S. Pat. No. 4,984,106 to Herger et al., entitled "CARTRIDGE LIBRARY SYSTEM AND METHOD OF OPERATION THEREOF";

U.S. Pat. No. 4,972,277 to Sills et al., entitled "CARTRIDGE TRANSPORT ASSEMBLY AND METHOD OF OPERATION THEREOF";

U.S. Pat. No. 5,059,772 to Younglove, entitled "READING METHOD AND APPARATUS FOR CARTRIDGE LIBRARY";

U.S. Pat. No. 5,103,986 to Marlowe, entitled "CARTRIDGE RACK"; and,

U.S. Pat. Nos. 5,237,467 and 5,416,653 to Marlowe, entitled "CARTRIDGE HANDLING APPARATUS AND METHOD WITH MOTION-RESPONSIVE EJECTION".

U.S. Pat. No. 5,498,116 to Woodruff et al., entitled "ENTRY-EXIT PORT FOR CARTRIDGE LIBRARY".

U.S. Pat. No. 5,487,579 to Woodruff et al., entitled "PICKER MECHANISM FOR DATA CARTRIDGES".

U.S. Pat. No. 5,718,339 to Woodruff et al., entitled "CARTRIDGE RACK AND LIBRARY FOR ENGAGING SAME".

U.S. Pat. No. 5,739,978 to Ellis et al., entitled CARTRIDGE HANDLING SYSTEM WITH MOVING I/O DRIVE".

U.S. Pat. No. 5,059,772 to Younglove discloses a cartridge library wherein the cartridge magazines each have a reflective indicia used for precise placement of the magazine.

What is needed, and an object of the present invention, is an effective way for mounting certain magazines to a cartridge library frame.

BRIEF SUMMARY OF THE INVENTION

An automated cartridge library comprises a magazine mounting assembly which holds at least one magazine to a library frame, the magazine accommodating at least one cartridge of information storage media. A cartridge transport system transports cartridges between the magazine and a drive.

The magazine mounting assembly comprises a magazine mounting surface having a reflection region which is of contrasting reflectivity with another region of the magazine mounting assembly. The reflection region is preferably a reflection plate which is secured to the magazine mounting assembly. The reflection plate fits over an internal cavity of the magazine mounting assembly.

A magazine guide flange extends from the magazine mounting surface and has a label-bearing facet formed thereon for each cell of the magazine, each facet being aligned with a corresponding cell. The magazine guide flange is preferably angularly inclined with respect to the magazine mounting surface. A cartridge label, e.g., barcode label, can be secured to the facet The magazine mounting assembly further has two side walls extending from a rear of the magazine mounting surface, planes of the two side walls being angularly inclined toward one another whereby a rear section of the magazine mounting assembly forms a wedge. Rear edges of the two side walls intersect with a backwall, the backwall forming a semicylindrical concavity which mates with a drum center cylindrical post about which a cartridge storage section of the library rotates. The backwall has at least one dowel extending therefrom for extending into the drum center cylindrical post.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 24A is a front perspective view of an entry/exit magazine carrier of the embodiment of FIG. 22, showing the entry/exit magazine carrier in a docking position and with a magazine.

FIG. 25 is a top view of the library of the embodiment of FIG. 22, showing an entry/exit magazine carrier in a docking position.

FIG. 26B is a front view of an entry/exit magazine carrier of the embodiment of FIG. 22, showing the entry/exit magazine carrier in a docking position but without a magazine.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
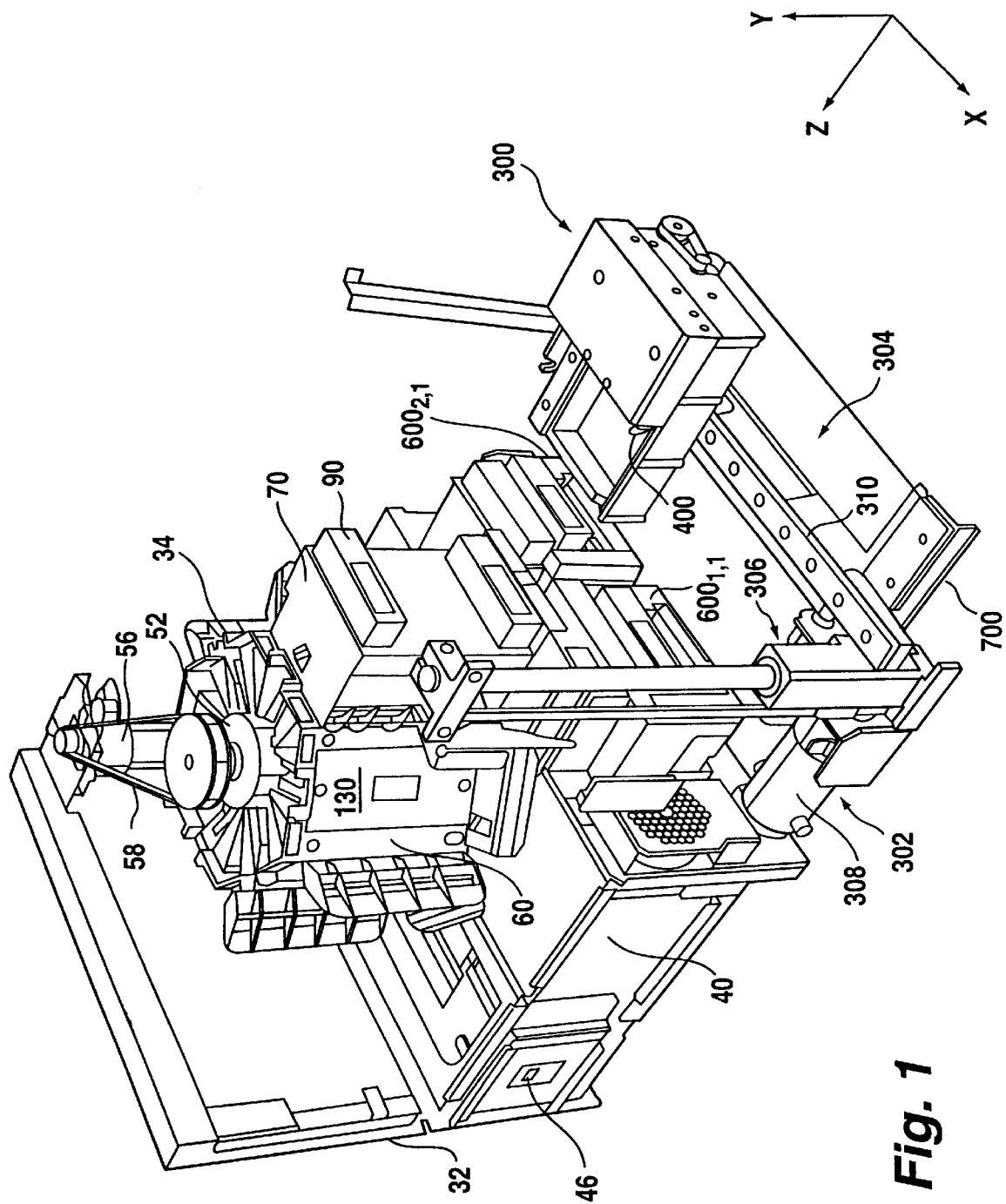
FIG. 1 is a perspective view of portions of a cartridge library (with housing removed) according to an embodiment of the invention.

FIG. 1 shows portions of a cartridge handling library 30 according to a first embodiment of the invention. In general, library 30 includes a library frame 32, a drum-like cartridge storage section 34; a drive section 38 formed in frame 32; and, a cartridge transport system 40.

Frame 32 includes a cabinet 42 upon which drum-like cartridge storage section 34 is mounted for rotation about axis 44. Drive section 38 is located in cabinet 42 below cartridge storage section 34. A controller 46, which can take the form of a microprocessor, for example, is located within library 30, and can be mounted on a circuit board. Controller 46 is operatively connected to the various motors and sensors constituting library 30 in order to supervise and coordinate operation of library 30.

Figure 2:
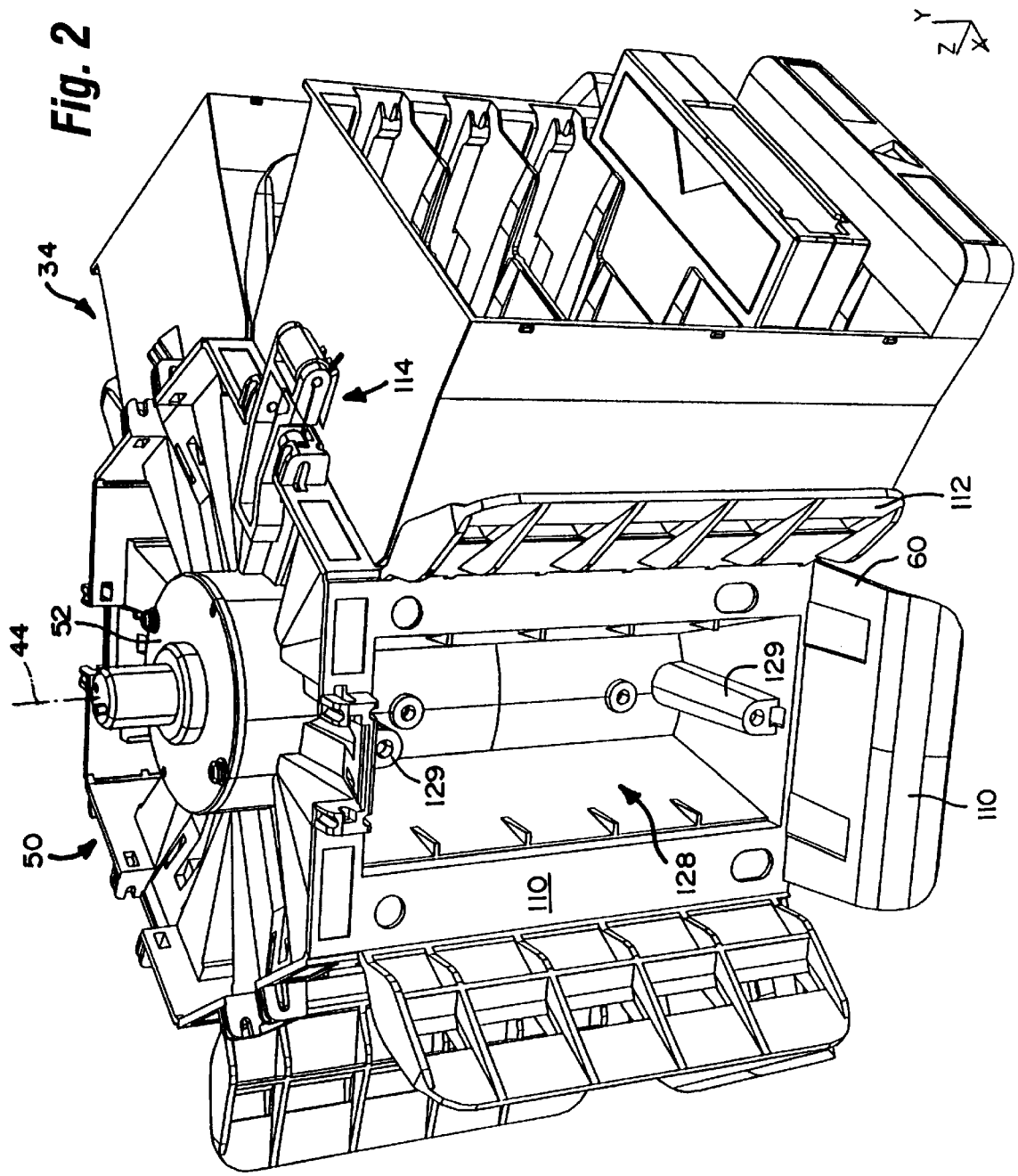
FIG. 2 is a perspective view of a cartridge storage section of the cartridge library of FIG. 1.
Figure 3:
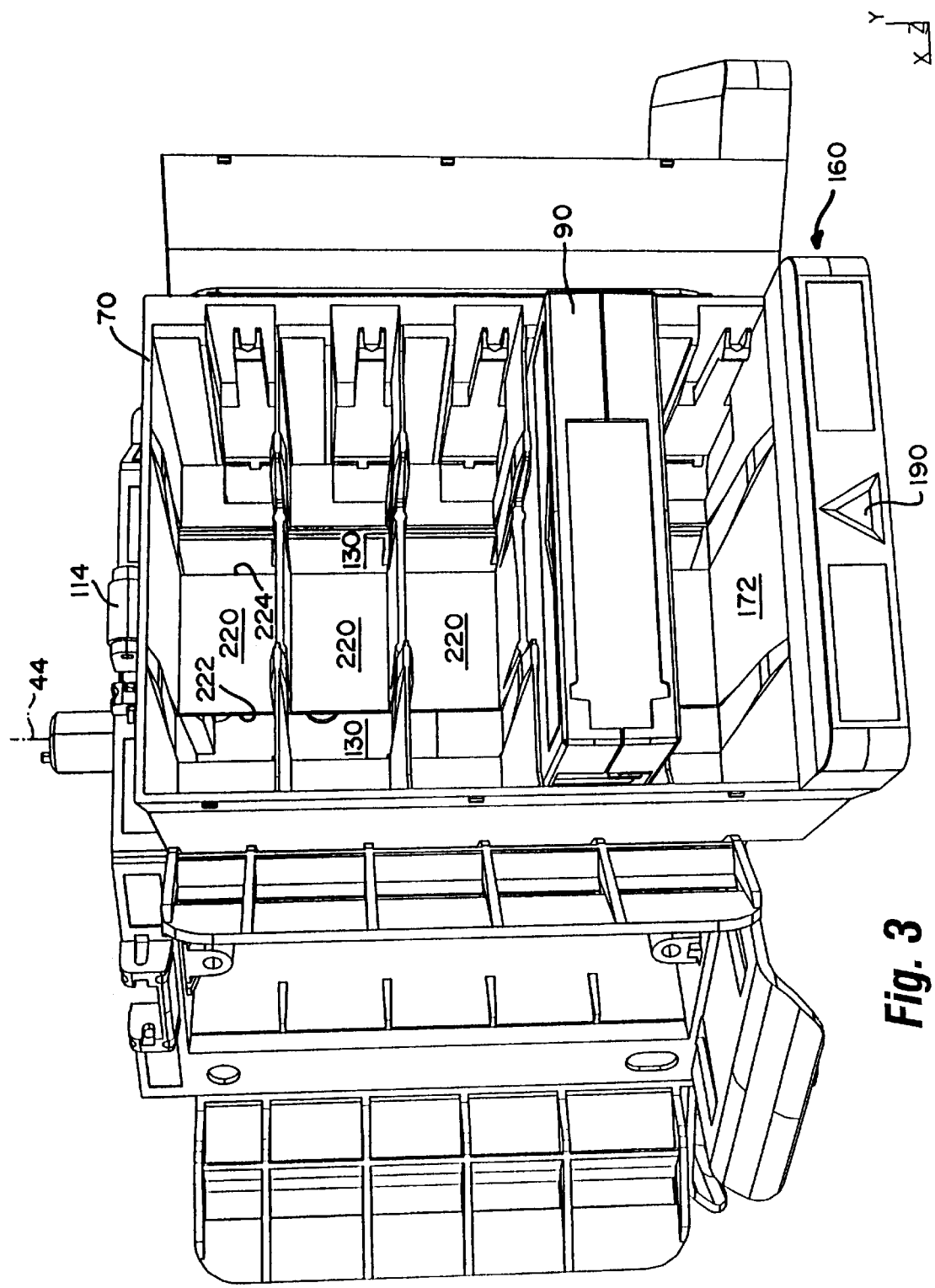
FIG. 3 is a front perspective view of the cartridge storage section of FIG. 2.
Figure 4A:
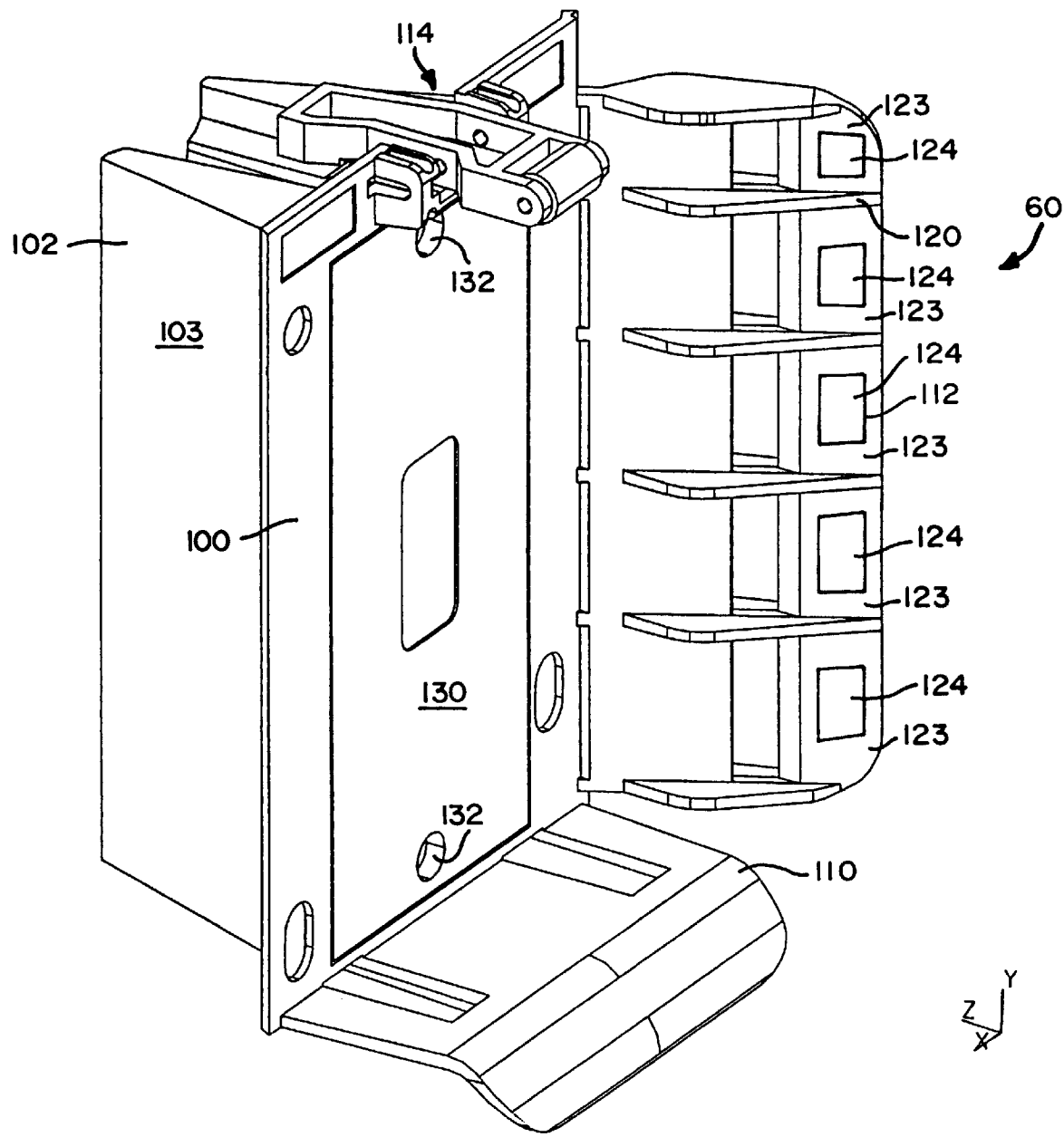
FIG. 4A is a side perspective view of a magazine mounting assembly included in the cartridge storage section of FIG. 2.
Figure 4B:
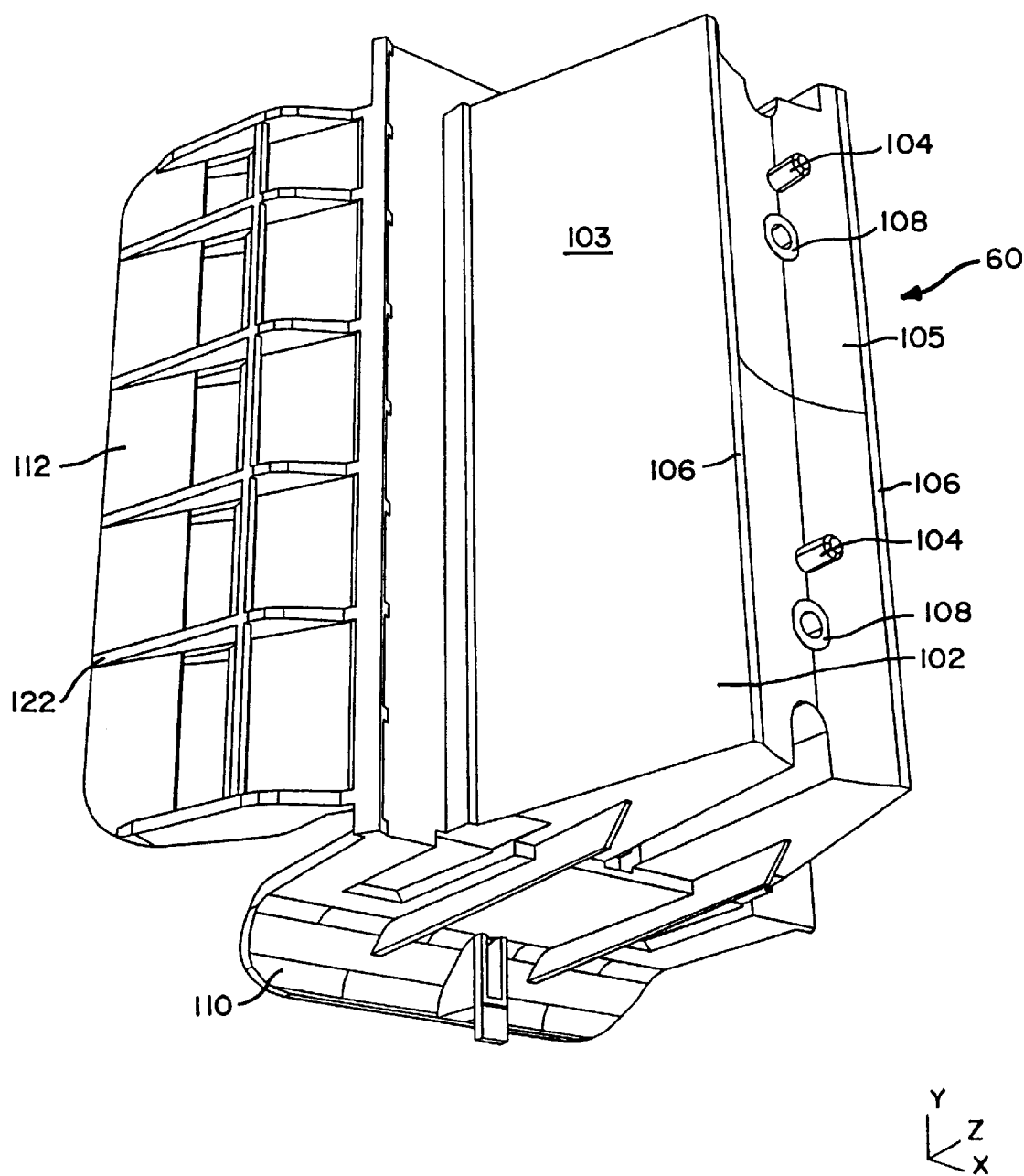
FIG. 4B is a rear perspective view from above of the magazine mounting assembly of FIG. 4A.
Figure 4C:
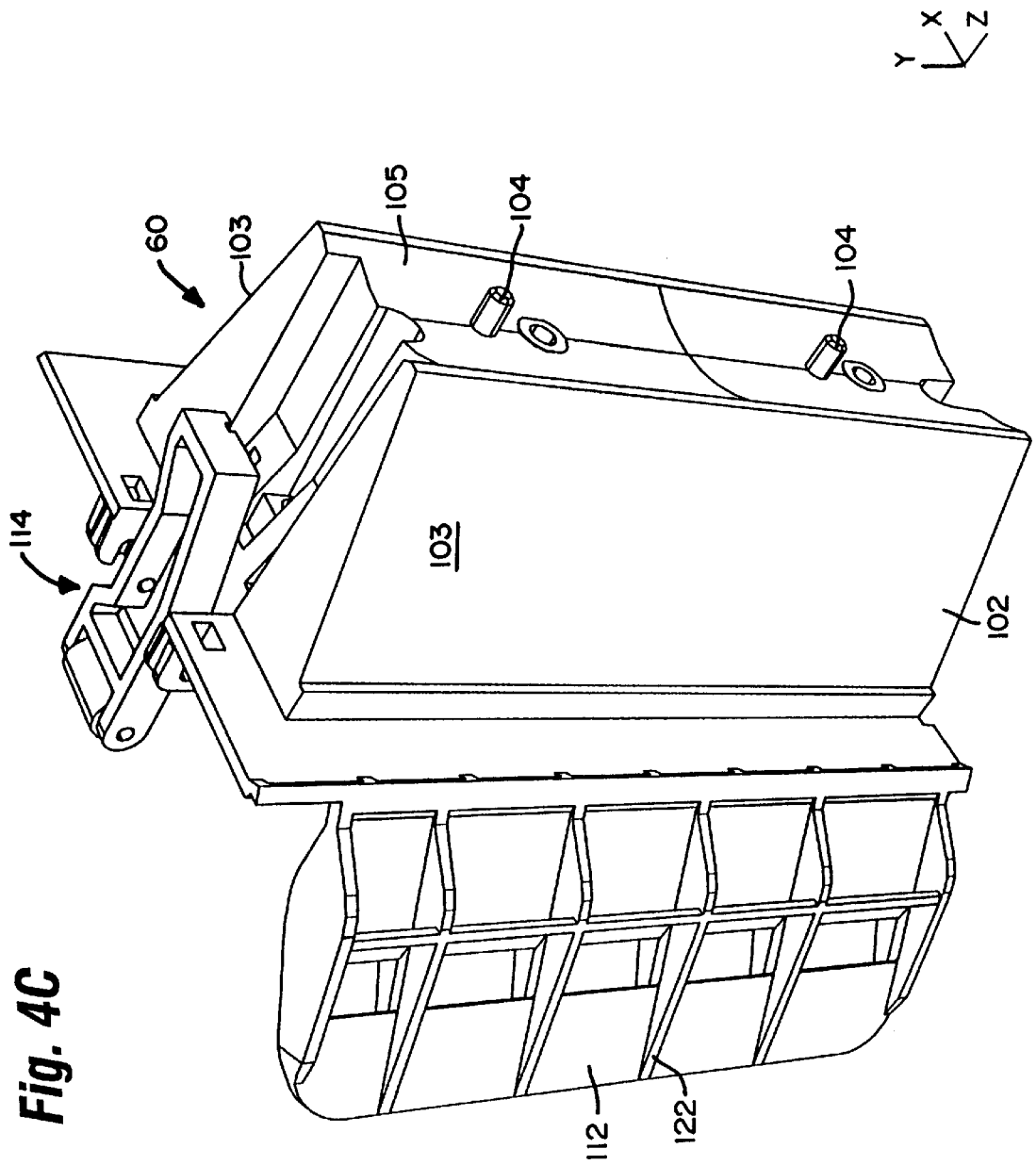
FIG. 4C is a rear perspective view from below of the magazine mounting assembly of FIG. 4A.

Cartridge storage section 34, seen in FIG. 2 and FIG. 3, includes a drum 50 which is generally hexagonal in shape. Drum 50 is comprised of a drum center cylindrical post 52 and six magazine mounting assemblies 60. Rotation of drum 50 is accomplished by a drum motor 56 which is operatively linked to drum 50 by a transmission system (e.g., transmission belt 58). One of magazine mounting assemblies 60 is shown in FIG. 4A–FIG. 4C. Each magazine mounting assembly 60 is adapted to engage a cartridge magazine 70.

FIG. 4A–FIG. 4D show a magazine mounting assembly 60 for use in library 30. Each magazine mounting assembly 60 has an essentially planar and rectangular mounting plate 100. A rear portion 102 of magazine mounting assembly 60 has an essentially wedge shape for abutting center cylindrical post 52. As shown from the rear in FIG. 5 and FIG. 6, rear portion 102 of magazine mounting assembly 60 has two dowels 104 which insert into corresponding holes in center cylindrical post 52.

Figure 5:
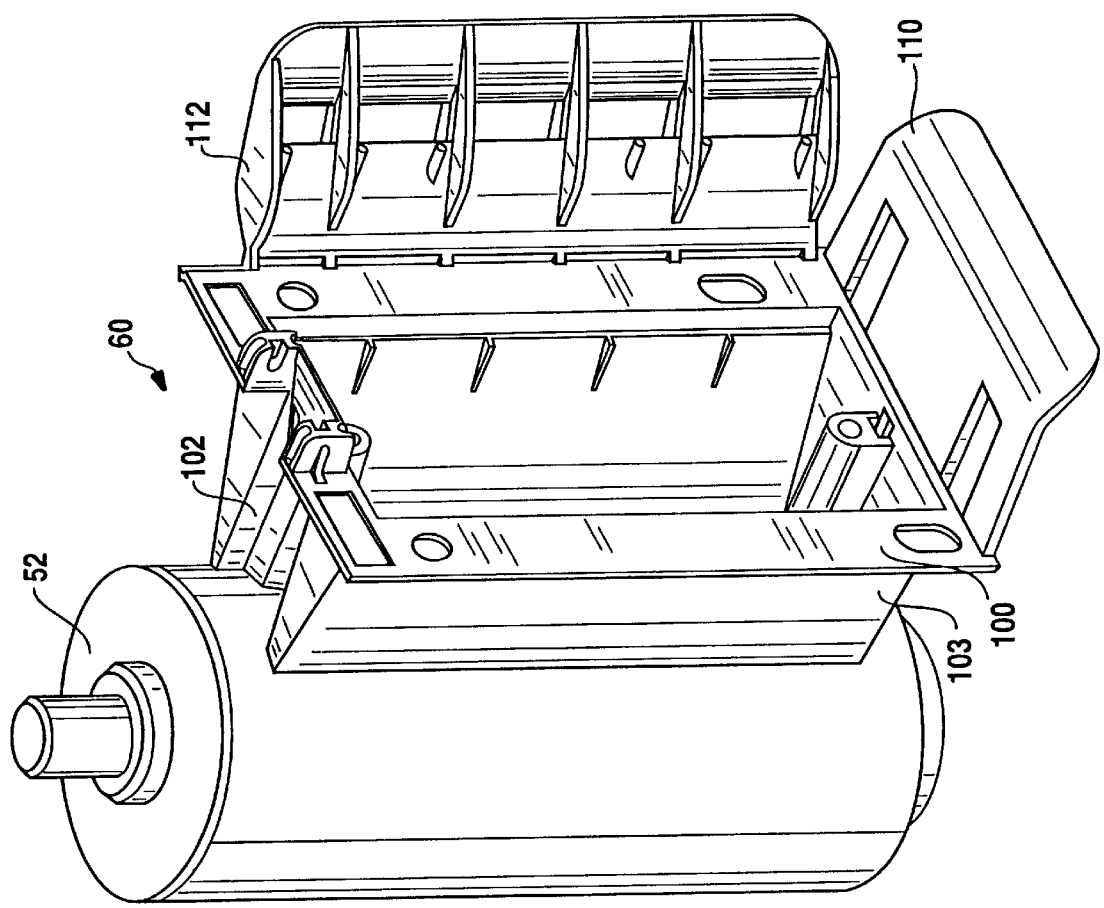
FIG. 5 is a side perspective view of a magazine mounting assembly attached to a drum center cylindrical post included in the cartridge storage section of FIG. 2.

Rear portion 102 of magazine mounting assembly 60 has two side walls 103 which extend radially toward the center of drum center cylindrical post 52. The two side walls 103 do not meet at an apex (which would be the center of drum center cylindrical post 52), but instead are truncated by an arcuate or concave magazine backwall 105 (see FIG. 4B and FIG. 4C). Arcuate magazine backwall 105 is formed to provide three (vertical) lines of contact when abutting the outer circumferential wall of drum center cylindrical post 52. Two of the lines of contact are provided by the two backwall edges 106, a third line of contact is provided by two aligned regions 108 which protrude slightly from magazine backwall 105 (see FIG. 4B). The three lines of contact obviate any need for having the entire backwall 105 of the molded assembly 60 match the circumference of the tube of the drum. The magazine backwall 105 has the two dowels 104 extending therefrom for fitting into the corresponding holes in drum center cylindrical post 52. The relationship of one magazine mounting assembly 60 to drum center cylindrical post 52 is shown in FIG. 5. The wedge shape of rear portion 102, e.g., the two sidewalls 103, facilitate arrangement of plural magazine mounting assemblies 60 about drum center cylindrical post 52 somewhat in the same manner as adjacent pie pieces, as discerned from FIG. 2.

Magazine mounting assembly 60 further has a magazine support shelf 110, magazine guide flange 112, and a resilient magazine retainer mechanism 114. Magazine guide flange 112 is angularly inclined with respect to mounting plate 100 and has both a series of native magazine guide ribs 120 (see FIG. 4) on its front surface and a series of neighboring magazine guide ribs 122 on its rear surface (see FIG. 5). While each magazine mounting assembly 60 has only one magazine guide flange 112 formed on its right side, on its left side the magazine mounting assembly 60 capitalizes upon the guide flange 112 of the neighboring magazine mounting assembly 60. Thus, when a cartridge magazine 70 is inserted into magazine mounting assembly 60, guidance therein is facilitated by native magazine guide ribs 120 on the magazine mounting assembly 60 into which the cartridge magazine 70 is being inserted, as well as the neighboring magazine guide ribs 122 on the neighboring magazine mounting assembly 60.

Guide flange 112 of each magazine mounting assembly 60 has locations for bearing signage such as cartridge labels. Between native magazine guide ribs 120 on guide flange 112 of each magazine mounting assembly 60 is a first set of signage facets 123 (see FIG. 4A). Each signage facet 123 can bear a cartridge label, such as gummed-back barcoded labels 124 shown in FIG. 4A. Each label 124 corresponds to an aligned one of plural cells formed in magazine 70. Since magazine 70 has five cells as discussed hereinafter, aligned with each cell is a facet 123 bearing a label 124.

Figure 4D:
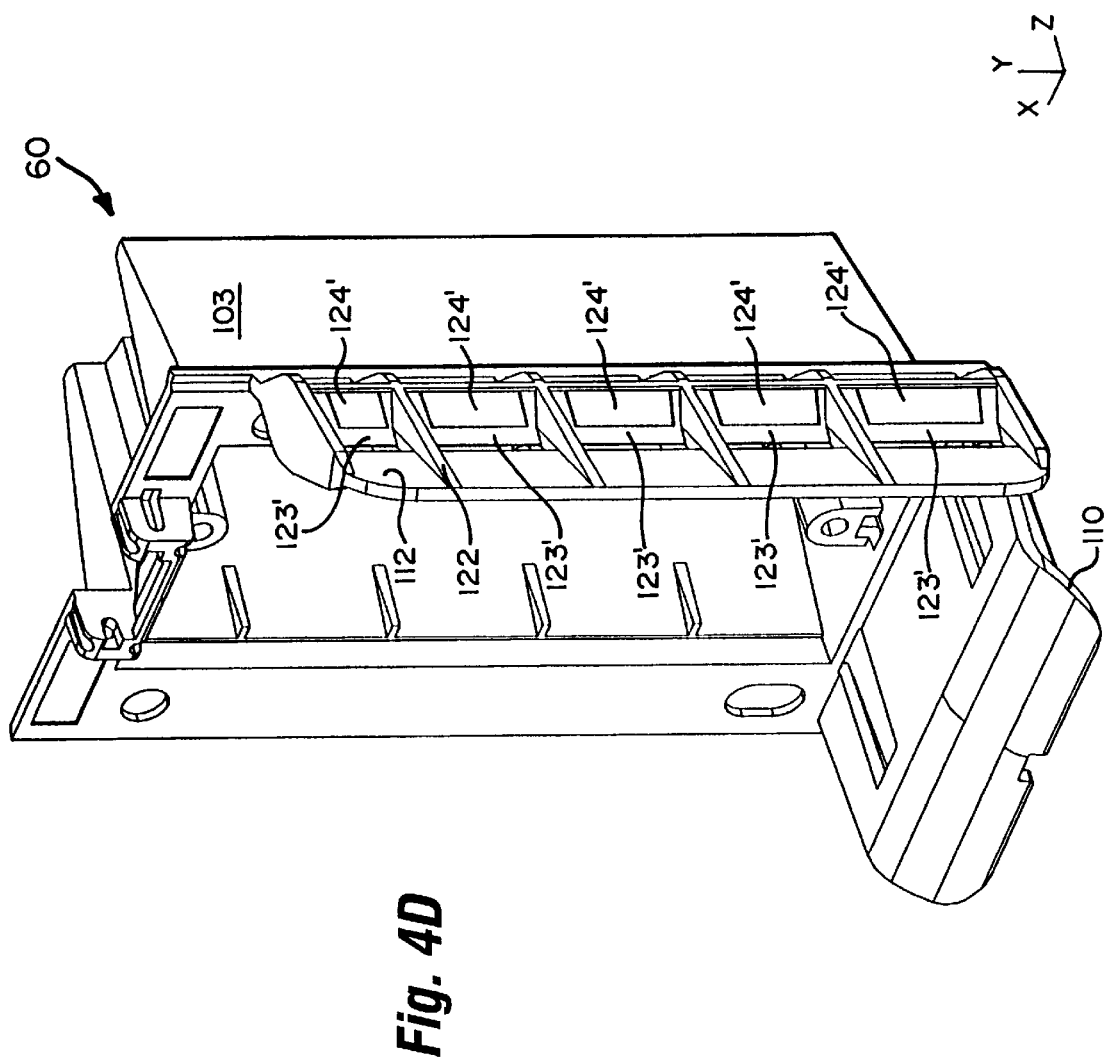
FIG. 4D is a side perspective view of the magazine mounting assembly of FIG. 4A.

As shown in FIG. 4D, a second or alternate set of signage facets 123' are provided on the other side of guide flange 112 of magazine mounting assembly, e.g., o between magazine guide ribs 122. FIG. 4D shows signage facets 123' bearing labels 124'. Using the second set of signage facets 123', the labels 124' are in parallel planes with the cartridge's barcode recess features, but at a different depth in the Z axis.

In its center, mounting plate 100 of magazine mounting assembly 60 has a rectangular aperture which communicates with an internal cavity 128 in magazine mounting assembly 60 (see FIG. 2). In one embodiment shown e.g., in FIG. 4A, internal cavity 128 has two fastener anchors 129 molded therein. A rectangular reflection plate 130 is sized to fit over the mouth of internal cavity 128. Reflection plate 130 is secured in mounting plate 100 by recessed fasteners 132 whose shafts are threadingly accommodated in fastener anchors 129 of rear portion 102. Reflection plate 130 is either formed from or coated with an optically reflective material, such as white plastic, for example.

Figure 44B:
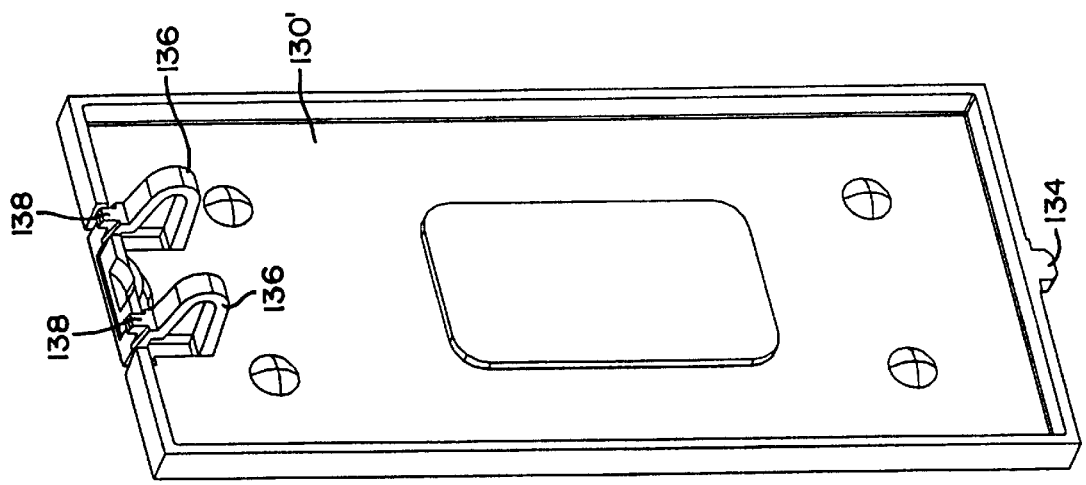
FIG. 44A and FIG. 44B are front and rear perspective views, respectively, of an embodiment of a reflection plate which snap fits into an internal cavity of a magazine mounting assembly of the invention.
Figure 44A:
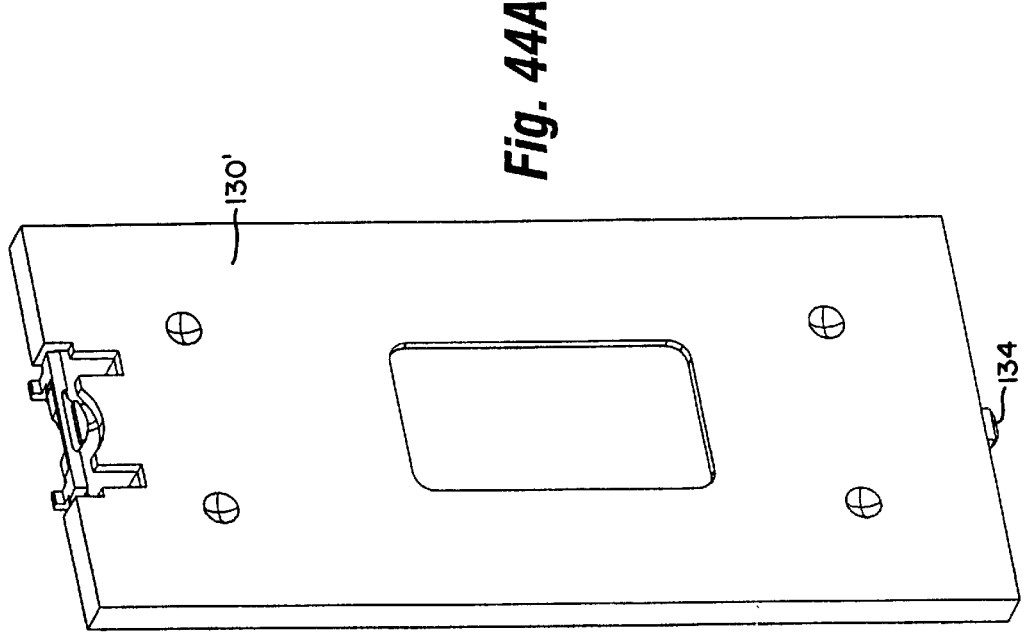

In another embodiment, shown in FIG. 44A and FIG. 44B, reflection plate 130' is formed to have a snap fit into internal cavity 128 of magazine mounting assembly 60. In this regard, reflection plate 130' has a rectangular boss 134 pending from a lower edge thereof. Boss 134 fits into a corresponding rectangular hole formed in magazine mounting assembly 60. At the top of its rear surface, reflection plate 130' has two spaced-apart detents 136 which resiliently bias prongs 138 on distal ends thereof upward to catch an interior rim surrounding cavity 128 of magazine mounting assembly 60. As in the fastener-secured embodiment, reflection plate 130 is either formed from or coated with an optically reflective material.

FIG. 7–FIG. 13 show a cartridge magazine 70 adapted for insertion into the magazine mounting assemblies 60 of library 30. Cartridge magazine 70 has right side wall 150; left side wall 152; top wall 154; and a bottom portion 160. Top wall 154 has three chevron projections 164 which are engaged by resilient magazine retainer mechanism 114. Right side wall 150 has six channels 166 which are contoured to accommodate native magazine guide ribs 120 provided on magazine mounting assembly 60. Bays 168 are provided between and/or adjacent channels 166. In is interior, each bay 168 accommodates a resilient cartridge engagement tang 170.

Bottom portion 160 of cartridge magazine 70 includes a bottom wall 172 which has a pair of slightly elevated ramps 174 formed thereon. Projecting from bottom wall 172 is a magazine shelf 180. Magazine shelf 180 has a vertical skirt 182 formed therearound. Magazine skirt 182 has an indicia 190 formed on a front surface thereof. Indicia 190 is a polygon, such as a triangle in the illustrated embodiment, which has two sides (e.g., sides 191, 192) which meet at a vertex (e.g., vertex 193). Indicia 190 is not coplanar with skirt 182 of cartridge magazine 70. Particularly, in the illustrated embodiment indicia 190 is recessed within skirt 182. This recessing or beveling of sides of indicia 190 prevent any unwanted reflection proximate indicia 190. Moreover, indicia 190 is preferably of a contrasting color or contrasting reflectivity from skirt 182. For example, indicia 190 can be white, whereas the rest of cartridge magazine 70 can be black. In one embodiment, indicia 190 is formed by a triangular aperture extending through magazine shelf 180, with a white reflective tape adhered to the back of magazine shelf 180 to cover the aperture from the rear.

Cartridge magazine 70 defines a plurality of cells. In the illustrated embodiment, cartridge magazine 70 defines five cells 200. Four partition walls 201–204 serve to divide the interior of cartridge magazine 70 into the five cells 200. On both its upper surface and lower surface, each partition has a ramp analogous to ramp 174. Each cell 200 accommodates a single cartridge, and accordingly has an associated one of the resilient cartridge engagement tangs 170 for engaging a side of a cartridge inserted therein.

Figure 8:
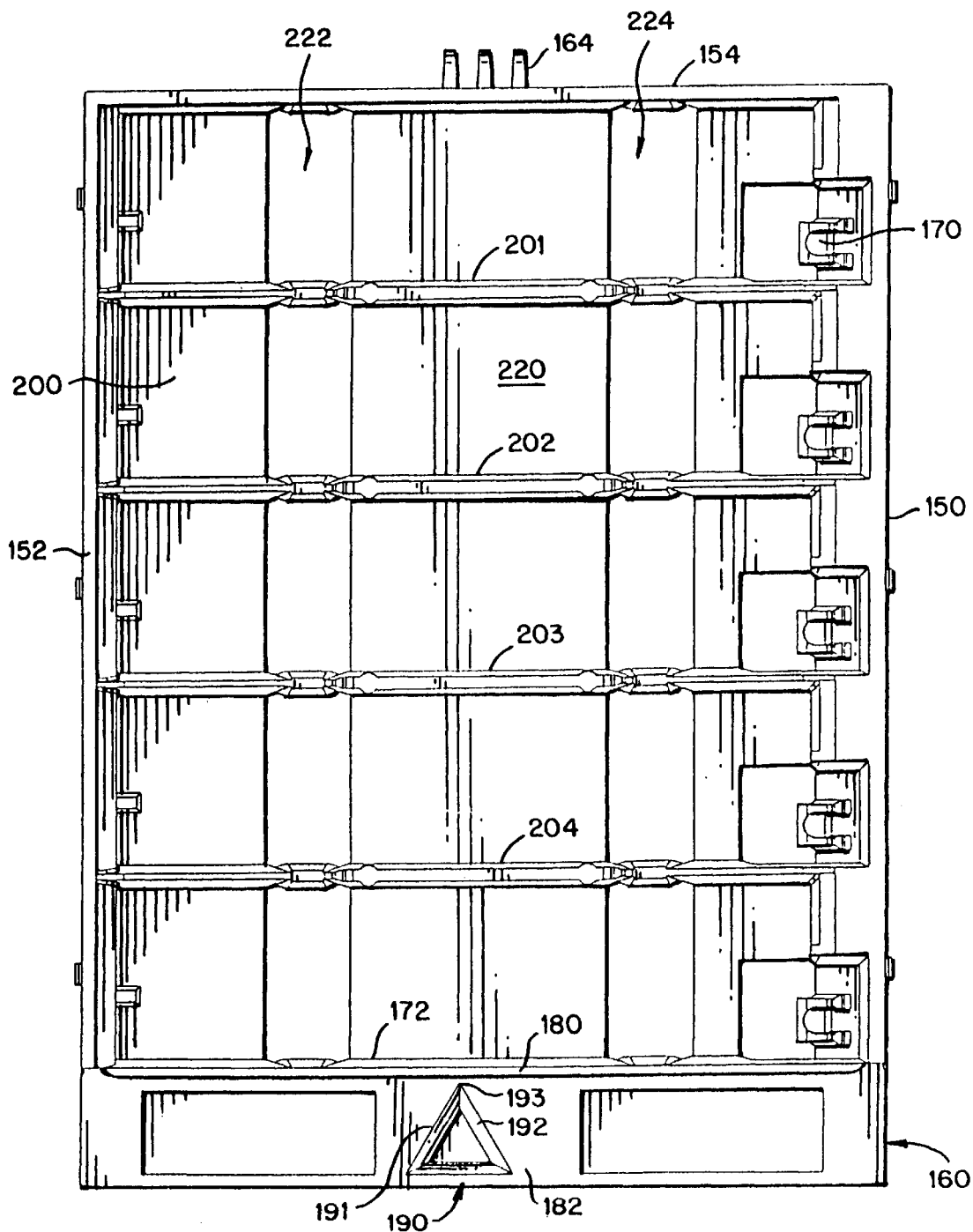
FIG. 8 is a front view of the cartridge magazine of FIG. 7.
Figure 9:
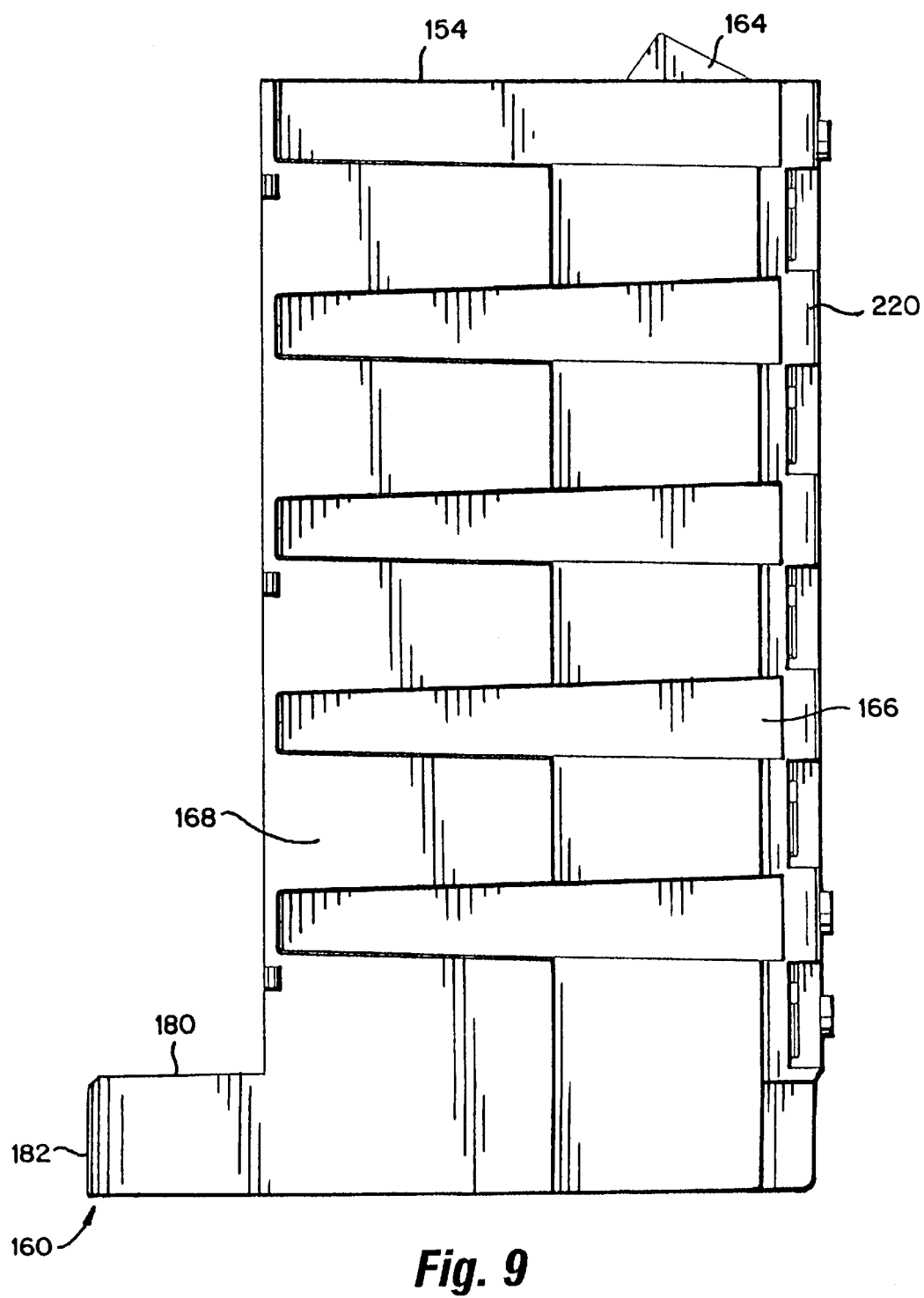
FIG. 9 is a right side view of the cartridge magazine of FIG. 7.
Figure 10:
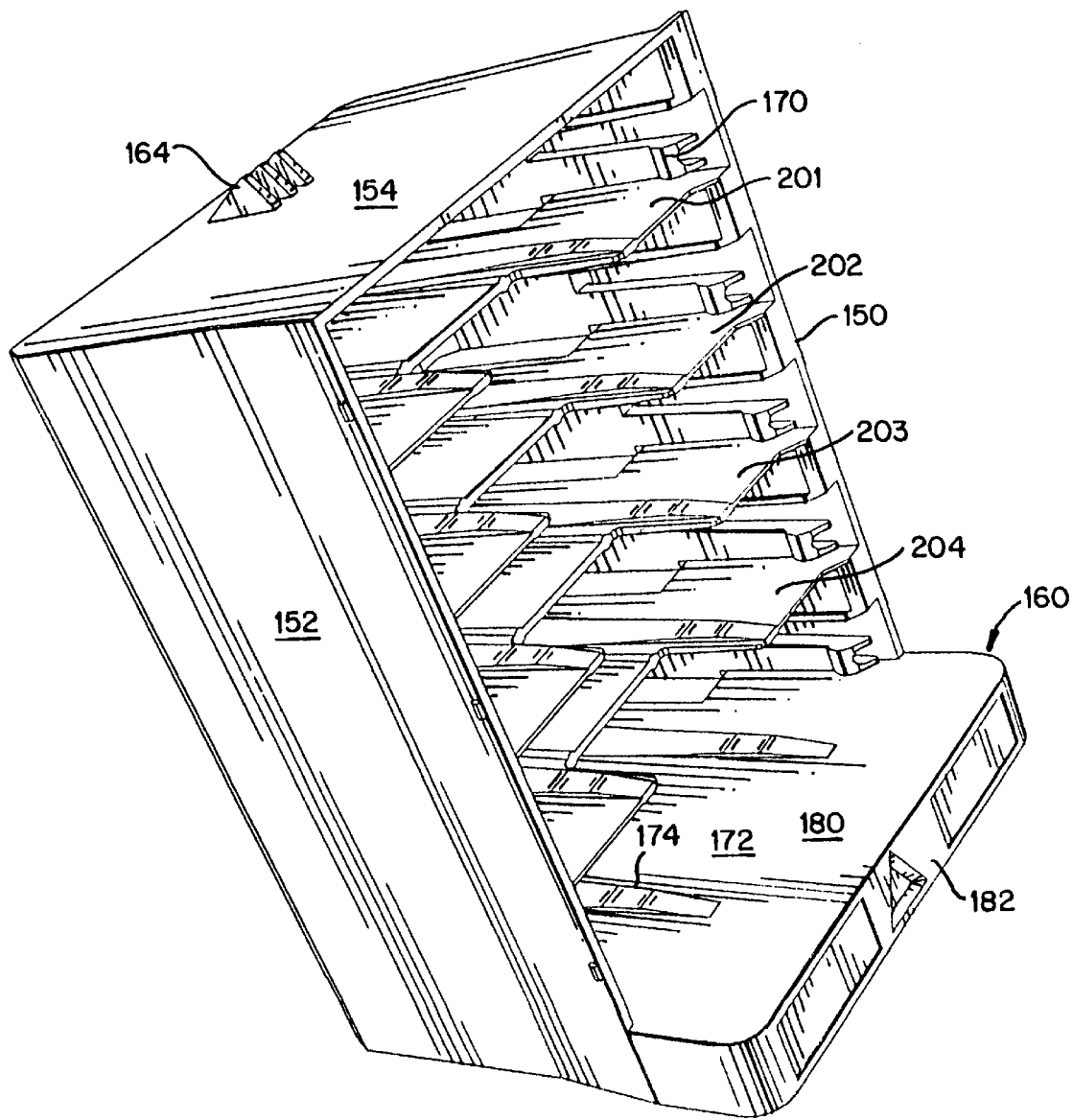
FIG. 10 is a left side front perspective view of the cartridge magazine of FIG. 7.
Figure 11:
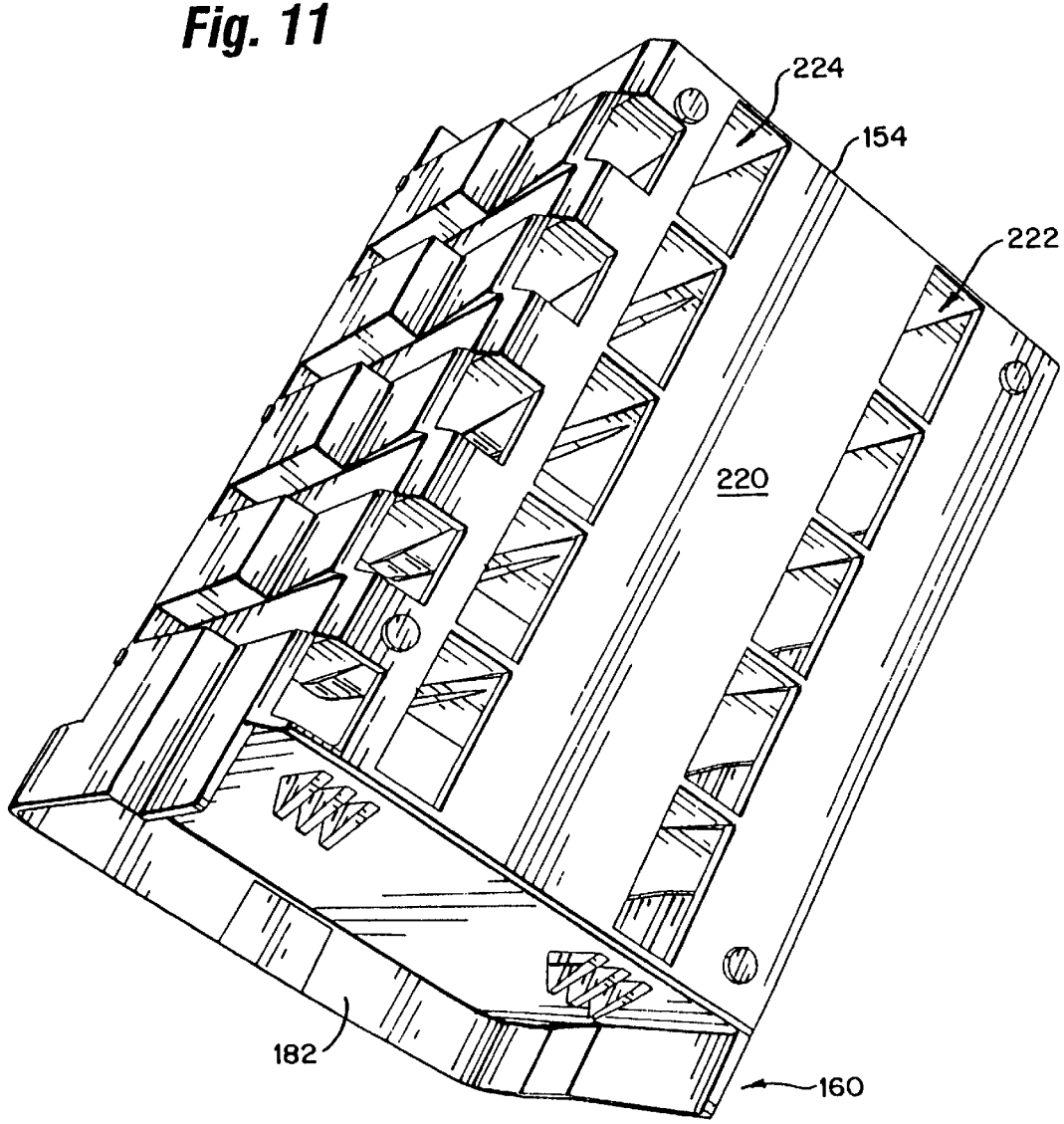
FIG. 11 is a rear perspective view of the cartridge magazine of FIG. 7.
Figure 12:
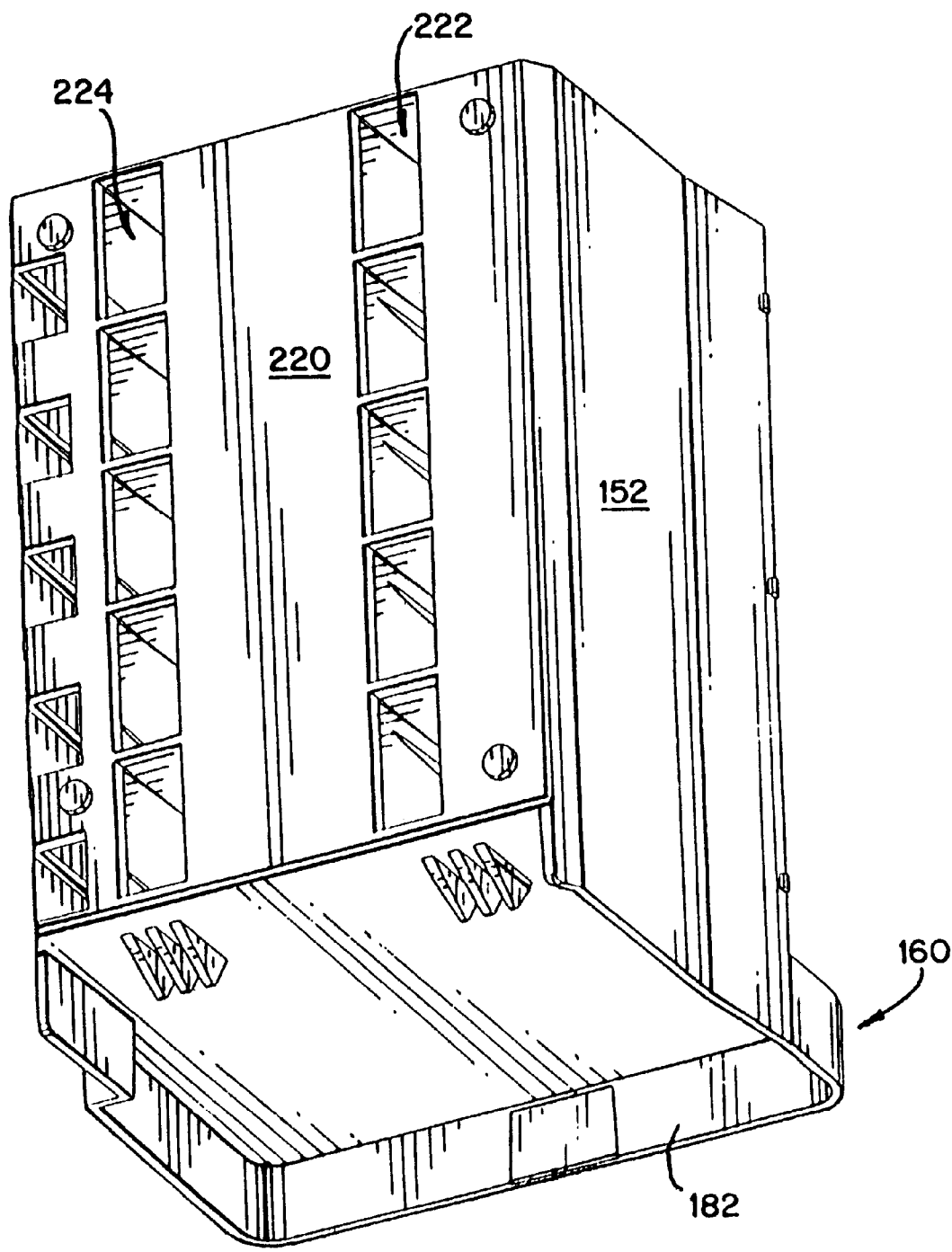
FIG. 12 is a bottom perspective view of the cartridge magazine of FIG. 7.
Figure 13:
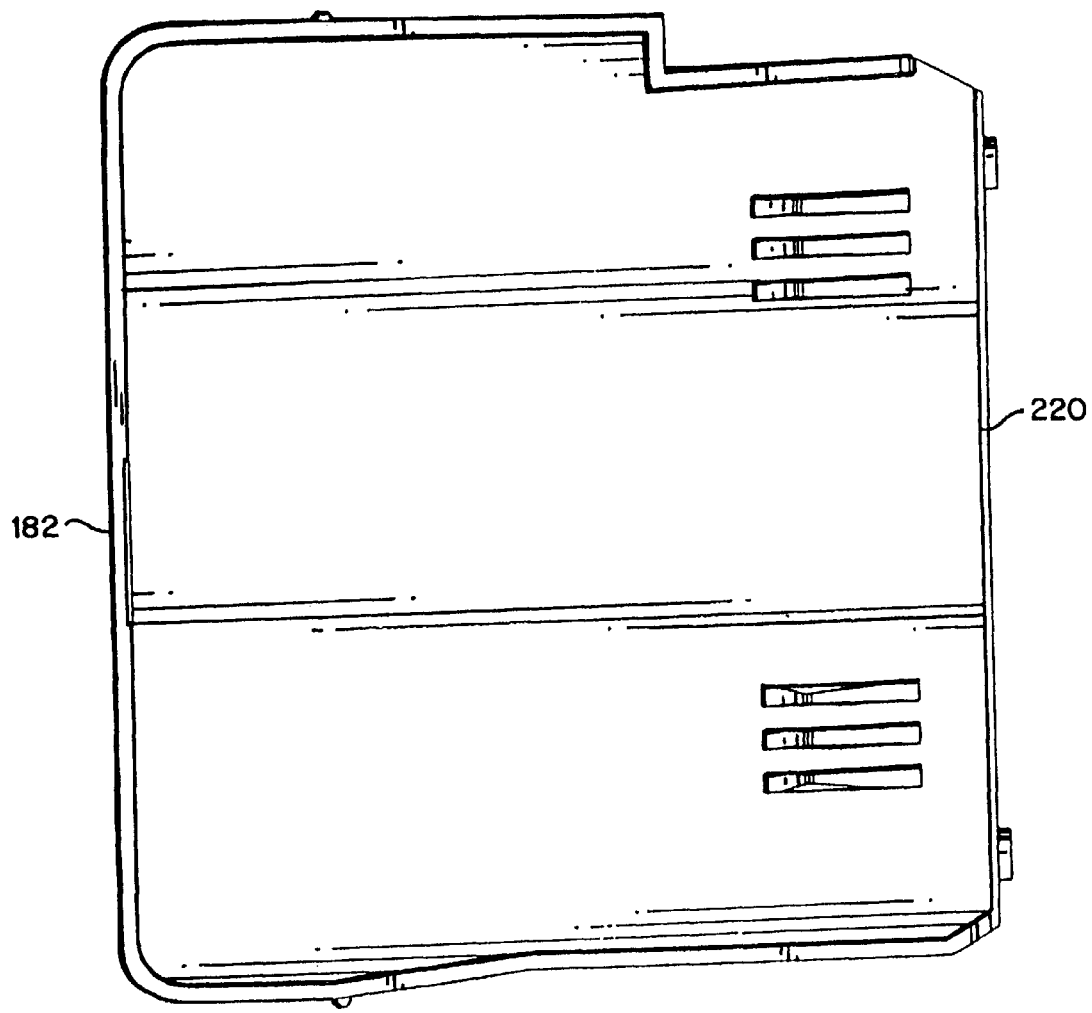
FIG. 13 is a bottom view of the cartridge magazine of FIG. 7.

As seen (for example) in FIG. 8 and FIG. 11, cartridge magazine 70 has a magazine rear wall 220. Magazine rear wall 220 has two columns 222, 224 of apertures formed therein. Henceforth, the apertures in column 222 shall simply be referred to as aperture 222, and the apertures in column 224 shall simply be referred to as aperture 224. Each cell 200 thus has two apertures, one from each column, i.e., an aperture 22 and an aperture 224.

FIG. 3 shows a cartridge magazine 70 inserted into a magazine mounting assembly 60 of library 30, with a cartridge 90 already inserted in one of the cells 200 of cartridge magazine 70. In particular, FIG. 3 shows a cartridge 90 inserted in a fourth cell from the top of cartridge magazine 70. In the three cells above cartridge 90 in FIG. 3, as well as the cell below cartridge 90 (e.g., the fifth cell of cartridge magazine 70), magazine rear wall 220 with its columns of apertures 222 and 224 is visible. Through apertures 222, 224 is exposed the reflection plate 130 of magazine mounting assembly 60.

Figure 6:
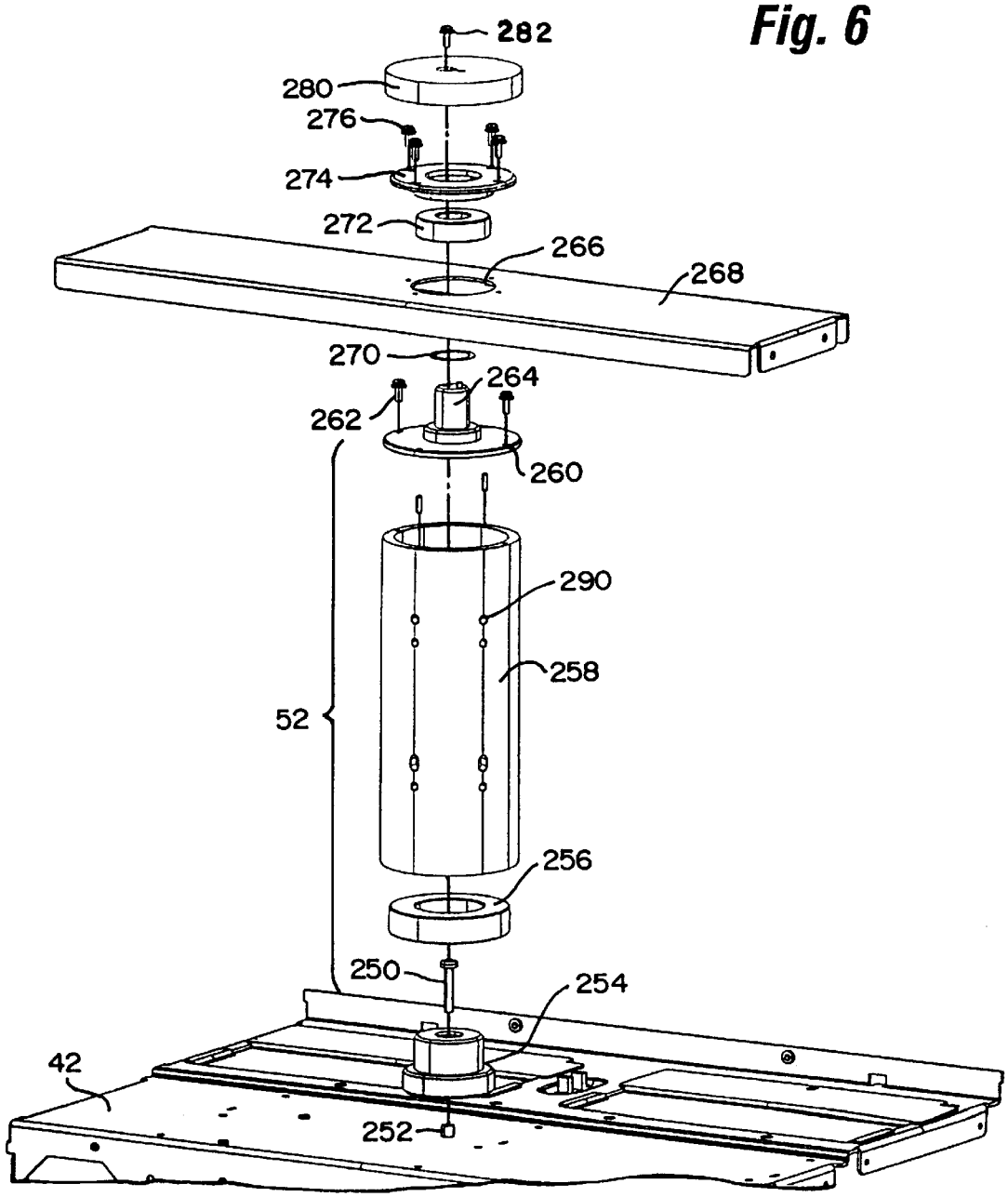
FIG. 6 is an exploded view of a drum center cylindrical post in the cartridge storage section of FIG. 2.
Figure 7:
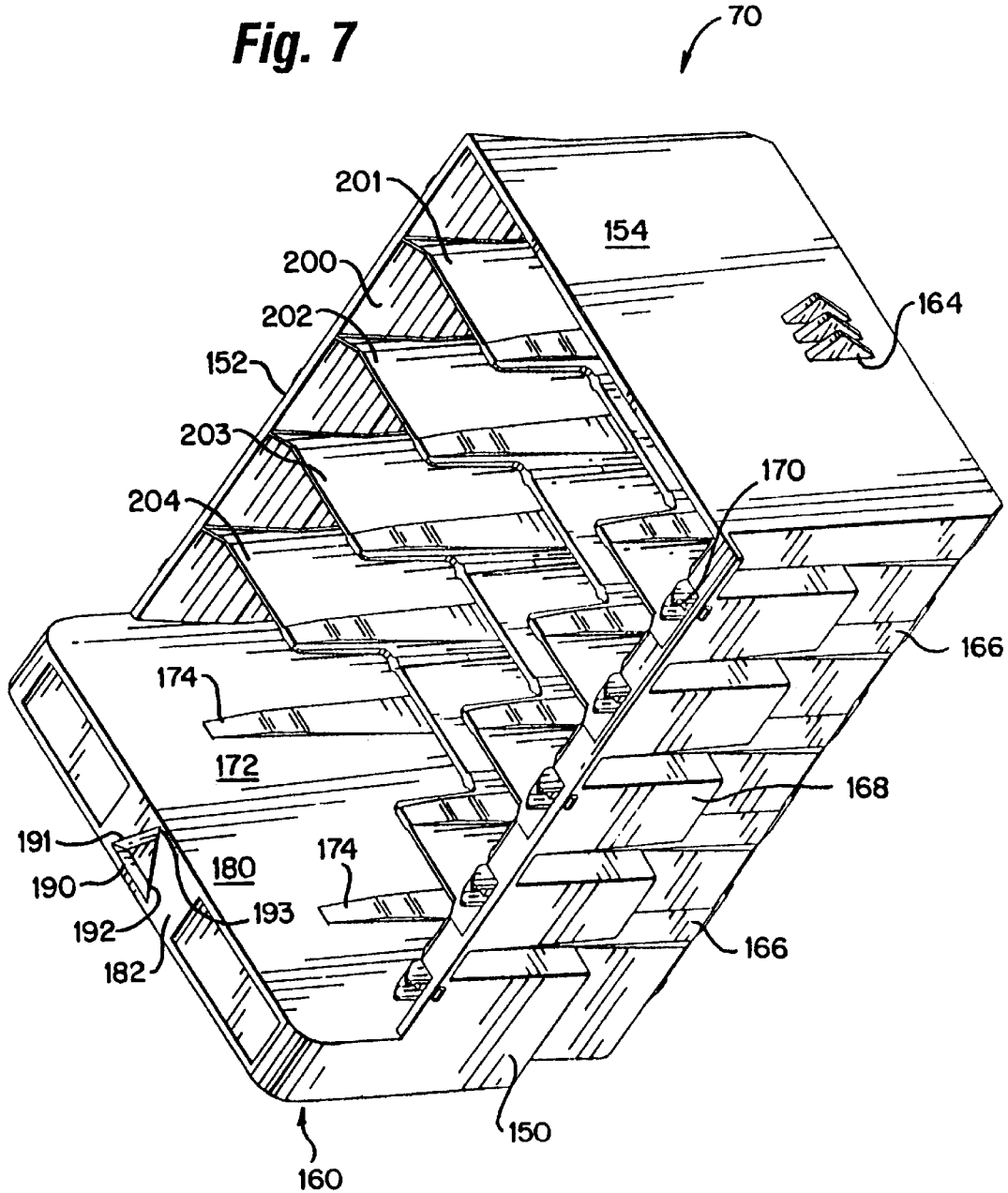
FIG. 7 is a right side front perspective view of a cartridge magazine insertable into the magazine mounting assembly of FIG. 4.

FIG. 6 shows how drum center cylindrical post 52 is mounted to library frame 32. As indicated previously, frame 32 includes a cabinet 42 upon which drum-like cartridge storage section 34 is mounted for rotation. A screw 250 and nut 252 secure a bottom spindle 254 of drum center cylindrical post 52 to cabinet 42. A bearing 256 fits over and around bottom spindle 254. The drum center cylindrical post 52 includes a tube section 258, which rests on bearing 256 and which also fits over and around bottom spindle 254. An upper end of tube 258 is closed by upper spindle 260, which is secured to tube 258 by fasteners 262. Upper spindle 260 has a cylindrical neck 264 which extends through a circular aperture 266 in frame cross member 268. Also fitting over cylindrical neck 264 of spindle 260 are a wave washer 270 and a bearing 272 for facilitating rotational motion of drum center cylindrical post 52. Bearing 272 has a bearing cap 274 formed thereover, which is anchored by fasteners 276 into frame cross member 268. A pulley 280 is anchored into the top of cylindrical neck 264 of spindle 260 by fastener 282. Pulley 280 is entrained by a transmission belt to a motor which rotates the entire center cylindrical post 52, as well as the magazine mounting assemblies 60 secured thereto and the magazines 70 mounted to the magazine mounting assemblies 60. FIG. 6 also shows the holes 290 in drum center cylindrical post 52 into which dowels 104 of magazine mounting assembly 60 (see FIG. 4B and FIG. 4C) are inserted.

As shown in FIG. 1, cartridge transport system 700 includes a cartridge gripper assembly 300 along with gripper vertical transport subsystem 302 and a horizontal transport subsystem 304. Vertical transport subsystem 302 includes a track 306 along which cartridge gripper assembly 300 can travel vertically under power of vertical direction motor 308. Similarly, horizontal transport subsystem 304 includes a track 310 along which cartridge gripper assembly 300 travels horizontally under power of a horizontal motor (hidden from view in FIG. 1). Such tracks and motors are conventional and examples thereof are provided in the incorporated references.

Figure 14:
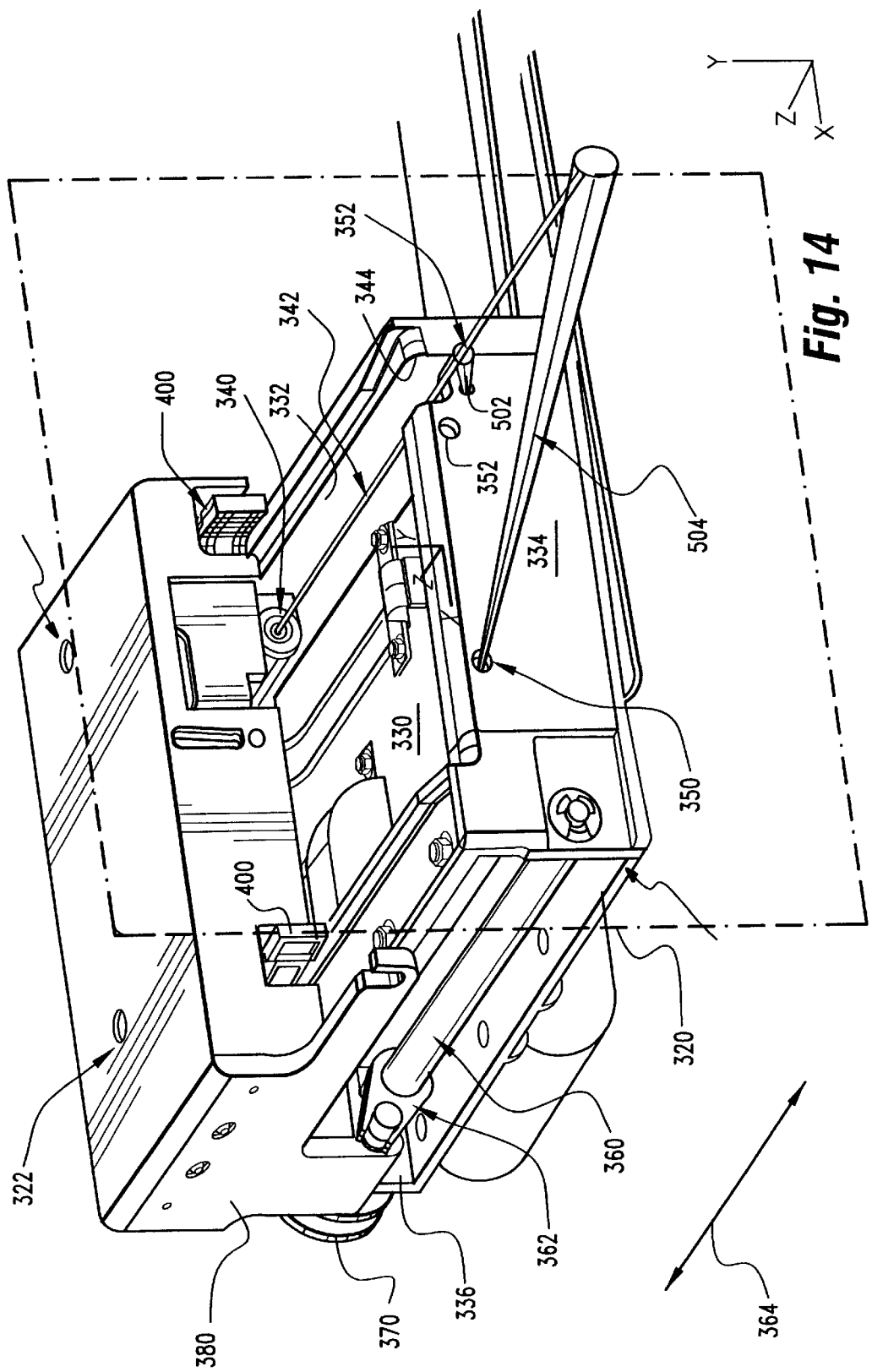
FIG. 14 is a perspective view of a cartridge transport assembly for the library of FIG. 1.
Figure 15:
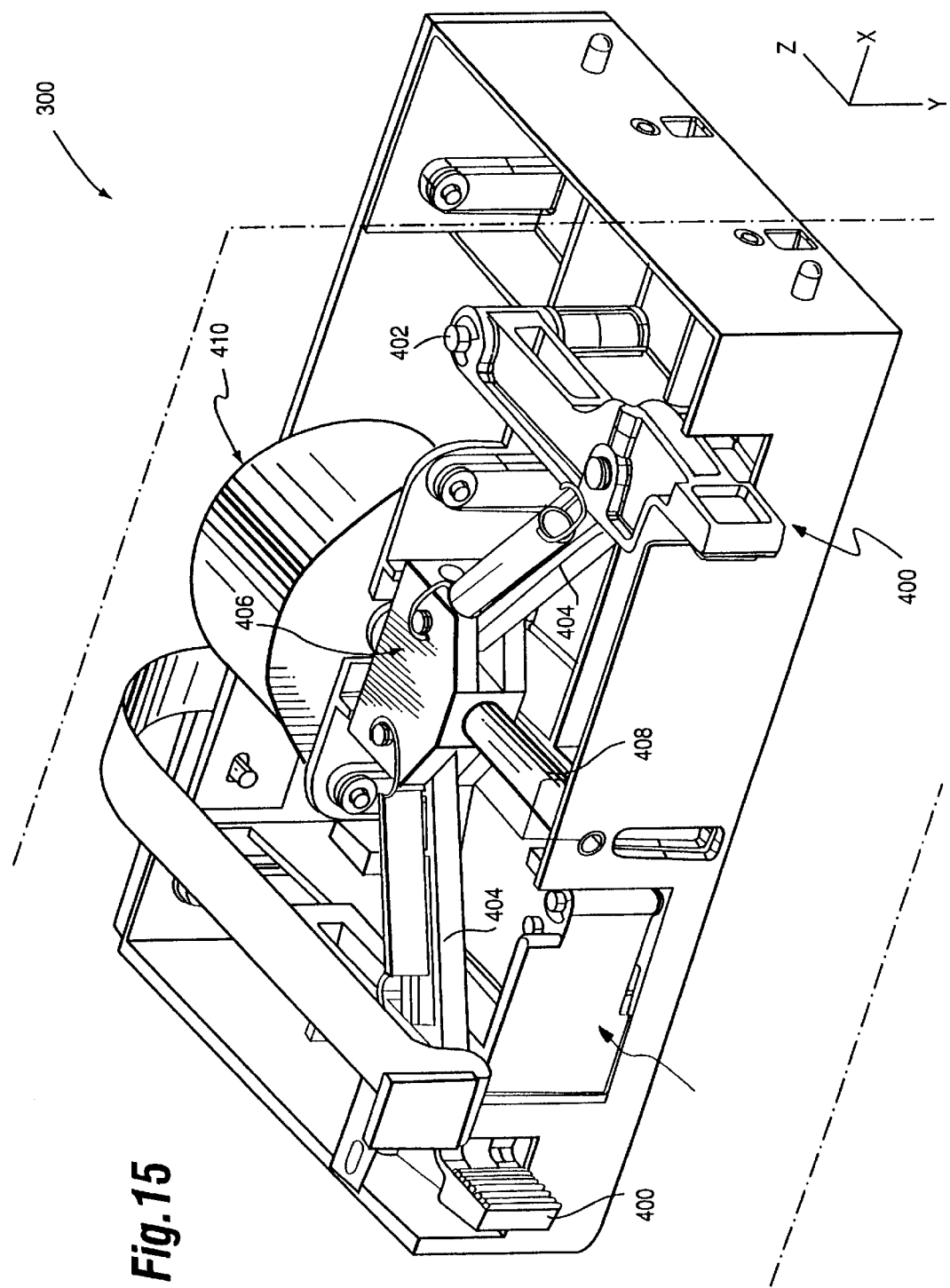
FIG. 15 is an inverted perspective view of a portion of the cartridge transport assembly of FIG. 14.

Cartridge gripper assembly 300 is shown in FIG. 14 as including a gripper base section 320 and a gripper translation section 322. FIG. 15 shows gripper translation section 322 removed from gripper base section 320 and turned over to an inverted position to expose internal components thereof.

Gripper base section 320 essentially has the shape of a square, open-top box, and includes a bottom wall 330, side wall 332, front wall 334, and rear wall 336. An illumination source, such as laser 340 is mounted on bottom wall 330 proximate the intersection of side wall 332 and rear wall 336. Laser 340 emits a beam 342 which is directed through an aligned notch 344 in front wall 334 (see FIG. 14).

In addition to having laser beam notch 344, front wall 334 of gripper base section 320 has two sensors mounted thereon, particularly cartridge absence sensor 350 and sensor 352. Sensor 352 serves as a barcode reading sensor and a calibration sensor.

Figure 16:
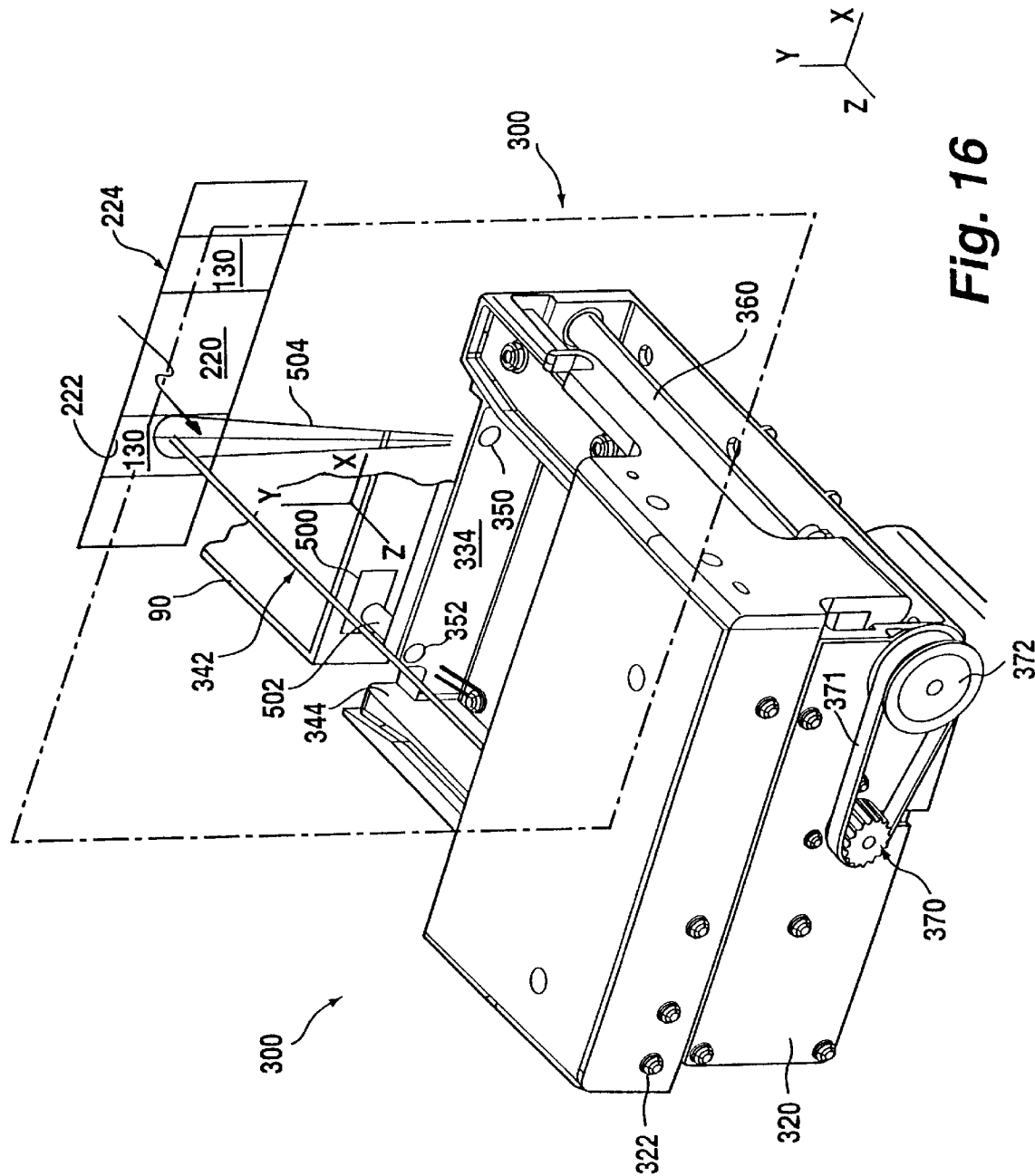
FIG. 16 is a rear perspective view of the cartridge transport assembly of FIG. 14.

As shown in FIG. 14, gripper base section 320 has a leadscrew 360 rotatably retained between its front wall 334 and rear wall 336. Lead nut 362 threadingly engages leadscrew 360 and is connected to gripper translation section 322. By virtue of this connection rotation of leadscrew 360 causes displacement of gripper translation section 322 in a direction toward and away from cartridge storage section 40 (e.g., in the direction of arrow 364 in FIG. 14). Rotation of leadscrew 360 is accomplished by an unillustrated motor which is located in gripper base section 320. The unillustrated motor has a motor pulley 370 which is shown in FIG. 16. Motor pulley 370 is connected by belt 371 to a pulley 372 mounted at the end of leadscrew 360.

Gripper translation section 322 has a side wall 380 which carries a projection to which lead nut 362 is engaged. FIG. 15 shows gripper translation section 322 removed from gripper base section 320 and turned upside down, and with side wall 380 removed. Thus, components of gripper translation section 322 as shown in FIG. 15 are inverted.

As shown in FIG. 15, gripper translation section 322 includes two spaced-apart gripper fingers 400 between which cartridges are selectively engaged. Gripper fingers 400 form part of an overall gripper activation mechanism which includes gripper pivot points 402, linkages 404 for connecting gripper fingers 400 to leadscrew nut 406, a rotatable leadscrew 408 upon which nut 406 travels, and a stepper motor 410 for selectively rotating leadscrew 408. As leadscrew 408 is rotated by activation of motor 410, nut 406 travels along leadscrew 408 and causes opening or closing of fingers 400 in accordance with the direction of travel of nut 406 (which depends upon the direction of rotation of leadscrew 408). The structure and operation of the gripper activation mechanism of gripper translation section 322 is understood with reference to U.S. Pat. No. 5,487,579 to Woodruff et al., entitled "PICKER MECHANISM FOR DATA CARTRIDGES", which is incorporated herein by reference.

Figure 18:
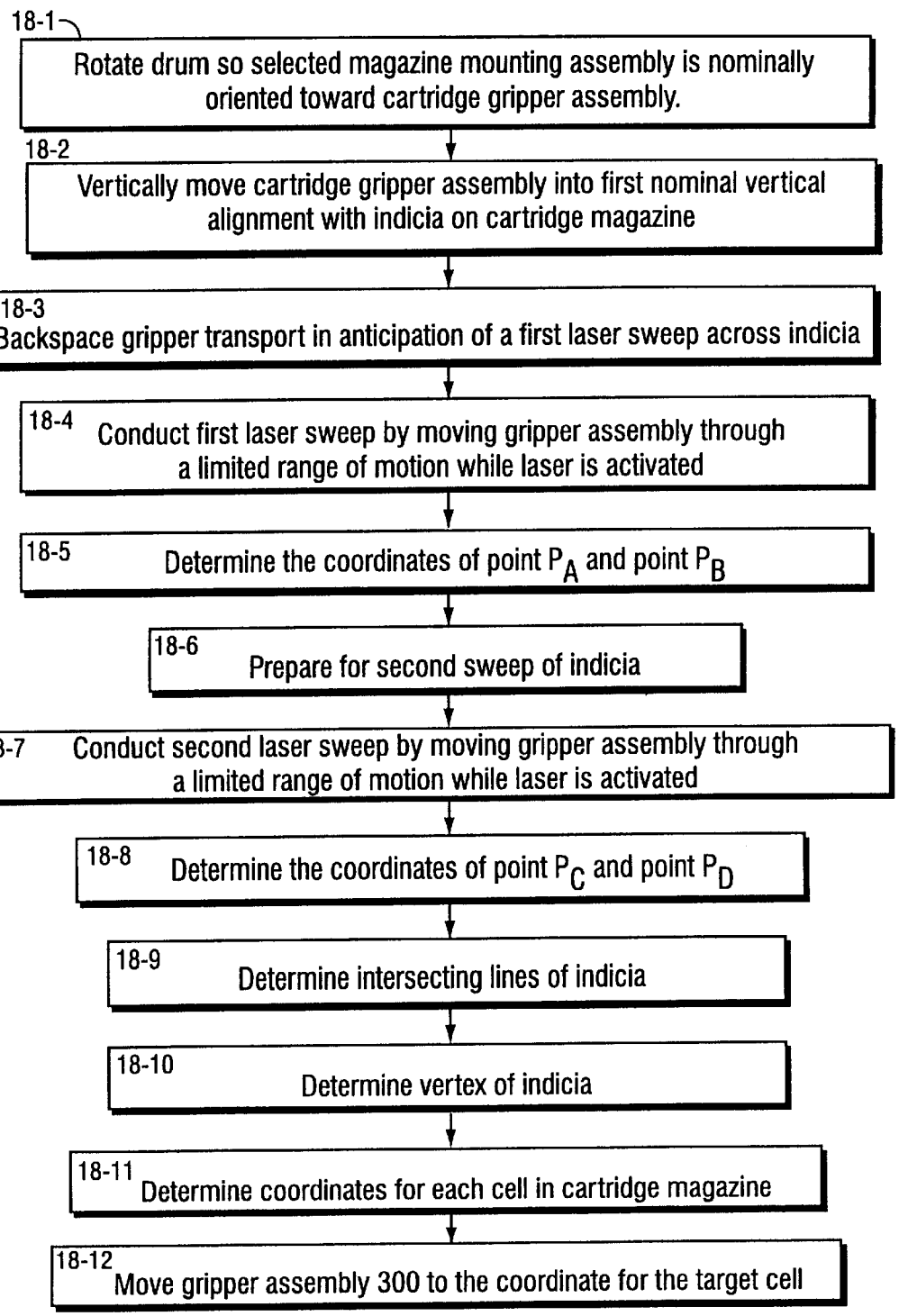
FIG. 18 is a flowchart showing basic steps involved in locating a cartridge magazine included in the library of FIG. 1.

FIG. 18 shows steps involved in locating a cell position in library 30. Performance of the steps of FIG. 18 is coordinated and supervised by controller 46. At step 18-1, drum 50 is rotated by motor 56 until a selected magazine mounting assembly 60 is nominally oriented to face cartridge gripper assembly 300. In this respect, drum 50 has an unillustrated mechanical flag mounted thereon which trips a sensor when drum 50 is in a home position. The motor for drum 50 has a position encoder. Controller 46 knows the number of encoder required from the home position to present each of the six faces of drum 50 to cartridge gripper assembly 300.

At step 18-2 cartridge gripper assembly 300 is translated to a first nominal vertical position for approximate alignment with indicia 190 on cartridge magazine 70. Controller 46 accomplishes vertical alignment by activating 308 (see FIG. 1). The nominal vertical position of step 18-2 is referred to as coordinate Y1. The coordinates indicative of the nominal vertical positions (e.g., Y1) are stored in a memory accessible by controller 46.

Figure 17:
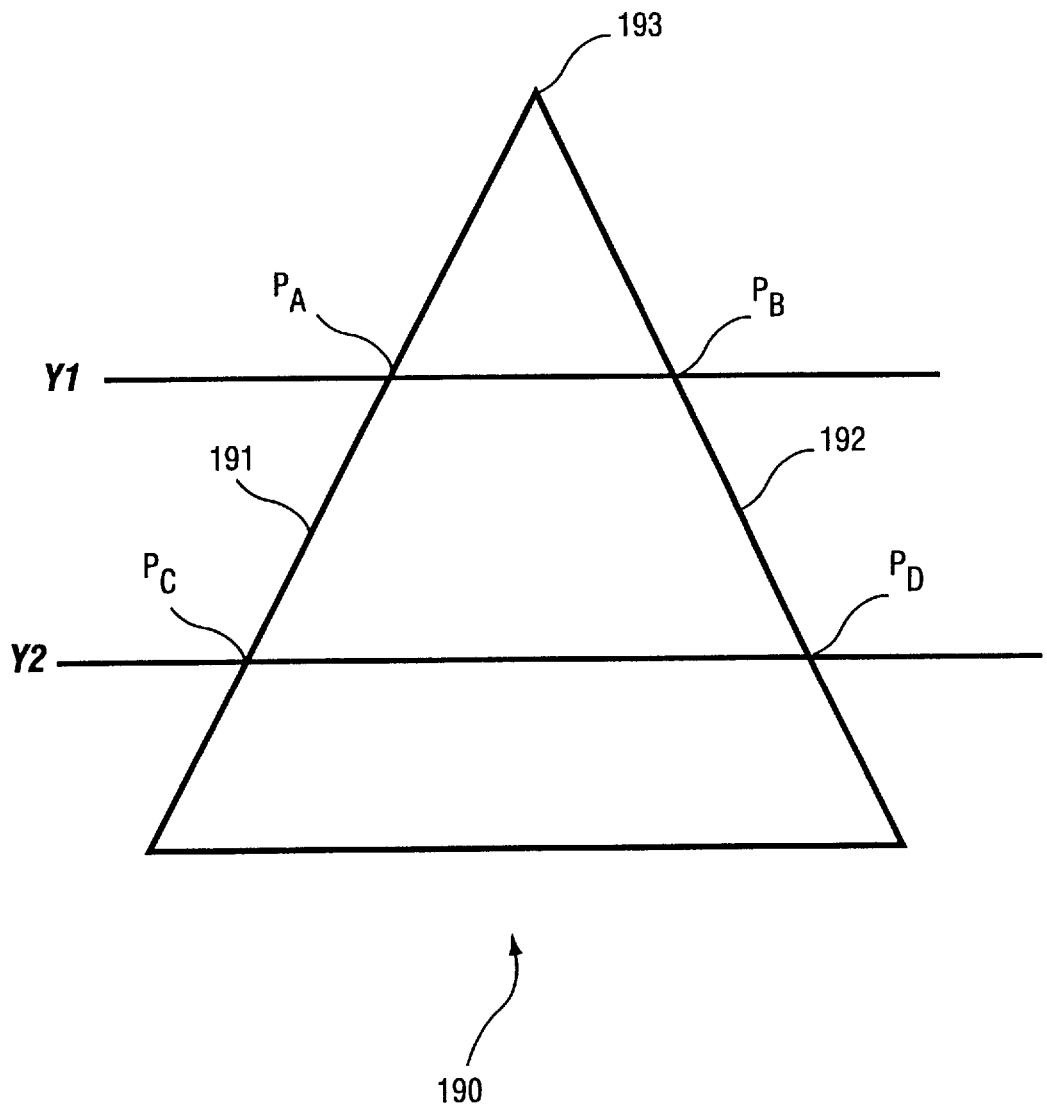
FIG. 17 is a diagrammatic view depicting laser sweeps across an indica in the library of FIG. 1.

With cartridge gripper assembly 300 vertically nominally aligned with indicia 190 on cartridge magazine 70, at step 18-3 cartridge gripper assembly 300 is moved horizontally leftward in anticipation of a first laser sweep across indicia 190. Then, at step 18-4, cartridge gripper assembly 300 is moved horizontally (rightward in FIG. 1) through a limited range of horizontal motion while laser 340 is activated, thereby accomplishing a first sweep. Such first sweep is illustrated by line Y1 in FIG. 17. During the first sweep, sensor 352 on front wall 334 of gripper base section 320 detects two reflectivity transitions. In particular, sensor 352 detects a first reflectivity transition at point $P_A$ and a second reflectivity transition at point $P_B$. For example, with indicia 190 having a white interior and the rest of cartridge magazine 70 being black, sensor 352 detects a transition from black to white at point PA and a transition from white to black at point $P_B$.

At step 18-5, controller 46 determine the coordinates of point $P_A$ and point $P_B$. The vertical coordinates of point $P_A$ and point $P_B$ are Y1, whereas other coordinates are obtained from the position encoder readouts of the motors (e.g., motor 308) at the time of the reflectivity transition.

Step 18-6 involves preparation for a second sweep of indicia 190. In such preparation, the vertical height of gripper assembly 300 is changed to a second nominal vertical position. In the example shown in FIG. 17, for example, the second nominal vertical position is Y2 which is lower than Y1 by a predetermined value. If it is desired that the second sweep be in the same direction as the first sweep, as part of the second sweep preparation cartridge gripper assembly 300 is horizontally backspaced past the position of indicia 190.

A s At step 18-7, a second sweep of indicia 190 is performed by again moving cartridge gripper assembly 300 through a limited range of horizontal motion while cartridge gripper assembly 300 is a vertical position Y2 and while laser 340 is activated. The second sweep is illustrated by line Y2 in FIG. 17. During the second sweep, sensor 352 on front wall 334 of gripper base section 320 again detects two reflectivity transitions. In particular, in the second sweep sensor 352 detects a first reflectivity transition at point $P_C$ and a second reflectivity transition at point $P_D$. Then, at step 18-8, in like manner with step 18-5, controller 46 determines the coordinates of point $P_C$ and point $P_D$. The vertical coordinates of point $P_C$ and point $P_D$ are Y2, whereas other coordinates are obtained from the tach readouts of the motors at the time of the reflectivity transition.

Step 18-9 involves controller 46 determining equations for lines 191 and 192 of indicia 190. The determination of lines 191 and 192 is easily performed since the coordinates of point $P_A$ and point $P_C$ are known on line 191; and the coordinates of point $P_B$ and point $P_D$ are known on line 192. Then, knowing the equations of lines 191 and 192, at step 18-10 controller 46 determines a point of intersection of lines 191 and 192, and thus determines vertex 193 of indicia 190. That is, the coordinates of indicia 190 are calculated and stored as a precise reference location for cartridge magazine 70.

Once the coordinates of vertex 193 of indicia 190 is exactly determined in the above manner for cartridge magazine 70, controller 46 can determine coordinates for each cell 200 in cartridge magazine 70. In this regard, controller 46 has a stored value representative of the offset of each cell from an indicia vertex for a standard cartridge 90. In the situation shown in FIG. 3, for example, in which cartridge 90 is stored in the second cell above magazine shelf 180, a standard offset value for a second cell is added to the Y coordinate for vertex 193 (as computed at step 18-10). Step X-12 shows cartridge gripper assembly 300 being moved to the coordinate for the target cell from which a cartridge is to be retrieved or into which a cartridge is to be inserted.

The procedure of FIG. 18, in which cartridge gripper assembly 300 is exactly aligned with each cartridge magazine 70 and then a target cell in magazine mounting assembly 60, is repeated for each of the plural magazine mounting assemblies 60 in library 30. In one mode of the invention, the location of each cartridge magazine 70 can be precisely obtained by the steps of FIG. 18 for each operation involving the cartridge magazine 70 (e.g., for each access of cartridge magazine 70). Alternatively, the coordinates of vertex 90 for each cartridge magazine 70, and the vertical offsets therefrom for each of the cells of the cartridge magazine 70, can be stored in a memory for reference by controller 46. Thereafter, in this alternate mode, controller 46 need only access the coordinates stored in memory. In either mode, the present invention is superior to techniques in which all magazines are assumed to have a constant offset from a reference position on the drum.

After cartridge gripper assembly 300 has moved to a target cell in the manner described above with reference to FIG. 18, it must be determined whether a cartridge 90 actually resides in the target cell, or whether the target cell is empty (i.e., the expected cartridge is absent). In addition, at least with reference to the alternate mode described above, for subsequent accesses of cartridge magazine 70 it should be confirmed, when cartridge 90 is absent from the cell in which it is expected, that the absence is not instead of the entire cartridge magazine 70. These cartridge/magazine sensing operations are described with reference to FIG. 19.

Figure 19:
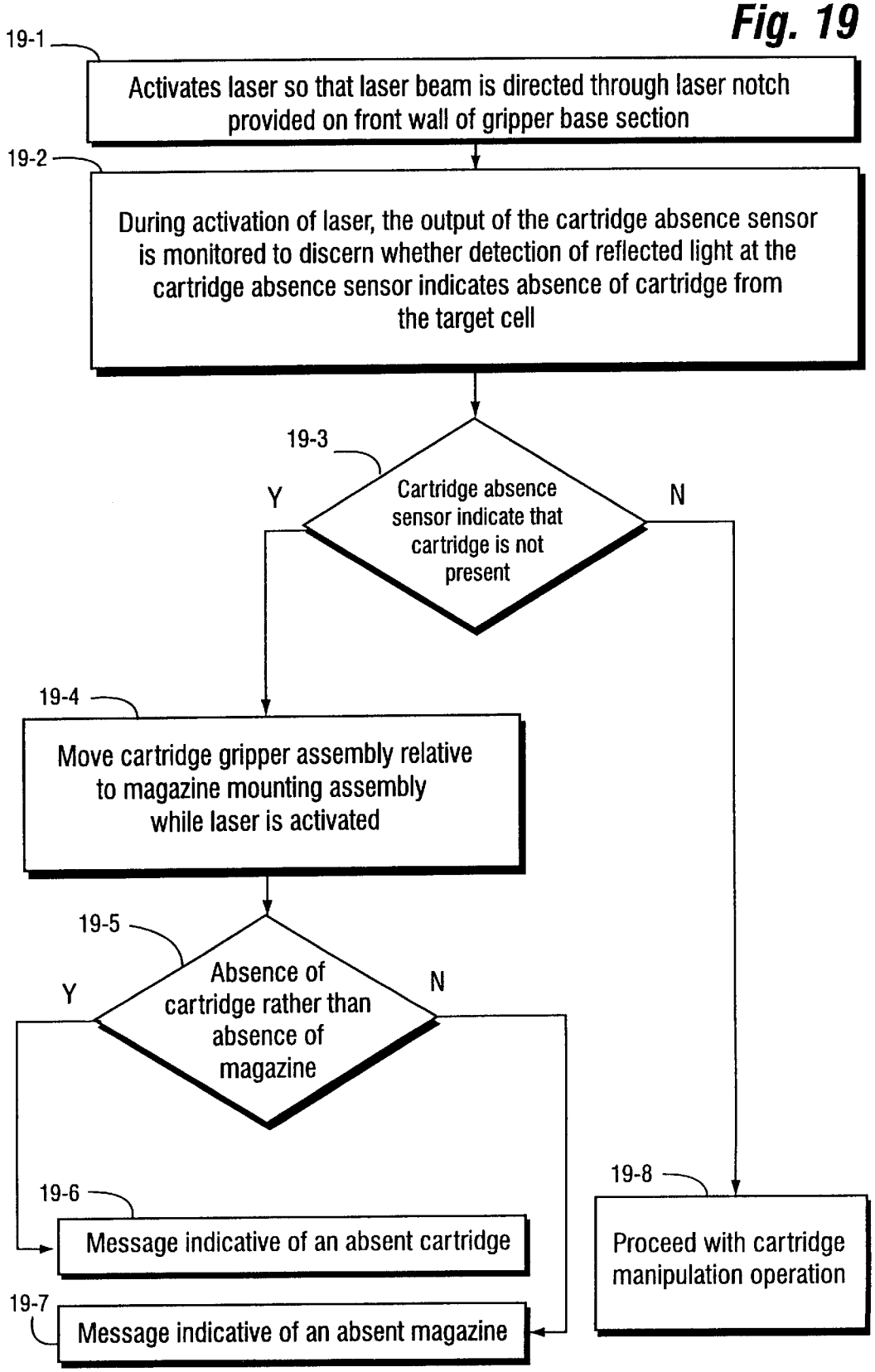
FIG. 19 is a flowchart showing basic steps involved in determining whether a cartridge is present or absent from an expected cell, or even whether cartridge magazine is entirely absent from the library of FIG. 1.

FIG. 19 shows steps involved in determining whether a cartridge is present or absent from an expected cell, or even whether cartridge magazine 70 is entirely absent. In FIG. 19, it is assumed that cartridge gripper assembly 300 has attained the vertical height of the target cell in the manner previously discussed.

At step 19-1, controller 46 activates laser 340 so that beam 342 is directed through laser notch 344 provided on front wall 334 of gripper base section 320. At step is 19-2, during activation of laser 340 an output of cartridge absence sensor 350 is monitored by controller 46 to discern whether detection of reflected light at cartridge absence sensor 350 indicates absence of cartridge 90 from the target cell.

In connection with step 19-2, if cartridge 90 is present in the target cell, beam 342 strikes a surface 500 (that may or may not be reflective) on the front of cartridge 90 as shown in FIG. 16. Surface 500 can be, for example, a label (such as a barcode label) applied to the front of cartridge 90. Beam 342 striking surface 500 results in a reflection which is not seen in a field of view of sensor 350 (represented by cone 504 in FIG. 16 and FIG. 14). With no reflection seen in its field of view 504, at the time of laser activation the cartridge absence sensor 350 has a null or low output, which indicates to controller 46 that cartridge 90 is present in the target cell.

FIG. 16 also shows the alternative scenario in which it is determined at step 19-2 that cartridge 90 is absent from the target cell. In such alternative scenario, laser beam 342 travels into the target cell, travels through aperture 222 in magazine rear wall 220, and strikes reflection plate 130 provided on magazine mounting assembly 60 (see FIG. 4A). The incidence of laser beam 342 on reflection plate 130 provides a reflected illumination which is within the field of view 504 of cartridge absence sensor 350. Receipt of reflected illumination of sufficient amplitude at cartridge absence sensor 350 results in a high signal being transmitted to controller 46, the signal being indicative of the fact that a cartridge 90 is not present in the location of the target cell.

At step 19-3 the controller 46 checks whether the output of cartridge absence sensor 350 indicates that a cartridge was not present. Of course, if a cartridge was present, the cartridge location procedure is completed as indicated by step 19-8 and cartridge manipulation can proceed. Otherwise, unless the presence of cartridge magazine 70 has just been detected in accordance with the steps of FIG. 18, controller 46 must discriminate whether it is the cartridge that is absent or whether the entire cartridge magazine 70 may be missing. In order to perform this discrimination, controller 46 performs necessary ones of steps 19-4 through 19-7.

At step 19-4, controller 46 issues a signal to cause relative displacement of cartridge gripper assembly 300 relative to magazine mounting assembly 60 while laser 340 is activated. That is, controller 46 can either cause drum 50 to rotate by activation of motor 56, or horizontally displace cartridge gripper assembly 300. Step 19-4 thus results in a horizontal sweeping of laser beam 342, and a corresponding sweep of field of view 504 of cartridge absence sensor 350.

Within a predetermined time window the sweeping of the laser beam 342 and field of view 504, the reflected illumination incident on cartridge absence sensor 350 will either remain or will transition to a null, depending on whether cartridge magazine 70 is physically present on magazine mounting assembly 60. If cartridge magazine 70 is present on magazine mounting assembly 60, laser beam 342 and field of view 504 will move from reflection plate 130 to magazine rear wall 220 of magazine mounting assembly 60, thereby causing a transition to a null at cartridge absence sensor 350. On the other hand, if no cartridge magazine 70 is present in magazine mounting assembly 60, the sweeping of laser beam 342 and field of view 504 will continue across an uninterrupted reflection plate 130, so that a null does not occur at cartridge absence sensor 350 within a predetermined period of time.

Step 19-5 thus shows controller 46 determining if a transition of the output signal of cartridge absence sensor 350 occurs, thereby indicating an absence of cartridge 90 rather than an absence (e.g., removal) of cartridge magazine 70. In response to the determination at step 19-5, either a warning/error message indicative of an absent cartridge (step 19-6) or a warning/error message indicative of an absent magazine (step 19-7) is generated by controller 46.

Thus, library 30 of the present invention has two separate reflectivity sensors. Sensor 350 can be used to detect absence of either cartridge 90 or cartridge magazine 70. Sensor 352 is used to read cartridge barcodes and the positional indicia 190. The sensors 350 and 352 are situated in a spaced apart relationship in accordance with positions of the reflective surfaces from which each is prone to receive reflected illumination. Sensor 352 is capable of detecting illumination reflected from the front of a cartridge, while sensor 350 detects illumination reflected from reflection plate 130 of magazine mounting assembly 60 when a cartridge is absent.

When cartridge 90 is provided with a readable label such as a barcode, sensor 352 can be utilized to image the label and provide signals indicative of the label to controller 46. In the present illustration, it is assumed that reflective surface 500 is a barcode label. By activating laser 340 and sweeping laser beam 342 across the bar code label as drum 34 rotates, the barcode of the label can be read and relayed to controller 46.

Assuming that cartridge 90 has been confirmed to be present at a target cell and that the barcode read therefrom confirms that the cartridge 90 is to be moved to another location, cartridge gripper assembly 300 approaches the cartridge 90 in the target cell, engages the cartridge between gripper fingers 400, and retrieves the cartridge as cartridge gripper assembly 300 moves away from the cell. Once clearance of the cell is achieved, cartridge gripper assembly 300 can be moved to a different vertical coordinate, and particularly to the vertical coordinate of the desired or target destination of the selected and now-gripped cartridge. The target position may be either another cell in the same or another magazine mounting assembly 60, or one of the drives in drive section 38 of library 30.

If the target position is another magazine mounting assembly 60, drum 34 is rotated for nominal alignment with the target magazine mounting assembly 60 in anticipation of unloading the selected cartridge into a cell of the other magazine mounting assembly 60. The processing of unloading a gripped cartridge into a cell of the other magazine mounting assembly 60 follows essentially the same steps above depicted with reference to FIG. 18. In other words, at least in a first mode of the invention, the present invention uses the indicia 190 provided on the other magazine mounting assembly 60 in order to precisely locate the other magazine mounting assembly 60, and then to calculate the precise position of the target cell in the target magazine mounting assembly 60. This calibration procedure can be done on initialization or alternatively can be done on-the-fly as the cartridges are moved. The cartridge is carried by cartridge gripper assembly 300 to the precisely determined cell coordinates, with cartridge gripper assembly 300 moving toward the target cell and releasing the cartridge from between gripper fingers 400 and into the target cell.

If the target position is a drive in drive section 38, the controller 46 of the present invention must either now, or must have earlier, precisely locate the target drive. As shown generally in FIG. 1, and shown in more detail diagrammatically in FIG. 20, two vertical columns of drives are provided in drive section 38, with each column having one drive. Thus, the first column has drive $600_{1,1}$, the second column has drive $600_{2,1}$. It should be understood that a greater number of drives can be provided in each column if desired. Each drive 600 has a slot into which cartridge 90 is insertable.

Each column of drives is surmounted by a vertically aligned cartridge storage position 602, in particular calibration cartridge storage position $602_1$ being shown for the drives of the first column (e.g., drive $600_{1,1}$) and calibration cartridge storage position $602_2$ being shown for the drives of the first column (e.g., drive $600_{2,1}$). Thus the cartridge storage position $602_1$ and the cartridge storage position $602_2$, both have a predetermined alignment with their corresponding drives.

Figure 20:
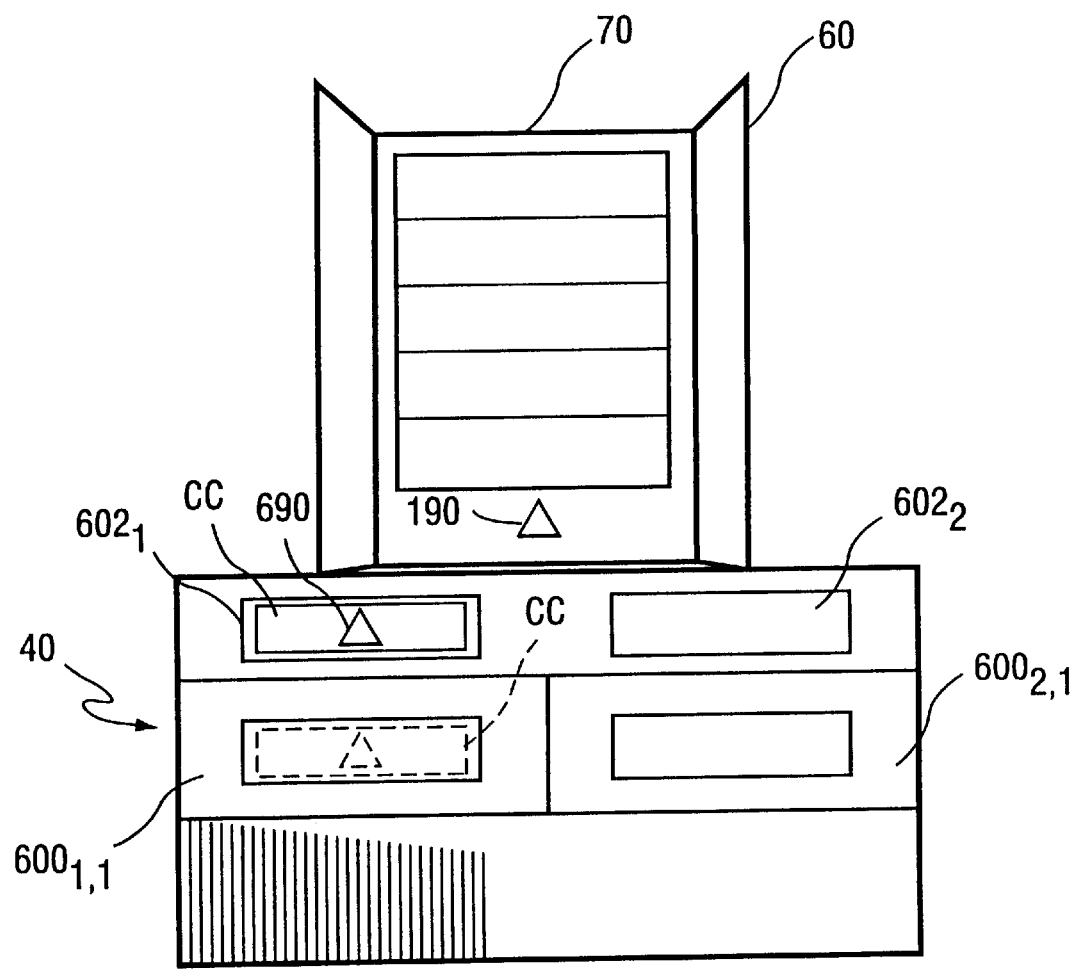
FIG. 20 is a diagrammatic view of portions of the library of FIG. 1, particularly a cabinet and a representative magazine mounting assembly with cartridge magazine aligned therewith.

FIG. 20 shows that a specially configured calibration cartridge CC has been inserted into cartridge storage position $602_1$. Calibration cartridge CC has an indicia 690 provided on a front surface thereof. Indicia 690 is essentially identical to indicia 190 above described with respect to cartridge magazine 70.

As described with reference to the basic steps illustrated in FIG. 21, library 30 uses calibration cartridge CC in order to locate the drives 600. Calibration cartridge CC is normally stored in one of the cartridge storage position $602_1$ and the cartridge storage position $602_2$. At step 21-1 controller 46 prompts cartridge gripper assembly 300 to move to stored coordinates which represent a nominal position of the particular cartridge storage position 602 in which it is anticipated that calibration cartridge CC is stored. At step 21-2, indicia 690 on calibration cartridge CC is used so that controller 46 can acquire an exact coordinate positioning of calibration cartridge CC. Usage of indicia 690 at step 21-2 is analogous to usage of indicia 190 as above described with reference to FIG. 18.

With the precise positioning of calibration cartridge CC known, at step 21-3 the cartridge gripper assembly 300 extracts the calibration cartridge CC from its cartridge storage position 602 and moves the calibration cartridge CC to a nominal vertical position of a vertically aligned drive 600. Then, at step 21-4, the calibration cartridge CC is pushed into the slot of the drive 600 (as indicated by broken lines in FIG. 20). At this point the exact positioning of drive 600 is not necessarily known. In view of this, calibration cartridge CC has beveled leading edges so that, even if not correctly aligned with the drive slot, calibration cartridge CC can nevertheless be inserted and properly seated into the slot of drive 600. The pushing of calibration cartridge CC into the drive slot is accomplished by moving the cartridge gripper assembly 300 in the Z direction using using the motor connected to motor pulley 370 (see FIG. 16) and by actuation of gripper fingers 400.

After calibration cartridge CC has been inserted into drive 600, at step 21-5 the cartridge gripper assembly 300 is backed up (moved rearwardly in the Z direction). Then, at step 21-6, indicia 690 on calibration cartridge CC is read. As understood from the previous discussion, the reading of indicia 690 involves two scans of indicia 690 and the location of a vertex thereof as cartridge gripper assembly 300 is horizontally moved across the front of drive 600, and particularly across indicia 690. Step 21-6 involves calculation similar to those described in FIG. 18 in order to locate the vertex of indicia 690, and thereby acquire exact coordinates of drive 600.

Figure 21:
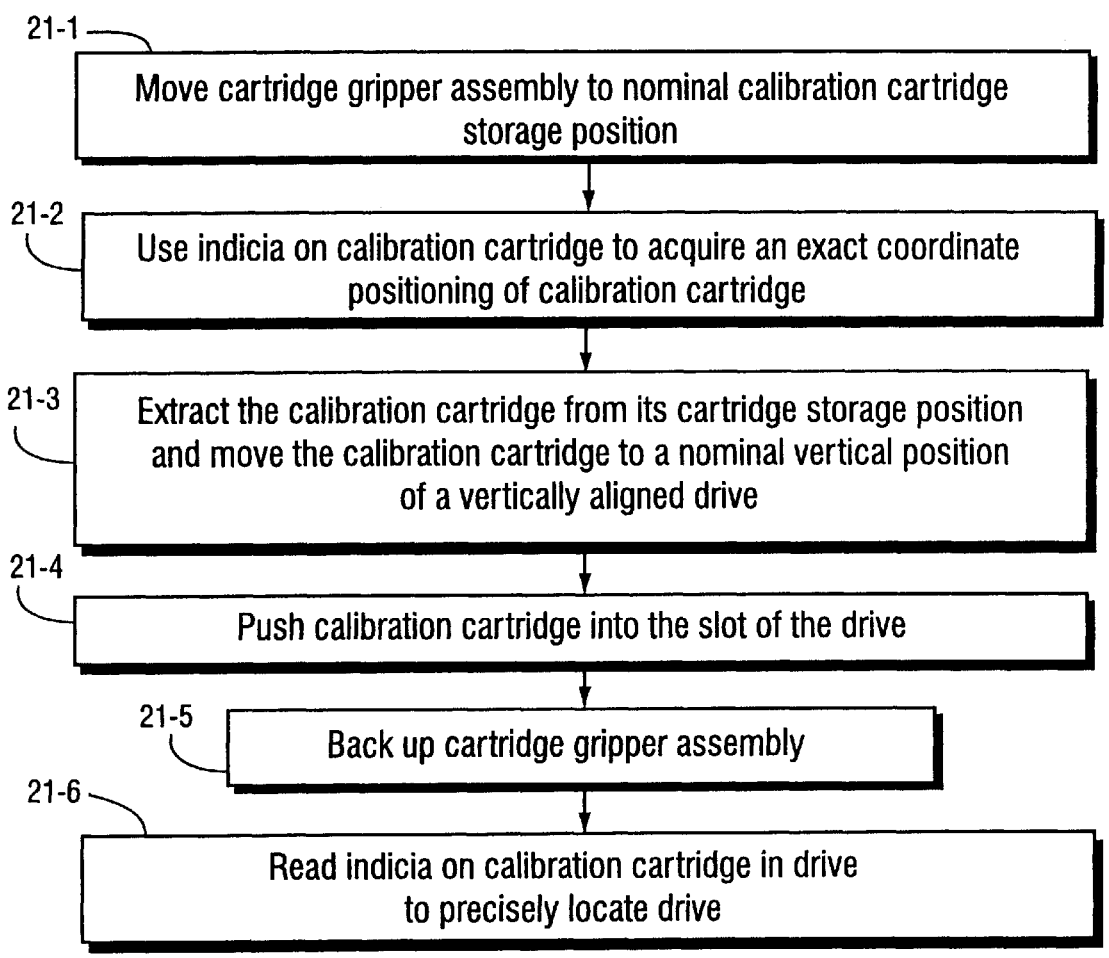
FIG. 21 is a flowchart showing basic steps involved in locating a drive included in the library of FIG. 1.

After the exact coordinates of drive 600 are determined in accordance with the steps of FIG. 21, cartridges engaged by cartridge gripper assembly 300 can be moved between drive 600 and the cells of the magazines 70.

Figure 22:
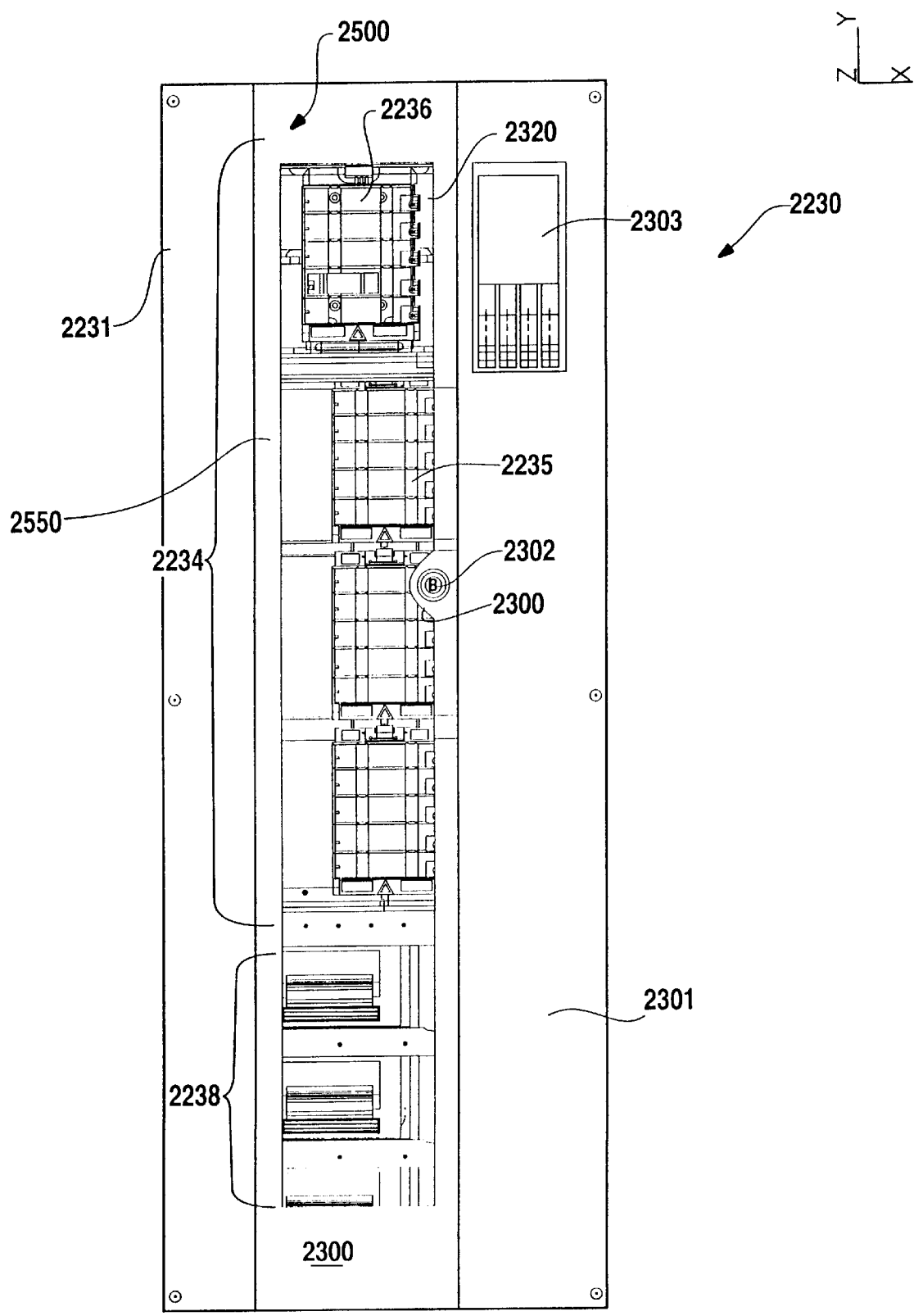
FIG. 22 is a front view of a cartridge library according to another embodiment of the invention.

FIG. 22 shows portions of a cartridge handling library 2230 according to a second embodiment of the invention. The cartridge handling library 2230 has a library cabinet 2231 which substantially encloses the components thereof, including library frame 2232. The second embodiment cartridge library 2230 differs from cartridge library 30 of the first embodiment in several respects. For example, within the library cabinet 2231 the cartridge storage section 2234 comprises plural vertically stacked drums 2235 and a entry/exit magazine carrier 2236. Also enclosed within library cabinet 2231 is a drive section 2238 comprising plural modular drive carrier units 2239 as hereinafter described. The second embodiment cartridge library 2230 also includes a cartridge transport system 2240 which transports cartridges between the magazines in cartridge storage section 2234 and drive section 2238.

Frame 2232 includes a cabinet 2242 upon which vertically stacked drums 2235 of cartridge storage section 2234 are mounted for rotation about axis 44. The plural modular drive carrier units 2239 of drive section 2238 are located in cabinet 2242 below cartridge storage section 2234. A controller 2246, which can take the form of a microprocessor, for example, is located on a rear frame panel of library 2230, and can be mounted on a circuit board. Controller 2246 is operatively connected to the various motors and sensors constituting library 2230 in order to supervise and coordinate operation of library 2230.

Cartridge storage section 2234 comprises a plurality of vertically stacked drums 2250. Each drum 2250 has essentially the same structure of the single drum of the library 30 of the first embodiment. The vertical stacking of drums 50 can be accomplished in several ways. For example, a vertically elongated drum center cylindrical post 2252 can be provided of sufficient height to accommodate three vertically aligned magazine mounting assemblies 60. The person skilled in the art will appreciate with reference to FIG. 6 that a tube section such as tube 258 can be fabricated of sufficient height to have three vertical tiers of magazine mounting assemblies 60 by appropriate arrangement of bores 290, with each vertical tier having six magazine mounting assemblies 60. Rotation of all three thusly-formed drums 2250 is accomplished by a drum motor which is operatively linked to a pulley of at the top of the stack of drums 2235 by a transmission system (e.g., in the manner understood from FIG. 1). The magazine mounting assemblies 60 of the cartridge handling library 2230 of the second embodiment are identical to those of the first embodiment, with three times more of the magazine mounting assemblies 60 being provided in the cartridge handling library 2230 of the second embodiment.

While the stack of drums 2235 of the cartridge handling library 2230 of the second embodiment is illustrated as a three tier vertical stack, it should be appreciated that the plurality of drums 50 employed for the present invention is not limited to three, but that either two or a greater number of drums 50 may be employed.

The library cabinet 2231 of the cartridge handling library 2230 has a hinged library door 2300 formed on a front panel 2301 thereof. The library door 2300 is of sufficient vertical extent that, when opened, library door 2300 permits access to all of cartridge storage section 2234 and drive section 2238. The library door 2300 is operated by a door key 2302. A console 2303, preferably including input keys or buttons and a display panel, is formed on library front panel 2301. When cartridge handling library 2230 is in operation, controller 2246 keeps library door 2300 locked e.g., so that the operations of cartridge transport system 2240 are not interfered with and so that no injury may occur by untimely manual intervention into an interior of library cabinet 2231.

The library door 2300 includes, at its top end, an auxiliary door known as the entry/exit door 2310. The entry/exit door 2310 is a sliding transparent door which forms part of an entry/exit port 2320. The entry/exit magazine carrier 2236, which forms part of cartridge storage section 2234, also forms part of entry/exit port 2320.

The entry/exit magazine carrier 2236 is thus positioned at the top of cartridge storage section 2234. The entry/exit magazine carrier 2236 does not rotate in the manner of the drums 50, but instead reciprocates between a docking position and an entry/exit position. At the entry/exit position, the entry/exit magazine carrier 2236 abuts the rear of the front panel 2301 of library 2230 and thereby forms a partition between an entry/exit compartment and an operation compartment of the library, e.g., the remainder of the interior of the library. In the docking position, a front surfaces of cartridges in the entry/exit magazine carrier 2236 lie in an operative plane OP of the library. The operative plane OP is formed by front surfaces cartridges in an eject position in the drives in drive section 2238 and front surfaces of cartridges in the magazines in the magazine mounting assemblies 60 which are oriented to the front of the library.

Figure 22A:
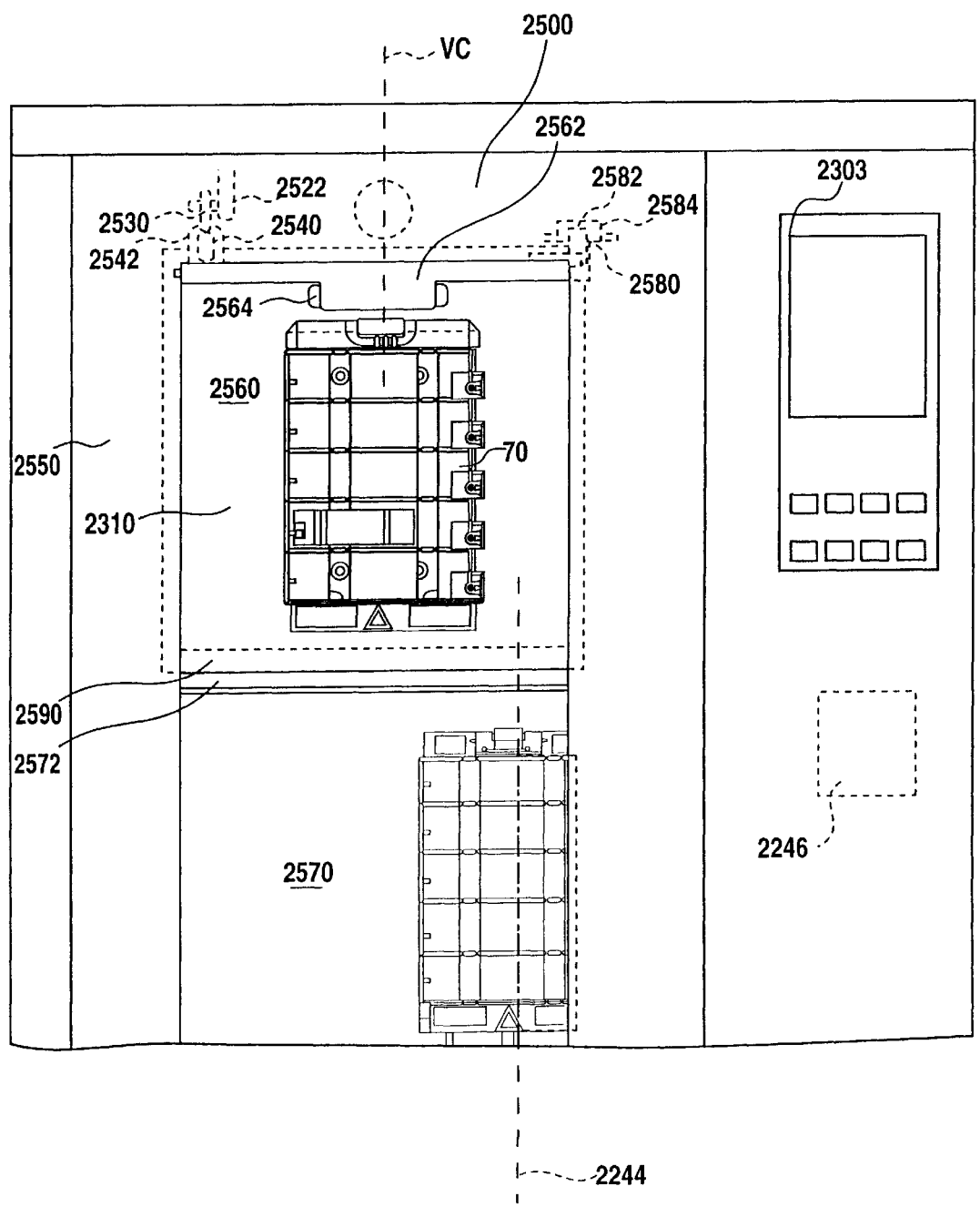
FIG. 22A is a front view of a portion of the cartridge library of FIG. 22, with a front panel removed.

The drums 2235 of cartridge storage section 2234 rotate about an axis 2244 which, like axis 44 of the library 30 of the first embodiment, is the axis of drum center cylindrical post 2252. A plane perpendicular to the operative plane OP and passing through axis 2244 intersects the operative plane OP at a centerline of the operative plane OP. The centerline of the operative plane OP is thus aligned in the X-Y direction with axis 2244 as shown in FIG. 22A. When in the docking position, a vertical centerline VC of entry/exit magazine carrier 2236 is off-set and parallel to the centerline of the operative plane OP. In other words, the vertical centerline of entry/exit magazine carrier 2236 is off-center from the centerline of the operative plane OP.

The entry/exit magazine carrier 2236 is shown in FIG. 24A–FIG. 24D substantially in isolation at the docking position and containing a magazine 70. The entry/exit magazine carrier 2236 comprises a shrouded carrier housing 2330. The shrouded carrier housing 2330 has a top panel 2332; a bottom panel 2334; a left side panel 2336; a right side panel 2338; and a rear panel 2340. The front face of carrier housing 2330, which is oriented toward entry/exit port 2320, is substantially open. Thus, with the exception of the front face of carrier housing 2330, the carrier housing 2330 is substantially entirely enclosed.

Figure 24B:
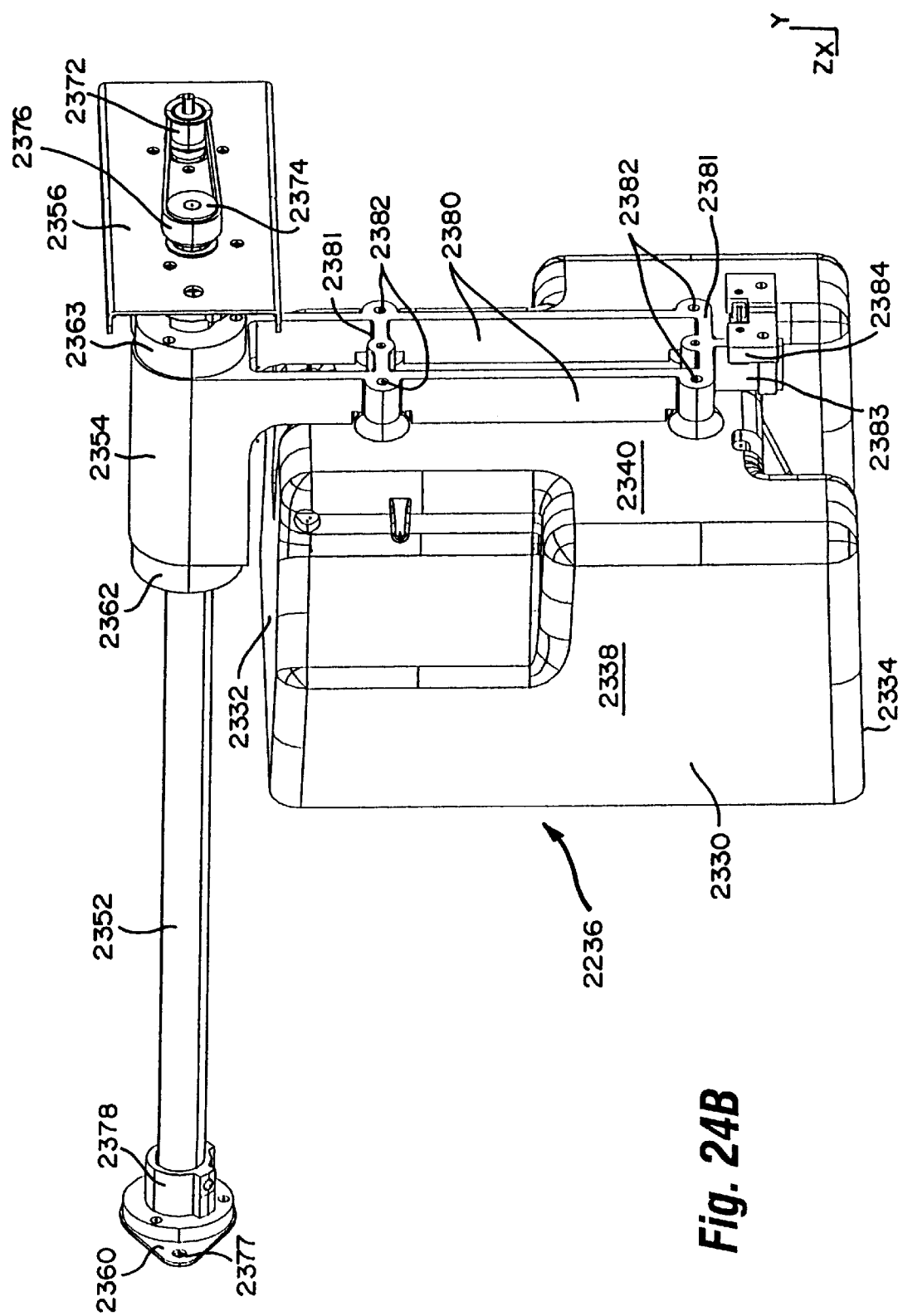
FIG. 24B is a rear perspective view of an entry/exit magazine carrier of the embodiment of FIG. 22, showing the entry/exit magazine carrier in a docking position.
Figure 24C:
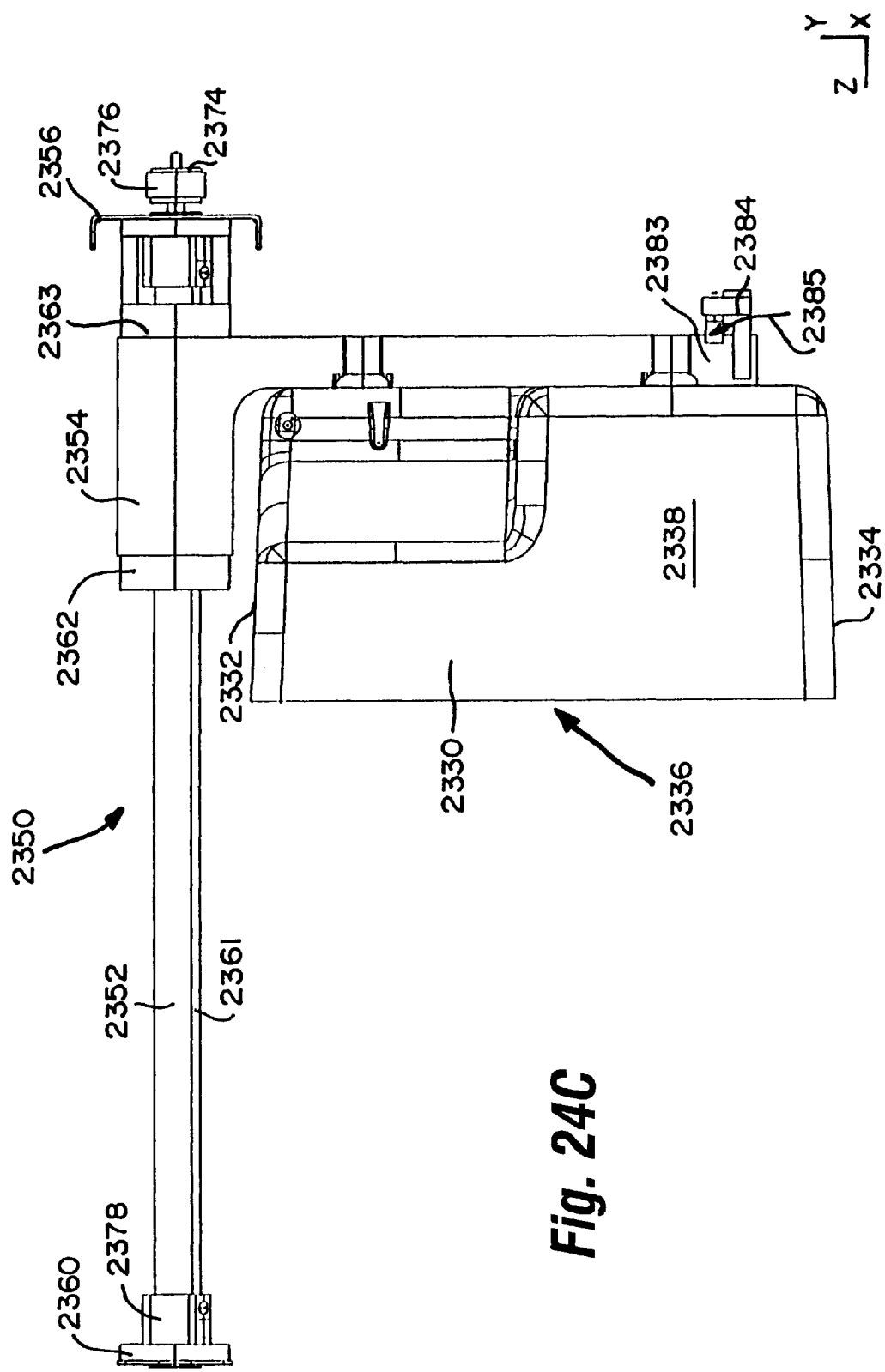
FIG. 24C is a side view of an entry/exit magazine carrier of the embodiment of FIG. 22, showing the entry/exit magazine carrier in a docking position.

As shown e.g., in FIG. 24B and FIG. 24C, at its rear panel 2340 the entry/exit magazine carrier 2236 is connected to a carrier transport assembly 2350. The carrier transport assembly 2350 comprises an unillustrated lead screw; a lead screw enclosure sleeve 2352; an attachment sleeve 2354; a rear mounting bracket 2356; a transport motor 2358; and a front mounting bracket 2360. Lead screw enclosure sleeve 2352 substantially encloses the unillustrated leadscrew, except for a longitudinal aperture 2361 which extends along an underside of lead screw enclosure sleeve 2352. At each end of lead screw enclosure sleeve 2352 is a bearing for engaging respective ends of the lead screw. A rearward end of the leadscrew has an extension which protrudes through an aperture in rear mounting bracket 2356 to be rotatably driven by transport motor 2358 as described below.

Attachment sleeve 2354 is sandwiched between forward sleeve nut 2362 and rear sleeve nut 2363. The nuts 2362 and 2363 are threaded on the interior. The interior threads of nut 2363 engage the unillustrated lead screw. As the lead screw is rotated by transport motor 2358, nut 2363 (which is constrained from rotational motion) translates along the axis of the lead screw. As nut 2363 translates from the docking position to the entry/exit position, is carries attachment sleeve 2354 and the members secured thereto, e.g., entry/exit magazine carrier 2236.

As shown in FIG. 25, rear mounting bracket 2356 is fastened to a vertical partition 2370 of library frame 2232. Both rear mounting bracket 2356 and vertical partition 2370 have aligned motor shaft apertures and aligned apertures formed therein, so that and end of motor shaft with motor pulley 2372 and the extension of the lead screw with pulley 2374 attached thereto extend rearwardly of vertical partition 2370. A transmission belt 2376 is entrained about motor pulley 2372 and lead screw pulley 2374. Lead screw pulley 2374 is thus rotatably driven by transport motor 2358 via transmission belt 2376.

Figure 23:
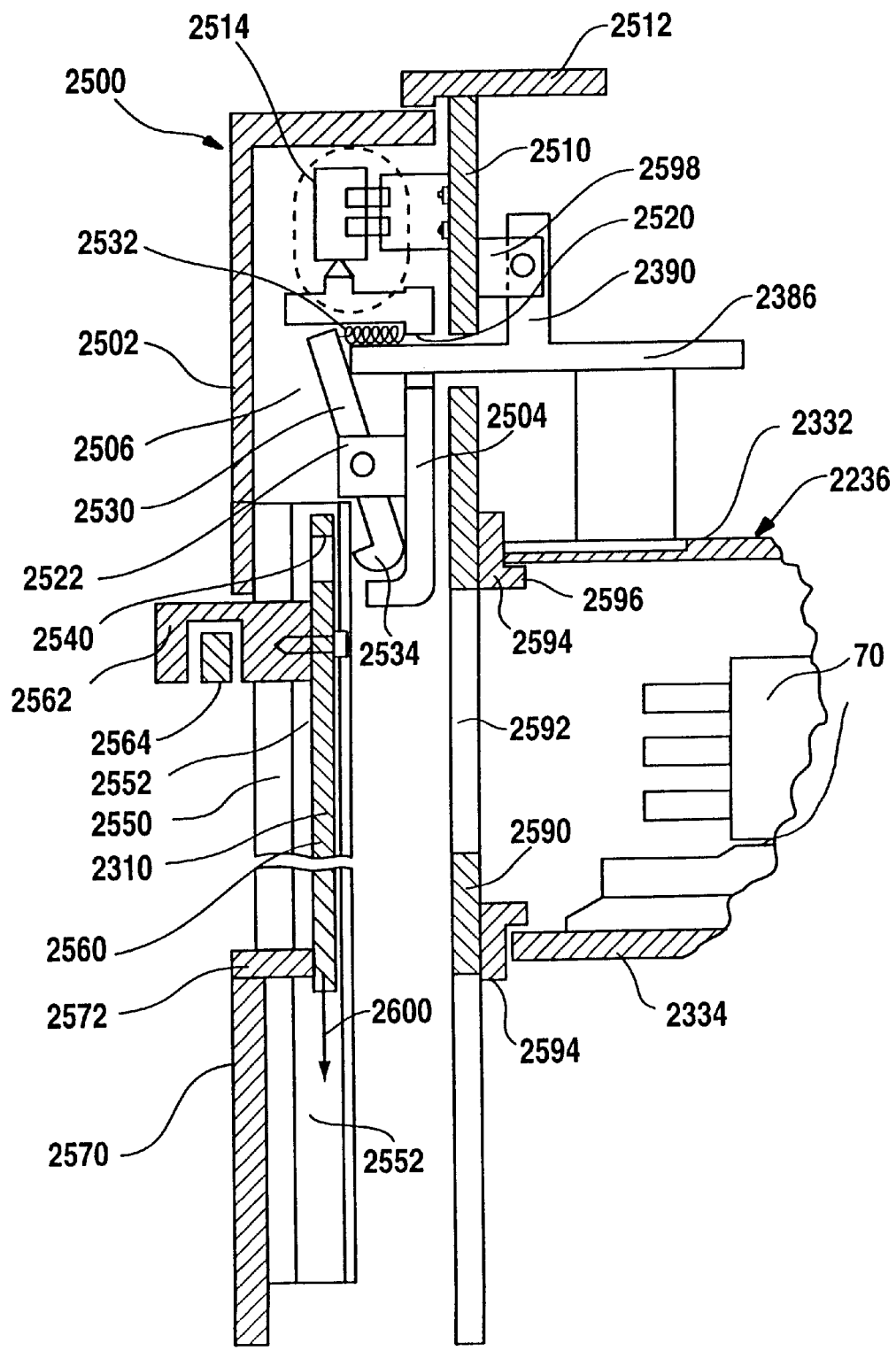
FIG. 23 is a sectioned side view of a portion of the cartridge library of FIG. 22, particularly showing an entry/exit position.

The front mounting bracket 2360 (see FIG. 24A) is mounted to a horizontal cross member 2510 of library frame 2232 by fasteners which extend through holes 2377 (see FIG. 23). The front mounting bracket 2360 has a front mounting sleeve 2378 whose interior receives the front end of lead screw enclosure sleeve 2352.

The attachment sleeve 2354 has an essentially cylindrical shape at its top and, as mentioned above, is sandwiched between nuts 2362 and 2363. Two attachment arms 2380 vertically depend from attachment sleeve 2354 (see FIG. 24B). The attachment arms 2380 are connected at intermediate and bottom positions by crossmembers 2381. The carrier housing 2330 of entry/exit magazine carrier 2236 is secured by fasteners to the crossmembers 2381, as indicated at 2382 e.g. in FIG. 24B and FIG. 26A. The bottom crossmember 2381 has a photointerrupter fin 2383 depending therefrom (see FIG. 24B). When entry/exit magazine carrier 2236 is in the docking position at docking station 2384 (see FIG. 24B and FIG. 24C), photointerrupter fin 2383 interrupts a beam of a docking position sensor 2385. The docking position sensor 2385 is mounted to the frame of library 2230.

Figure 24D:
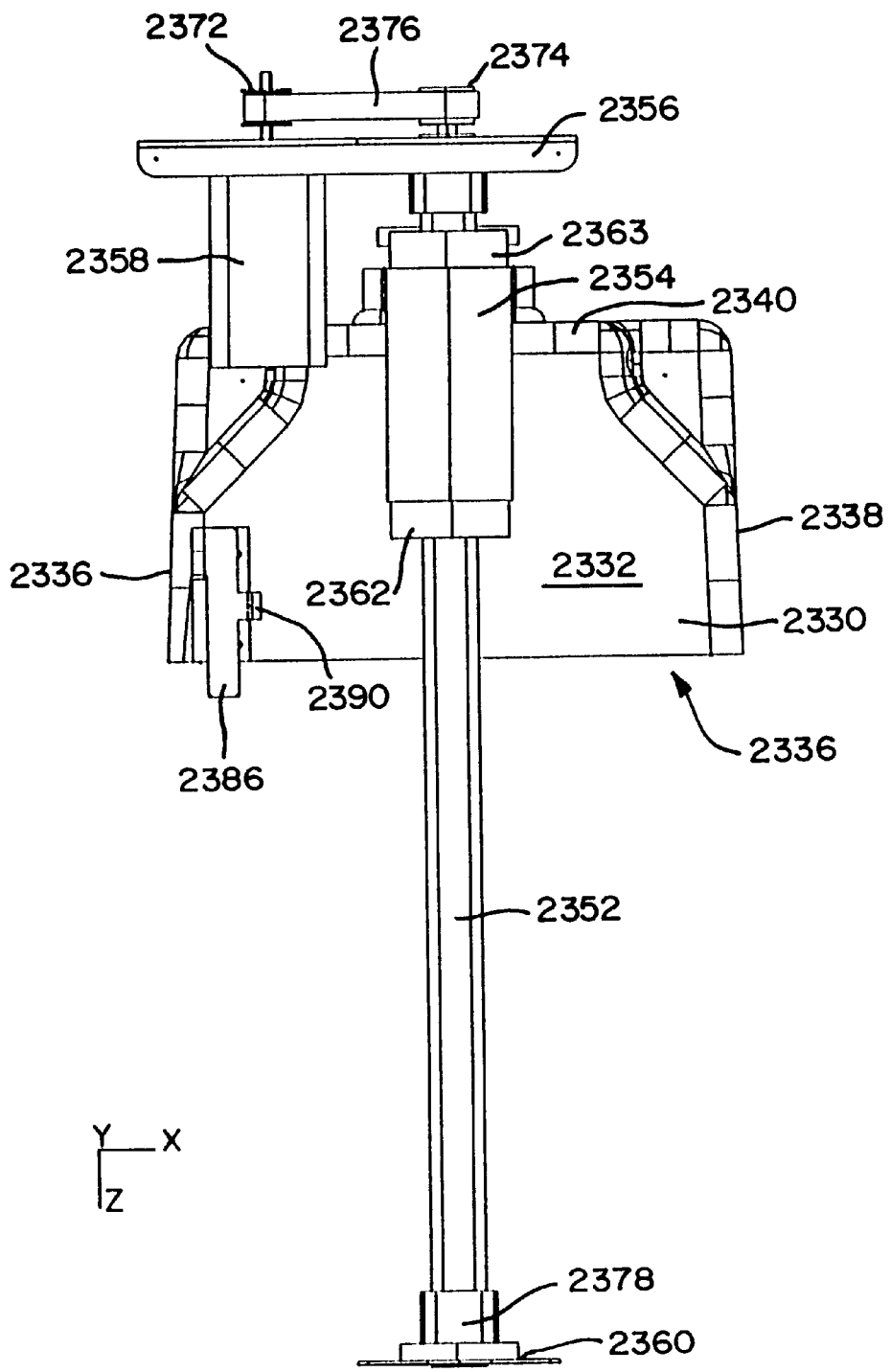
FIG. 24D is a top view of an entry/exit magazine carrier of the embodiment of FIG. 22, showing the entry/exit magazine carrier in a docking position.

On its top panel 2332, entry/exit magazine carrier 2236 has a door opening trip member 2386 secured thereto by fasteners (see FIG. 24D). The door opening trip member 2386 has an upturned cartridge presence trip member 2390 formed thereon. As subsequently explained, the door opening trip member 2386 is employed to unlock entry/exit door 2310.

Figure 26A:
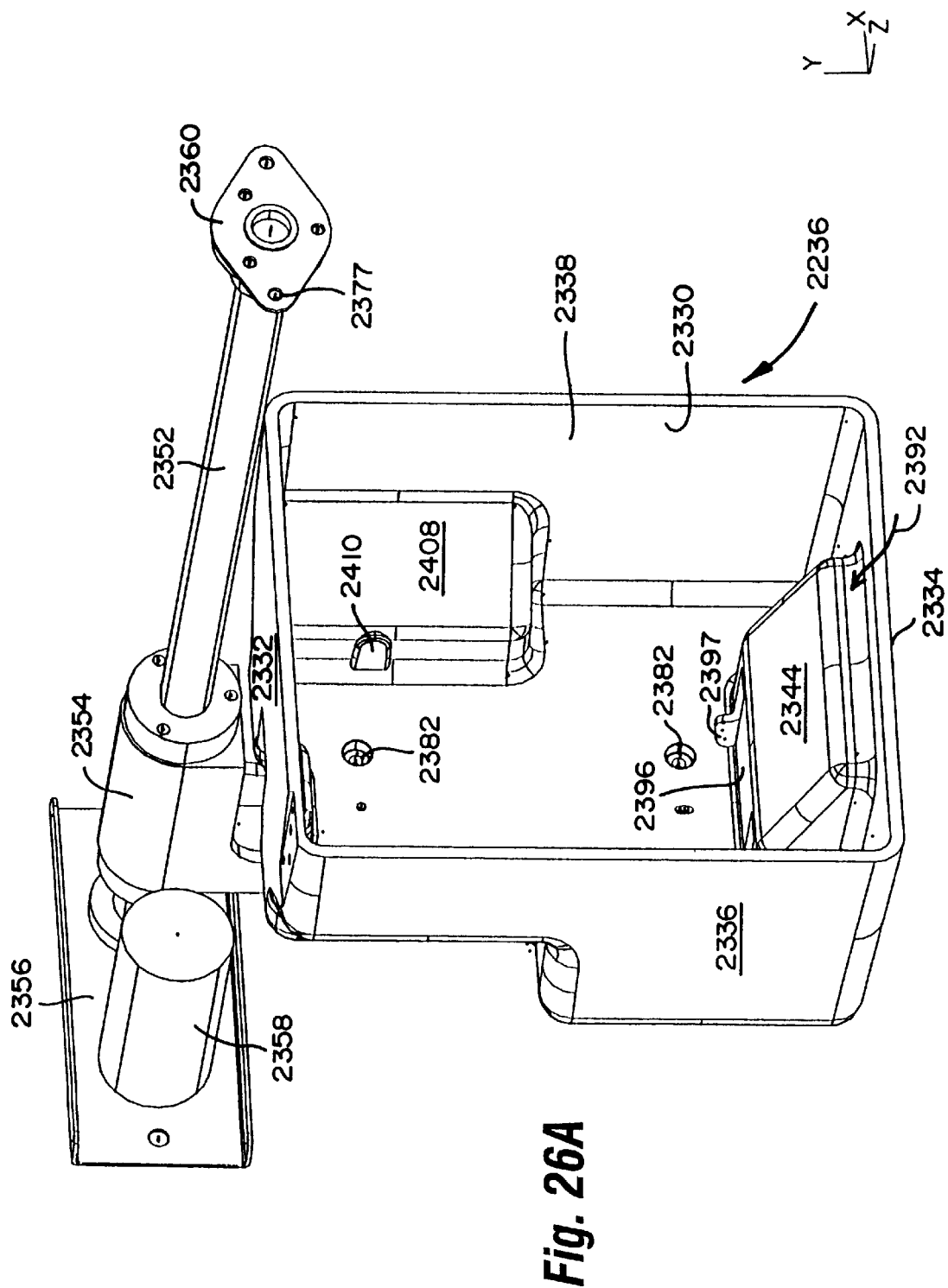
FIG. 26A is a front perspective view of an entry/exit magazine carrier of the embodiment of FIG. 22, showing the entry/exit magazine carrier in a docking position but without a magazine.
Figure 27:
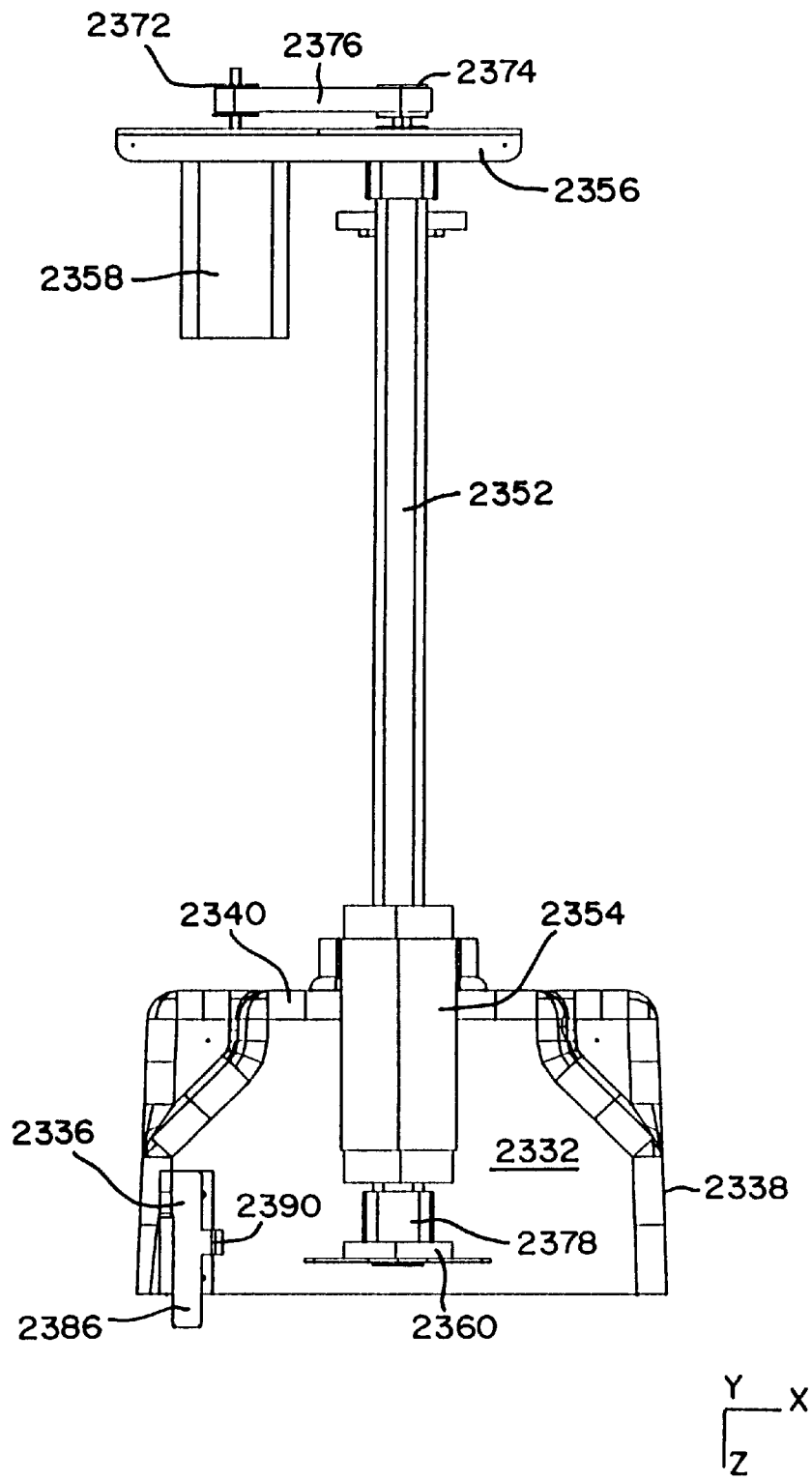
FIG. 27 is a top view of an entry/exit magazine carrier of the embodiment of FIG. 22, showing the entry/exit magazine carrier in an entry/exit position.

FIG. 24A shows entry/exit magazine carrier 2236 with a magazine 70 selectively mounted therein. As explained subsequently, when the entry/exit magazine carrier 2236 is in its entry/exit position at the entry/exit port 2320, an operator can open entry/exit door 2310 and remove the magazine 70 from entry/exit magazine carrier 2236. FIG. 26A and FIG. 26B show entry/exit magazine carrier 2236 with magazine 70 removed.

FIG. 26A and FIG. 26B accordingly show interior features of entry/exit magazine carrier 2236 which facilitate retention of magazine 70 therein. The interior surface of bottom panel 2334 has a magazine pedestal 2392 formed thereon. The magazine pedestal 2392 has top surface including both a forward ramped top surface portion 2394 and a rear flat surface portion 2396. The flat surface portion 2396 has two cavities 2397 formed thereon in spaced apart relation to receive the corresponding inverted triangle projections on the underside of magazine shelf 180 (see FIG. 11).

The left side panel 2336 and right side panel 2338 have upper rear quadrant sections thereof formed to provide indented left side and right side panel segments 2406 and 2408, respectively. The interior surfaces of the left side and right side panel segments 2406 and 2408 are spaced apart with just sufficient clearance to accommodate insertion of magazine 70 therebetween. The right side panel segment 2408 has a resilient tang 2410 formed thereon to guide and locate magazine 70 between the left side and right side panel segments 2406 and 2408.

When entry/exit magazine carrier 2236 is in the docking position, the cartridge transport system 2240 can transport cartridges between any of the magazines 70 lying in the operative plane OP (including the magazine 70 mounted in the entry/exit magazine carrier 2236) and the drives in drive section 2238. For example, the cartridge transport system 2240 can unload cartridges initially positioned in the magazine 70 of entry/exit magazine carrier 2236, so that those cartridges are relocated to other magazines in the drum section of cartridge storage section 2234. Conversely, cartridge transport system 2240 can load the magazine 70 of entry/exit magazine carrier 2236 with one or more cartridges which are to be removed from cartridge handling library 2230. The cartridge handling library 2230 can rotate drums 2235 in its cartridge storage section 2234 so that a desired magazine mounting assembly 60, and hence a desired cartridge or magazine cell, is oriented toward the operative plane OP and thus available for loading or cartridge removal.

The entry/exit position of entry/exit magazine carrier 2236 is shown in more detail in FIG. 23. FIG. 23 shows how entry/exit door 2310 is formed in library 2230, as well as how shrouded entry/exit magazine carrier 2236 lies flush against the library frame when in the entry/exit position. The library door 2300 has a perimeter frame which includes a top frame section 2500. The top frame section 2500 of library door 2300, which is essentially a hollow rectangle as viewed in cross section in FIG. 23, has a front panel 2502 and a rear panel 2504 between which a cavity 2506 is formed. The top frame section 2500 is aligned to cover a front vertical wall 2510 of library frame 2232. The library frame 2232 also has a top wall 2512 as also shown in FIG. 23. The library door 2300 is hinged to front vertical wall 2510, as shown by hinge components encircled by broken line 2514 in FIG. 23.

The rear panel 2504 of top frame section 2500 has an aperture 2520 formed therein through which a forward end of door opening trip member 2386 extends in the entry/exit position. Below and to a side of aperture 2520 a bracket 2522 forwardly extends from rear panel 2504 into cavity 2506. A entry/exit door lock lever 2530 is pivotally attached to bracket 2522. The entry/exit door lock lever 2530 is biased (e.g., by spring 2532) so that a distal hook 2534 of entry/exit door lock lever 2530 engages an aperture 2540 formed at an oblong protruding top corner 2542 of entry/exit door 2310 (see also FIG. 22A).

The perimeter frame which of library door 2300 has a left side frame section 2550. Below top frame section 2500 the left side frame section 2550 has a entry/exit door track 2552 formed therein to accommodate the up and down sliding of entry/exit door 2310. The entry/exit door 2310 comprises a transparent panel 2560 which rides in opposing entry)/exit door tracks 2552 formed on opposing left and right side frame sections of library door 2300. The transparent panel 2560 has a handle rim 2562 secured by fasteners to an outer surface of a top edge thereof. The handle rim 2562 has biased actuator grips 2564 which act through an unillustrated linkage on the underside and interior of handle rim 2562 and thereby retract or extend detents against left side frame section 2550 for positioning the entry/exit door 2310 at selective vertical positions along left side frame section 2550.

The library door 2300 also includes a transparent panel 2570 which extends between opposing left and right side frame sections of library door 2300. A top edge of transparent panel 2570 is surmounted by a lip 2572 which serves as a gasket between transparent pan(e 2570 and the transparent panel 2560 of entry/exit door 2310 which is slidable therebehind in entry/exit door tracks 2552.

As shown in FIG. 22A, at its upper right hand comer the handle rim 2562 of entry/exit door 2310 has an entry/exit door close flange 2580 which extends rearwardly therefrom and, at its distal rear edge, has an upturned photointerrupter 2582 formed thereon. When the entry/exit door 2310 has been returned to its fully closed (i.e., maximum vertical position) as shown in FIG. 22A, the photointerrupter 2582 of entry/exit door close flange 2580 interrupts a beam of door close sensor 2584. The door close sensor 25 84 is mounted on a rear surface of front vertical wall 2510 of library cabinet 2231 (see also FIG. 23).

The library cabinet 2231, in addition to having the front vertical wall 2510, has a crossmember 2590 which extends horizontally in proximity to lip 2572 on transparent panel 2570. An aperture 2592 thus extends between front vertical wall 2510 and crossmember 2590. On its interior the aperture 2592 has fastened to its perimeter a gasket-like flange 2594. The flange 2594 has an inward lip 2596. When entry/exit magazine carrier 2236 is in the entry/exit position, the top panel 2332 of entry/exit magazine carrier 2236 overlaps inward lip 2596 and the bottom panel 2334 of entry/exit magazine carrier 2236 underlaps 2596 (see FIG. 23). Moreover, when entry/exit magazine carrier 2236 is in the entry/exit position shown in FIG. 23, the carriage presence interrupter 2390 carried by door opening trip member 2386 interrupts a entry/exit magazine carrier presence sensor 2598. The entry/exit magazine carrier presence sensor 2598 is mounted on a rear surface of front vertical wall 2510.

Figure 28:
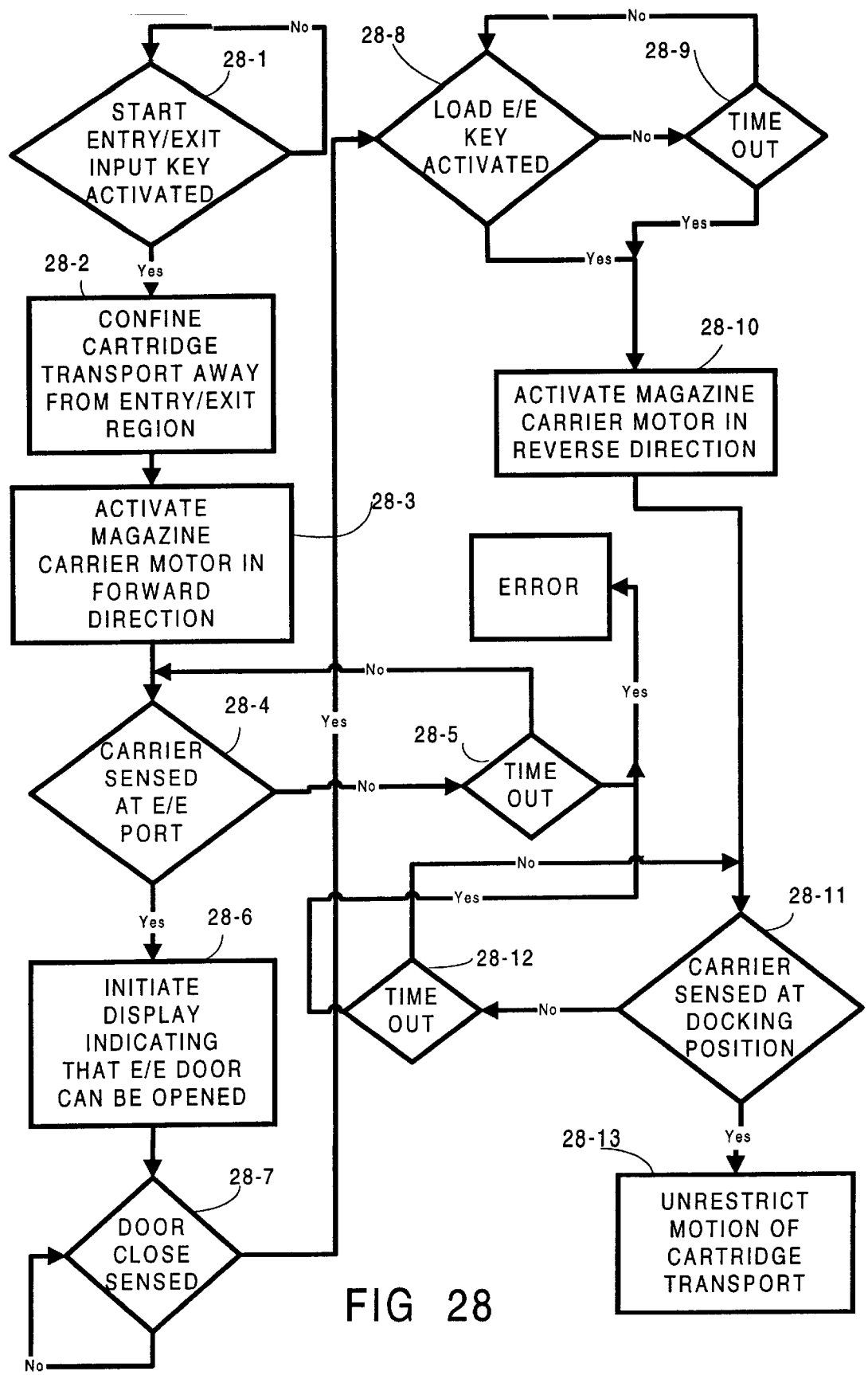
FIG. 28 is a flowchart of an entry/exit routine performed by the cartridge library of the embodiment of FIG. 22.

An operator can use the entry/exit port 2320 in order to conveniently load one or more cartridges into, or remove one or more cartridges from, cartridge handling library 2230 while keeping cartridge handling library 2230 operational (e.g., cartridge transport system 2240 is; permitted to continue is movement). In order to actuate the entry/exit port 2320, the operator activates an appropriate entry/exit input key on console 2303. Activation of the entry/exit input button or key on console 2303 causes controller 2246 to perform an entry/exit routine. Basic steps of the entry/exit routine are shown in FIG. 28.

Step 28-1 of the entry/exit routine shows controller 2246 receiving a signal corresponding to activation of the start entry/exit input key on console 2303. Upon initiation of the entry/exit routine, at step 28-2 the controller 2246 precludes movement of cartridge transport system 2240 into the upper part of library cabinet 2231 occupied by the entry/exit magazine carrier 2236. The cartridge transport system 2240 remains free, however, to move in portions of library cabinet 2231 where cartridge transport system 2240 can perform all other functions, such as the servicing of the drums 2235 and drives in drive section 2238.

With the cartridge transport system 2240 appropriately confined not to interfere with entry/exit magazine carrier 2236, at step 28-3 a signal is sent to activate transport motor 2358 so that the entry/exit magazine carrier 2236 moves in the forward direction, i.e., from the docking position at the operative plane OP to the entry/exit position proximate the entry/exit port 2320. The person skilled in the art will understand that actuation of transport motor 2358 causes rotation of motor pulley 2372, which rotation is transmitted by transmission belt 2376 to lead screw pulley 2374, so that the threaded lead screw in lead screw enclosure sleeve 2352 rotates. Rotation of the lead screw causes attachment sleeve 2354, and consequentially the entry/exit magazine carrier 2236 attached thereto, to translate to the entry/exit position, i.e., to the left in FIG. 24B and to the bottom of the sheet in FIG. 24D.

Translation of entry/exit magazine carrier 2236 toward the entry/exit position continues until door opening trip member 2386 strikes the top of entry/exit door lock lever 2530, thereby causing entry/exit door lock lever 2530 to pivot counterclockwise as shown in FIG. 23 and thereby disengaging distal hook 2534 from aperture 2540 of entry/exit door 2310. In addition, the carriage presence interrupter 2390 interrupts the beam of entry/exit magazine carrier presence sensor 2598, which is sensed at step 28-4. If the entry/exit magazine carrier 2236 is not sensed within a predetermined time, a timeout occurs (step 28-5). When the carriage presence sensor FIG. 22A senses the sensor trip member 2386, the open face of the entry/exit magazine carrier 2236 is essentially flush with the rear surface of the library wall in which the entry/exit door 2310 is formed as shown in FIG. 23. At such time, the entry/exit magazine carrier 2236 essentially serves as a partition to define a confined subcompartment of the library interior.

As shown in FIG. 22A, the mouth of entry/exit magazine carrier 2236 is larger in both vertical and horizontal extent (in the plane of the library front panel) than the aperture in which entry/exit door 2310 resides. However, the open face of magazine 70 is considerably smaller in those dimensions than the aperture in which entry/exit door 2310.

After the entry/exit magazine carrier 2236 is sensed at step 28-4, at step 28-6 controller 2246 sends a signal to console 2303 to provide a display advising that the entry/exit door 2310 can now be opened. After the entry/exit door 2310 is unlocked, the operator is free to open the entry/exit door 2310 by sliding the transparent panel downward as indicated by arrow 2600 in FIG. 23. The operator then can remove, through the entry/exit door 2310, the entire magazine 70 from the entry/exit magazine carrier 2236. In this regard, the magazine 70 simply snaps out from between the left side and right side panel segments 2406 and 2408 (including tang 2410) and from between the tangs 2397 formed on flat surface portion 2396 of the magazine pedestal of the entry/exit magazine carrier 2236. After retrieving the magazine 70 from the entry/exit magazine carrier 2236, the operator can load and/or unload cartridges from the retrieved magazine 70, and then return the same magazine 70, or another magazine, through the entry/exit door 2310 to the entry/exit magazine carrier 2236. Alternatively, the operator can keep magazine 70 retained in the entry/exit magazine carrier 2236, and merely add or remove cartridges from the magazine 70 retained in the entry/exit magazine carrier 2236.

Significantly, while the operator can reach into the subcompartment defined by the entry/exit magazine carrier 2236 at the entry/exit position in order to remove or insert either the magazine 70 or cartridges therein, the operator cannot reach beyond the entry/exit magazine carrier 2236 into other portions of the library interior. Thus, the entry/exit magazine carrier 2236 precludes manual penetration into the interior of the cabinet beyond the magazine carrier 2236.

After the operator has completed the desired cartridge and/or magazine operations, the operator shuts the entry/exit door 2310 by depressing the actuator grips 2564 on handle rim 2562 and slides entry/exit door 2310 in the direction opposite to arrow 2600 (see FIG. 23). When the entry/exit door 2310 has reached its maximum vertical travel, the photointerrupter 2582 on handle rim 2562 interrupts door close sensor 2584. Step 28-7 illustrates controller 2246 determining whether door close sensor 2584 has detected full closure of entry/exit door 2310. The controller 2246 continues to check for full closure of entry/exit door 2310 until door close sensor 2584 confirms closure.

After door closure the operator can activate a load entry/exit input key on console 2303. FIG. 28 shows controller 2246 at step 28-8 sensing a signal created by activation of the load entry/exit input key. If the load entry/exit input key is activated, or a timeout (step 28-9) occurs with the load entry/exit input key not having been activated, at step 28-10 the controller 2246 issues a signal to transport motor 2358 in order to transport the entry/exit magazine carrier 2236 in the reverse direction, i.e., from the entry/exit position to the docking position. As the magazine carrier 2336 leaves the entry/exit position, the distal hook 2534 on entry/exit door lock lever 2530 engages the aperture 2540 on entry/exit door 2310. When it reaches the docking position, the carrier will have its open face aligned with the operative plane OP.

The translation of the entry/exit magazine carrier 2236 toward the docking position at step 28-10 continues until the entry/exit magazine carrier 2236 is sensed at the docking position at step 28-11. Sensing of the entry/exit magazine carrier 2236 occurs as photointerrupter fin 2383 interrupts docking position sensor 2385. If the entry/exit magazine carrier 2236 is not sensed at the docking position within a predetermined time (step 28-12), a time out error occurs.

After the entry/exit magazine carrier 2236 is sensed at step 28-11 at the docking position, the controller 2246 issues a signal at step 28-13 which permits the cartridge transport system 2240 to have unrestricted motion throughout the interior of cartridge handling library 2230. That is, upon completion of step 28-13, the cartridge transport system 2240 can also access the entry/exit magazine carrier 2236 which now is located at the docking position and thus is in the operative plane OP of the cartridge handling library 2230.

Thus, the translation of the entry/exit magazine carrier 2236 from the docking position to the entry/exit position, and the return translation of the entry/exit magazine carrier 2236 from the entry/exit position to the docking position, constitutes a reciprocating motion of the entry/exit magazine carrier 2236 along a linear axis. The linear axis of reciprocation of the entry/exit magazine carrier 2236 is parallel to a direction in which a cartridge is inserted into a magazine 70 in the library, either manually at the entry/exit or automatically by cartridge transport system 2240 at the operative plane OP.

Figure 29:
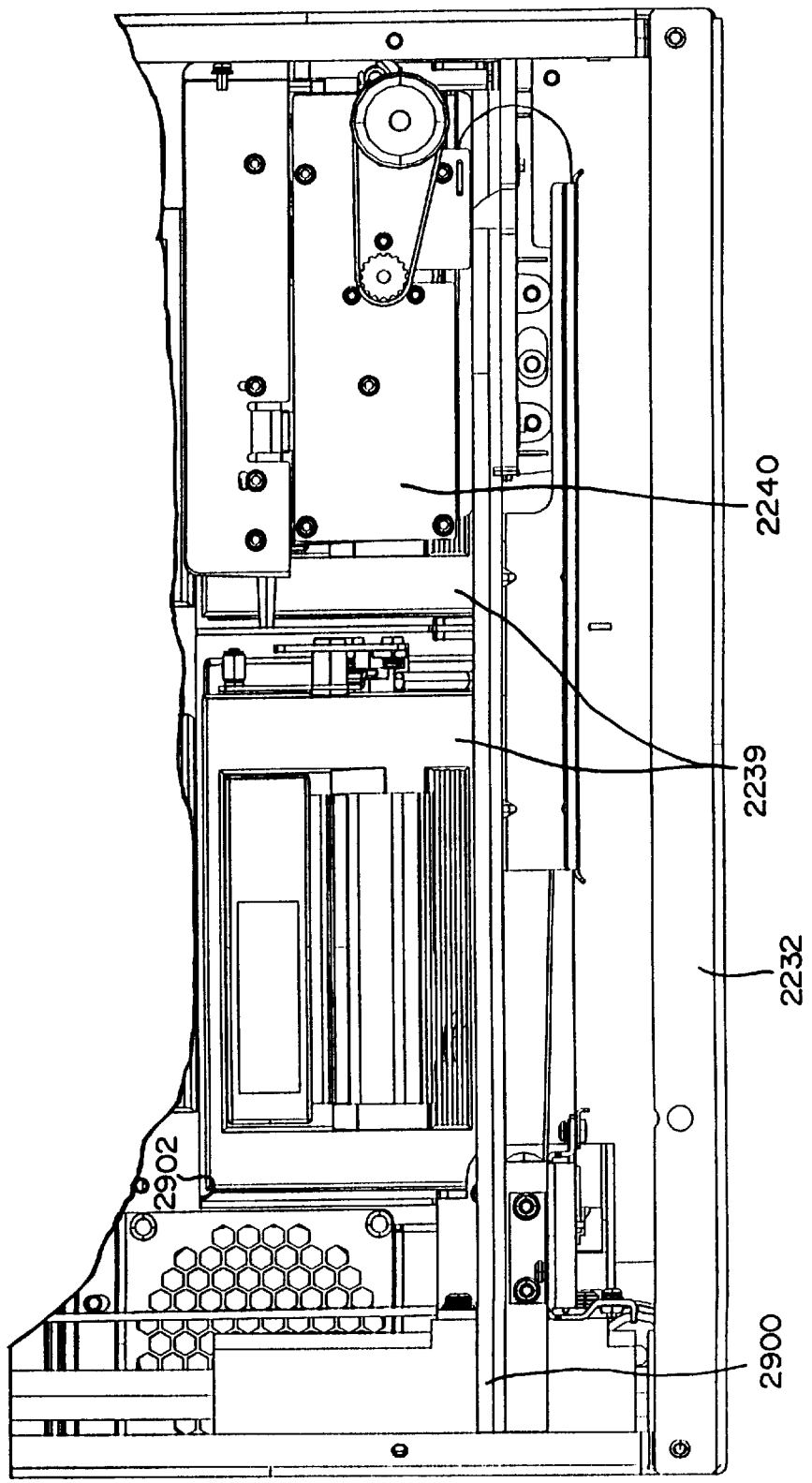
FIG. 29 is a front view of a bottom portion of the cartridge library of FIG. 22, with a front panel removed.

FIG. 29 shows a bottom portion of cartridge handling library 2230, and particularly a portion of drive section 2238. Whereas in cartridge handling library 2230 the drive section 2238 includes six modular drive carrier units 2239, only a bottom pair of side-by-side two modular drive carrier units 2239 are shown in FIG. 29 (as well as in FIG. 30 and FIG. 31). Of the bottom pair of drive carriers 2239, in FIG. 29 the right drive carrier is partially obscured by cartridge transport system 2240. Each pair modular drive carrier units 2239 is mounted on a horizontal shelf 2900 of library frame 2232. Thus, although unillustrated, it should be understood that there are three horizontal shelves 2900 for forming a left column and a right column of drive carrier units 2239. The left column of drive carriers 2239 is mounted in vertical alignment below an unillustrated cleaning cartridge holder. The right column of driver carriers 2239 is mounted in vertical alignment below an unillustrated calibration block holder.

Figure 30:
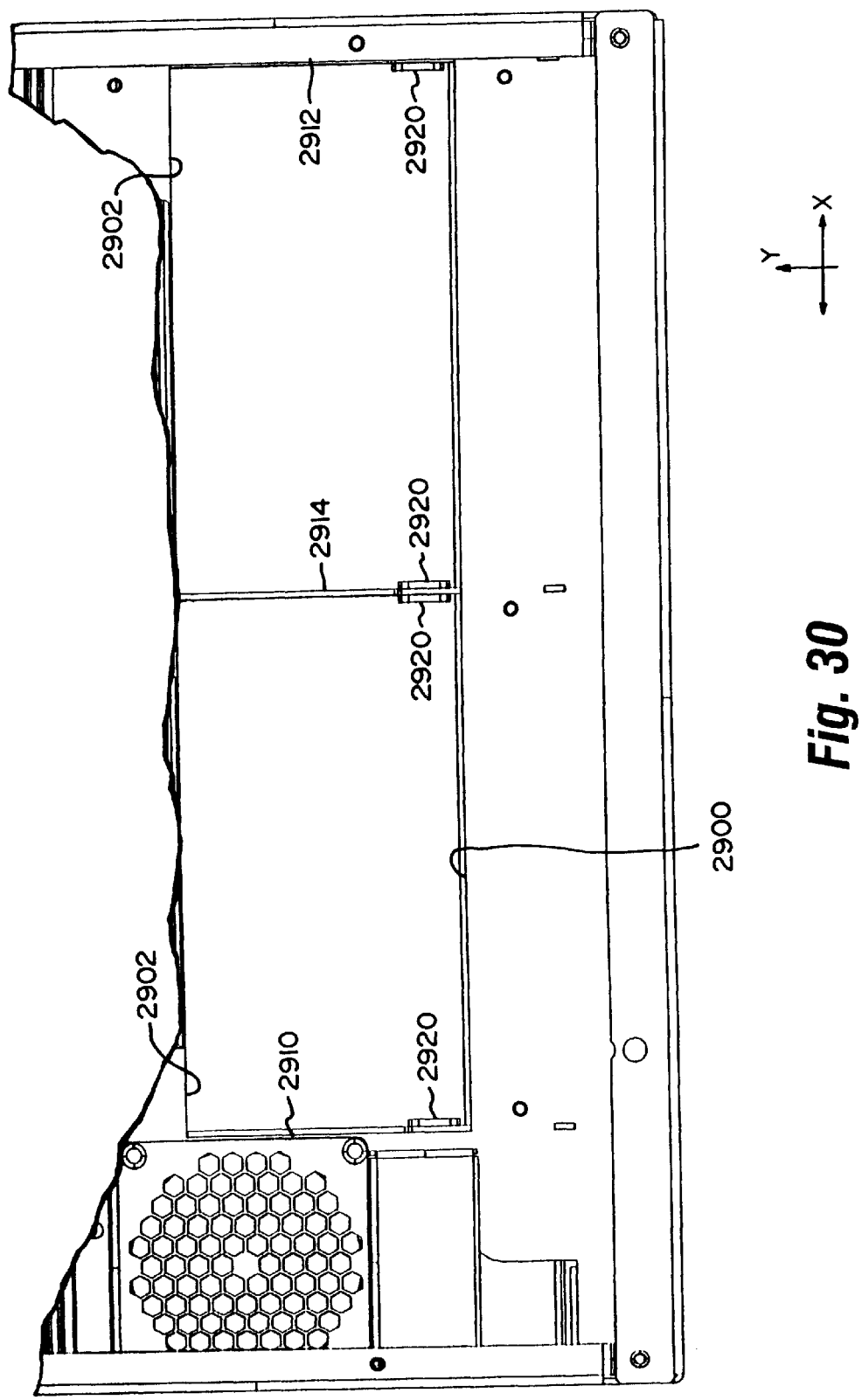
FIG. 30 is a front view of a bottom portion of the cartridge library of FIG. 22, with a front panel, cartridge transport system, and drive carriers removed.

The drive carrier bays 2902 are better shown in FIG. 30, in which the pair of modular drive carrier units 2239 and portions of cartridge transport system 2240 are removed. The entire compartment region of drive section 2238 for a pair of horizontally aligned drive carriers 2239 comprises a left vertical wall 2910; a right vertical wall 2912; an a vertical center wall 2914. Facing the interior of the drive carrier bays 2902, each of the vertical walls has retainer elements 2920 formed or attached on a front lower edge thereof. The vertical center wall 2914 thus has a retainer element 2920 formed on both the left and right sides thereof.

Figure 31:
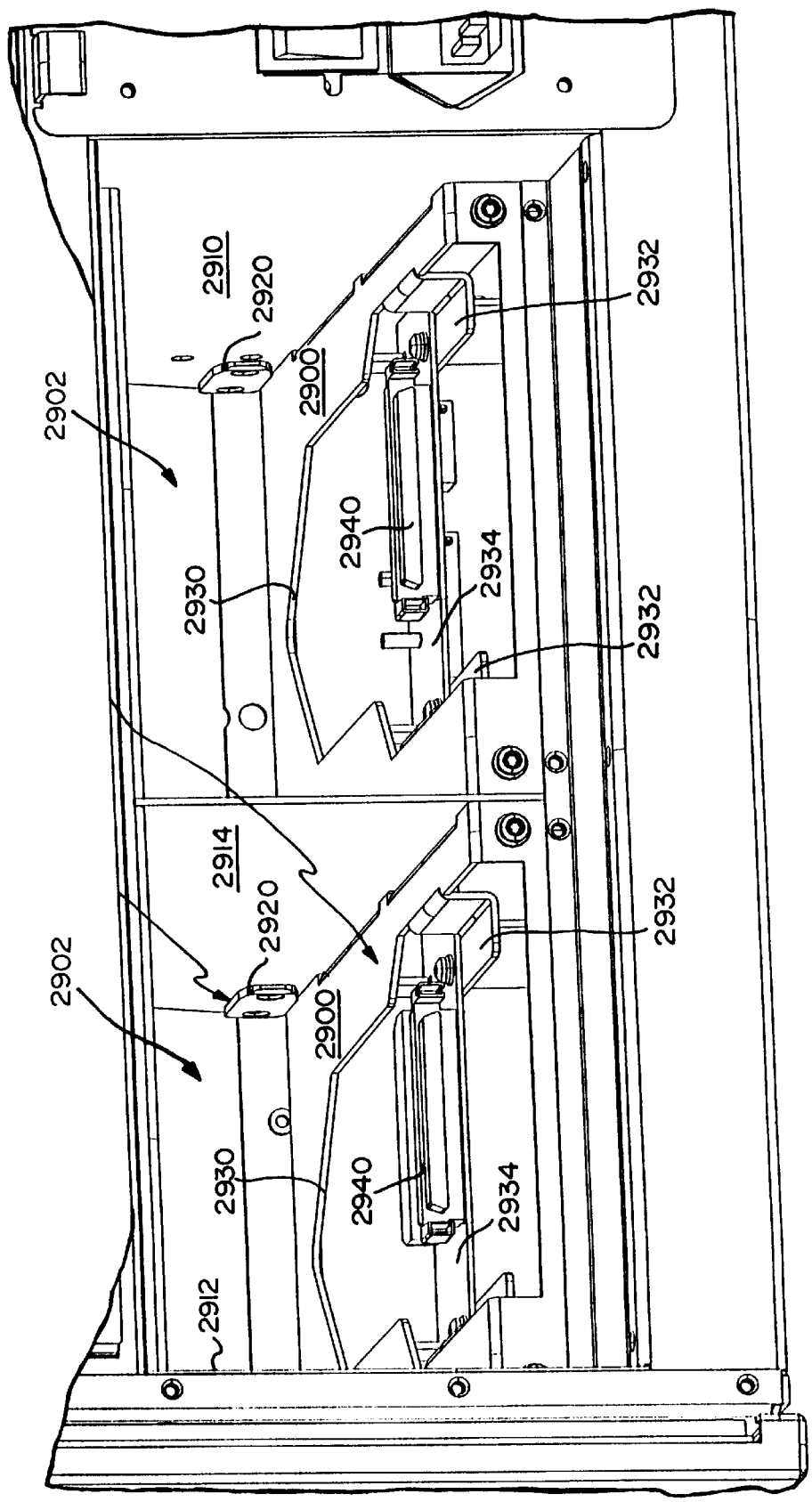
FIG. 31 is a rear perspective view of a bottom portion of the cartridge library of FIG. 22, with drive carriers removed.
Figure 32:
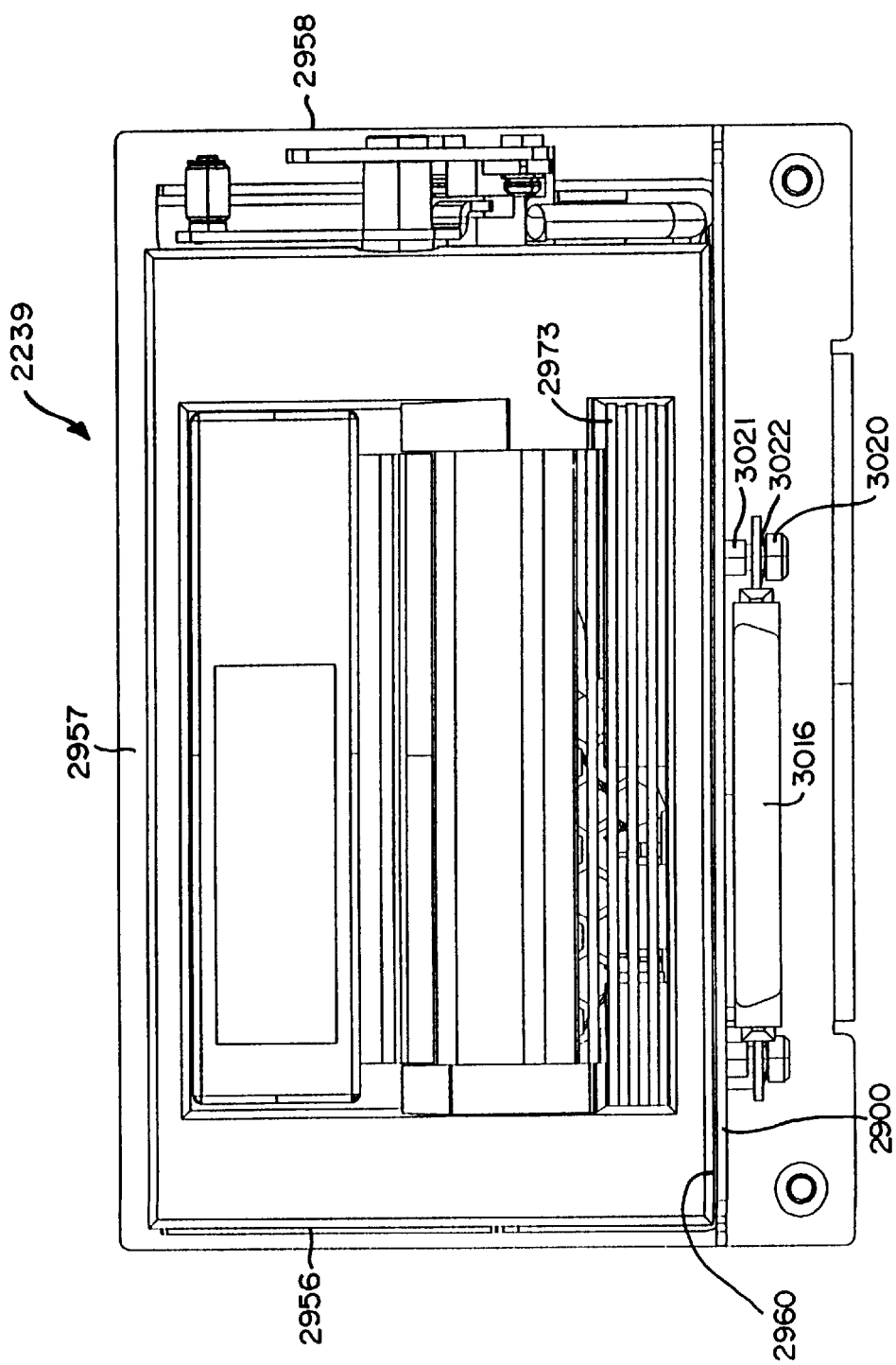
FIG. 32 is a front view of a drive carrier insertable into the cartridge libraries of the invention.
Figure 33:
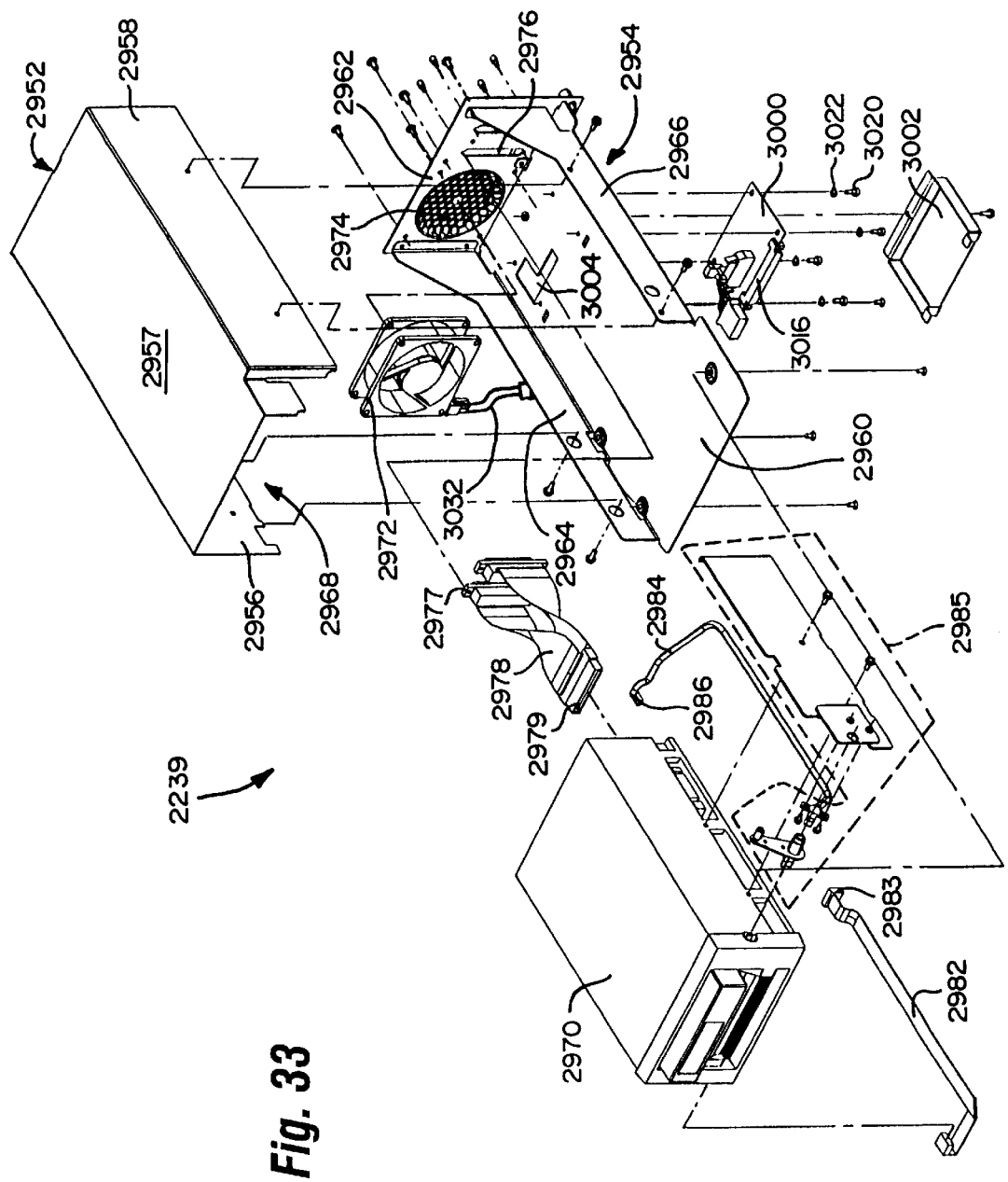
FIG. 33 is an exploded view of the drive carrier of FIG. 32.
Figure 34:
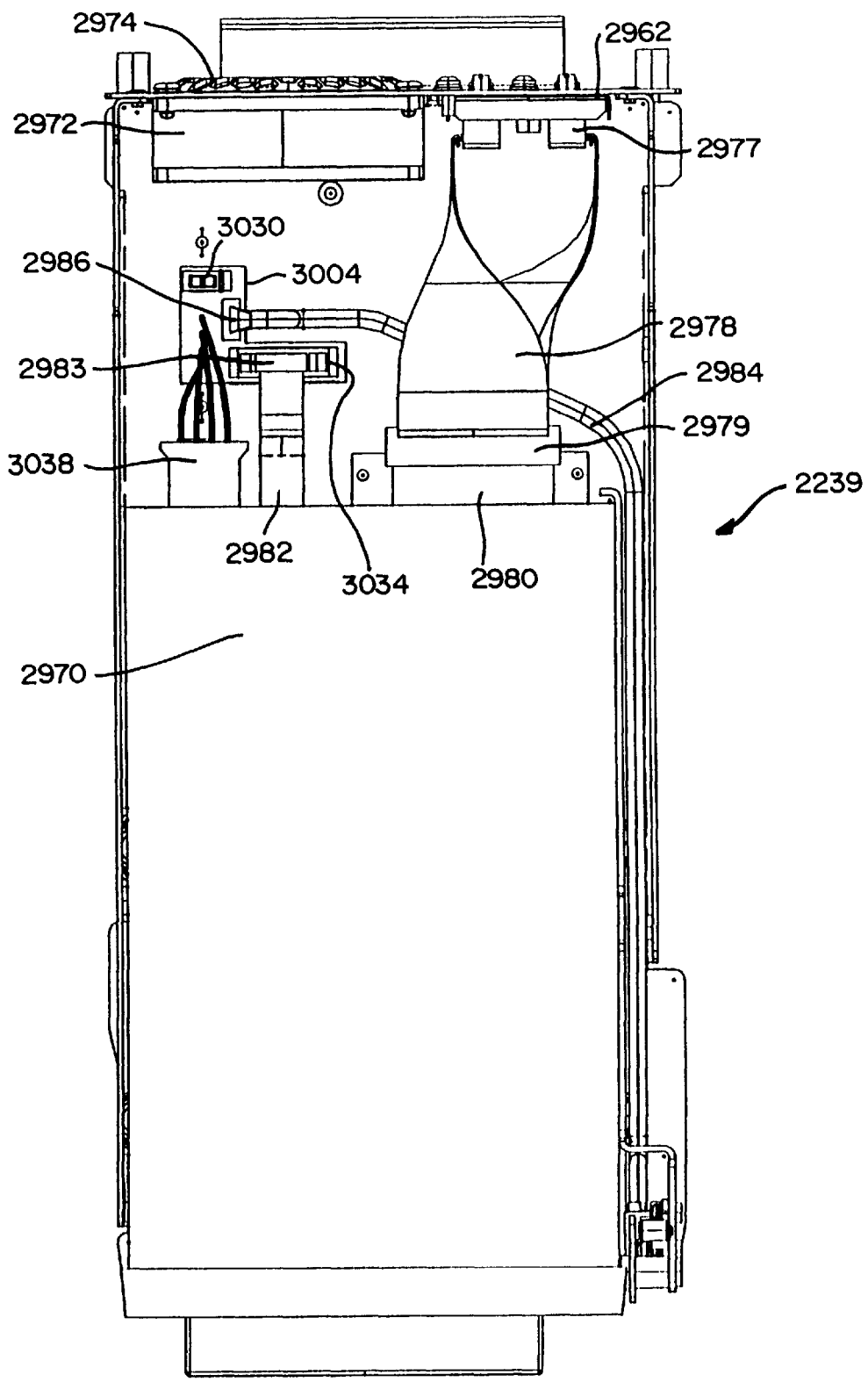
FIG. 34 is a top view of the drive carrier of FIG. 32.
Figure 35:
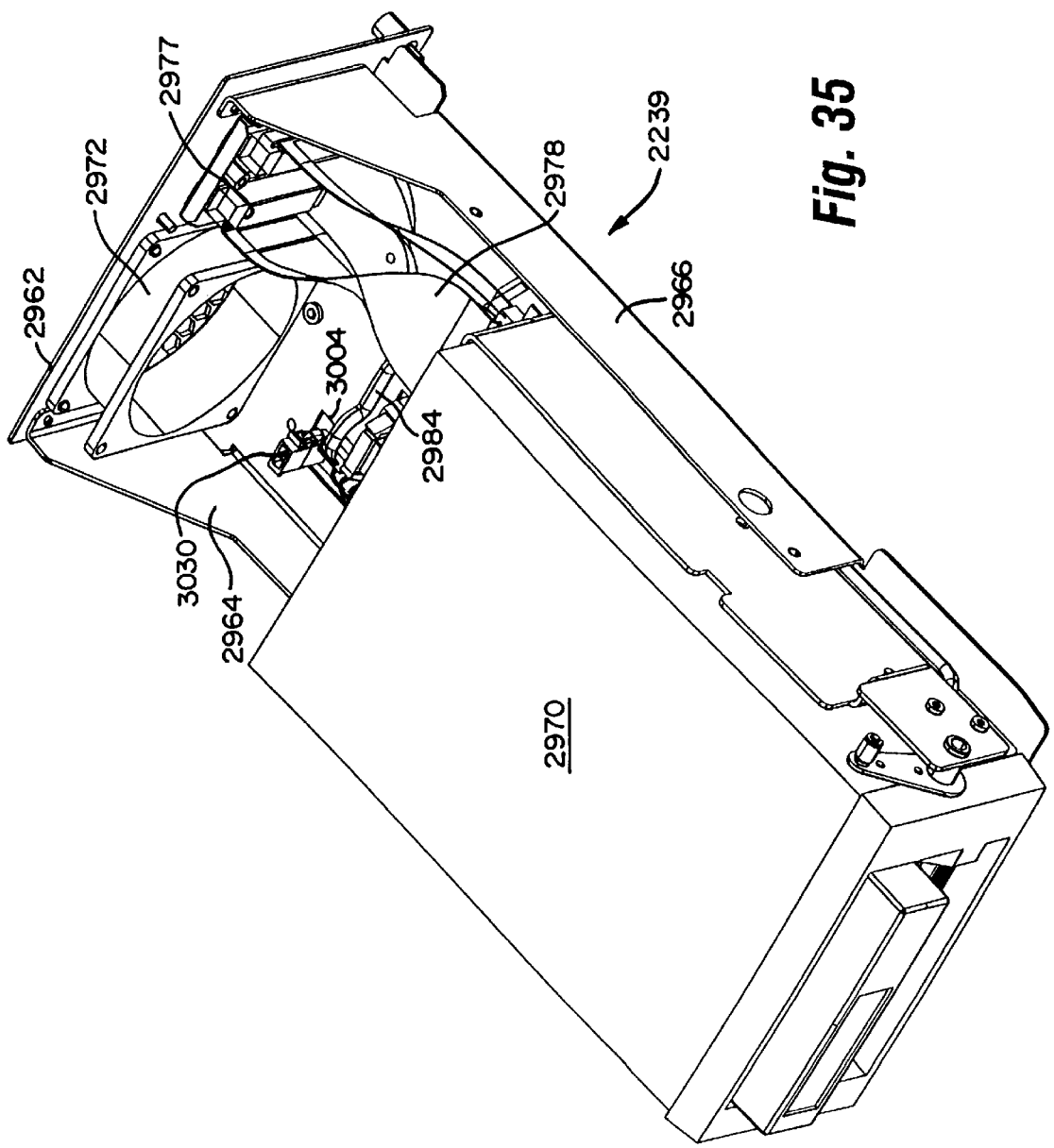
FIG. 35 is a right perspective view, taken from above, of the drive carrier of FIG. 32.
Figure 36:
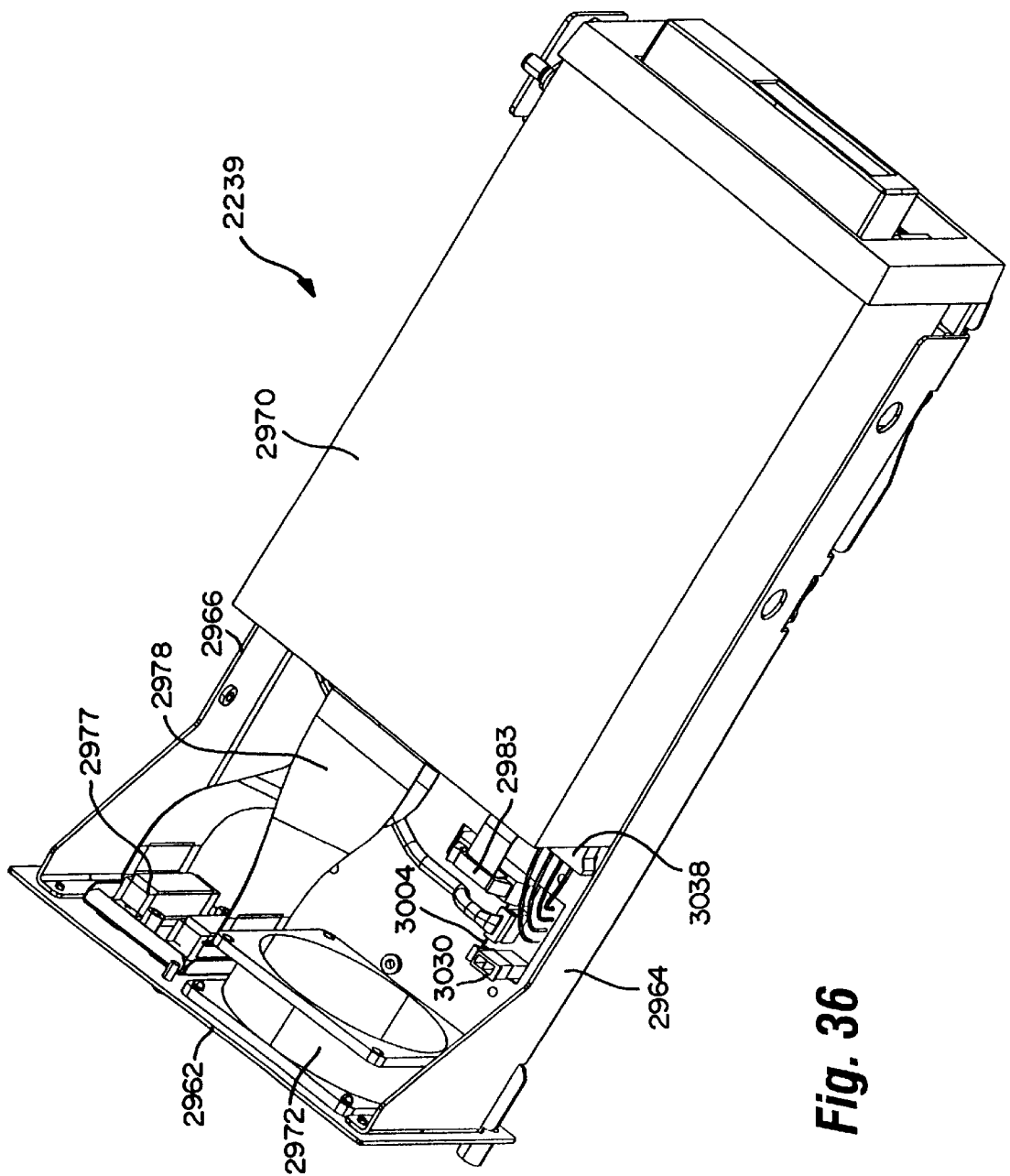
FIG. 36 is a left perspective view, taken from above, of the drive carrier of FIG. 32.
Figure 37:
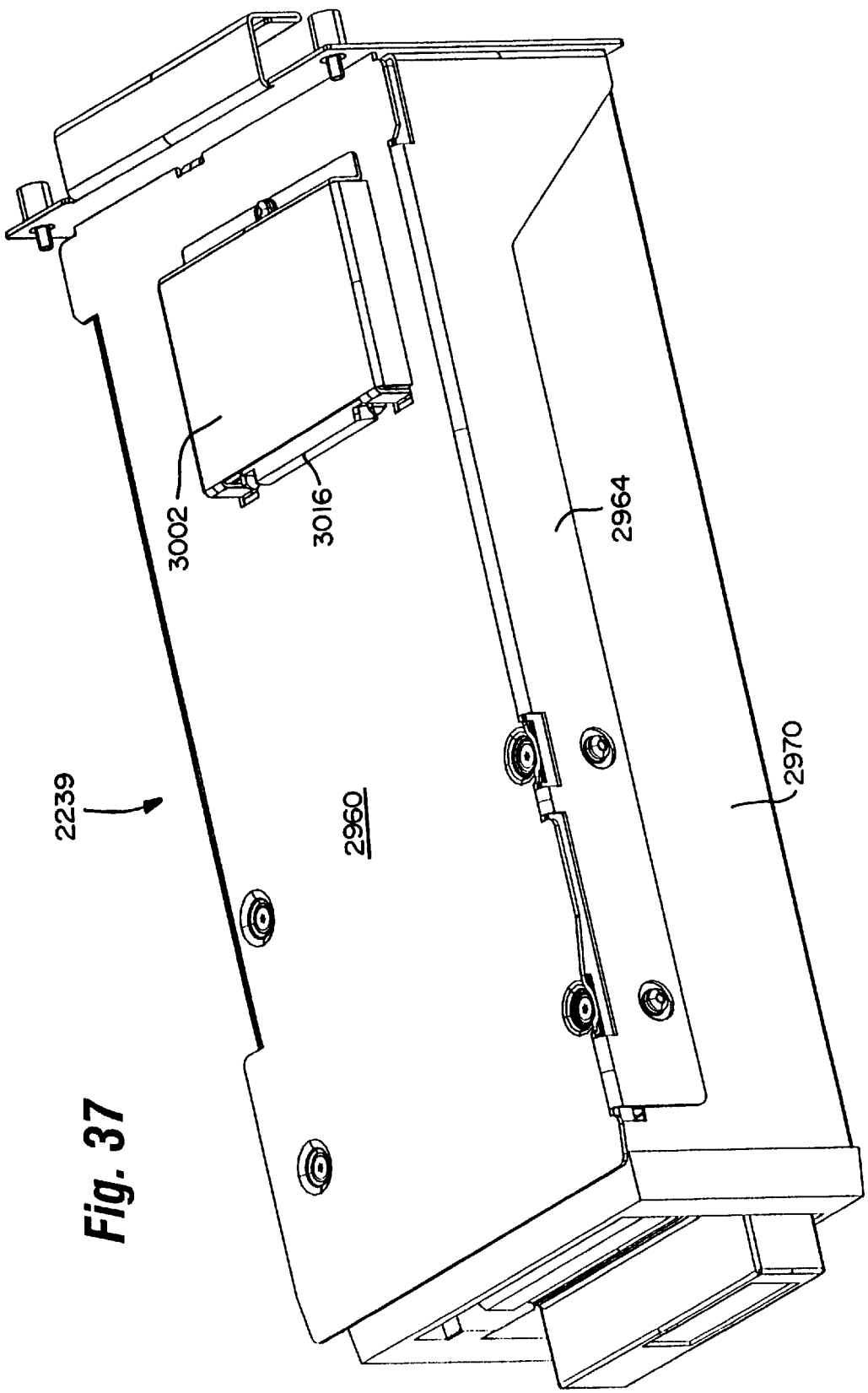
FIG. 37 is a perspective view of an inverted drive carrier of FIG. 32, including a circuit board shield.
Figure 38:
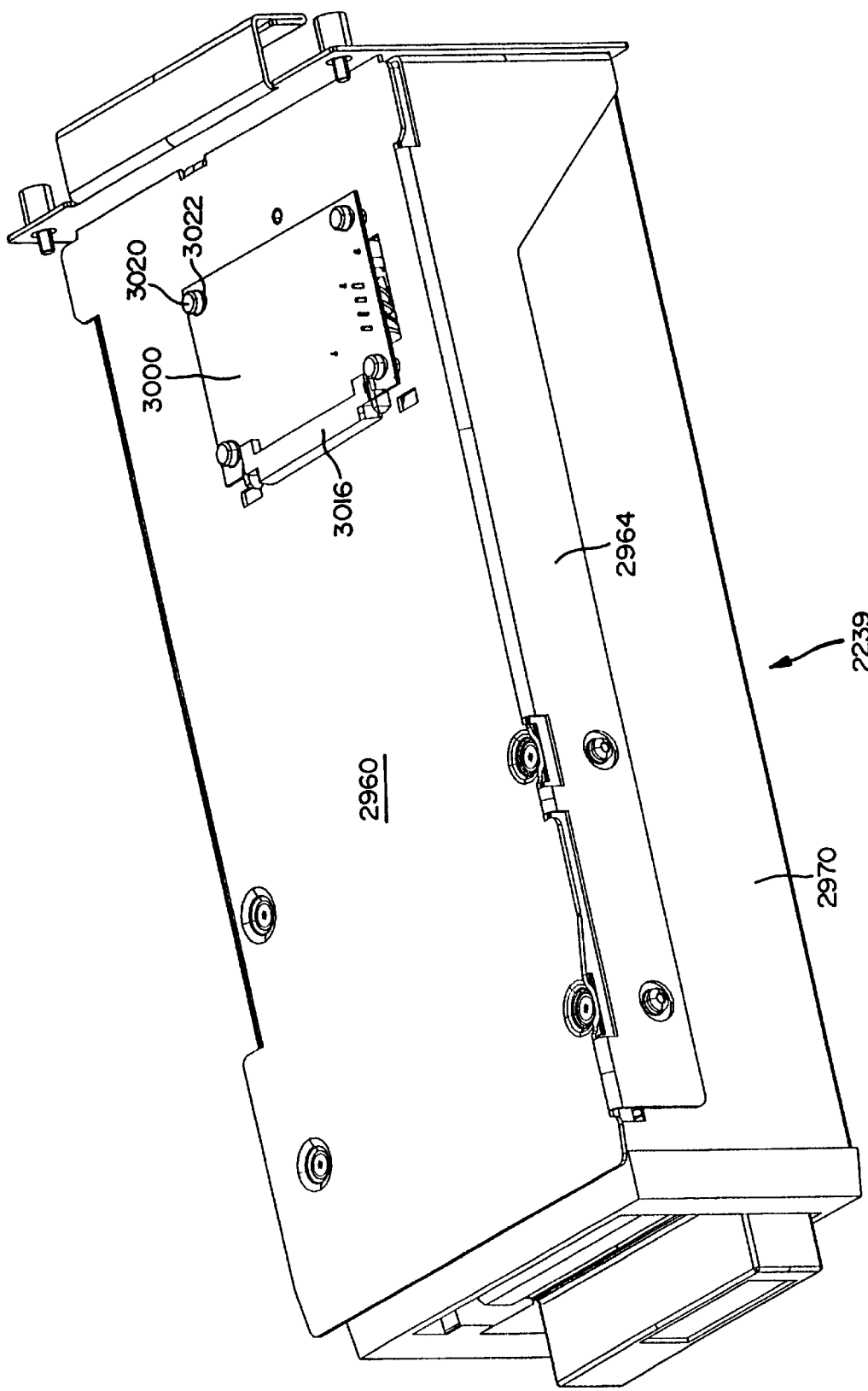
FIG. 38 is a perspective view of an inverted drive carrier of FIG. 32 with circuit board shield removed.

The drive carrier bays 2902 are shown from the rear of cartridge handling library 2230 in FIG. 31. As explained hereinafter, the two modular drive carrier units 2239 are inserted from the rear of cartridge handling library 2230 into the respective drive carrier bays 2902. It can be seen from FIG. 31 that a rear central section of shelf 2900 in each drive carrier bay 2902 has a rear central shelf aperture 2930 formed therein. Spacing brackets 2932 were formed at opposing rear interior edges of the shelf aperture 2930. The opposing spacing brackets 2932 support a printed circuit board 2934 which bridges the spacing brackets 2932 and which is secured thereto by fasteners. In each drive carrier bay 2902, the printed circuit board 2934 has a power source connector and data signal 2940 mounted thereon. The connector 2940 for each drive carrier bay 2902 is connected to the unillustrated main power supply for the entire cartridge handling library 2230 and controller board, and serves to supply electrical power to the devices in the two modular drive carrier units 2239 as subsequently described.

FIG. 32 through FIG. 39 show a representative one of the two modular drive carrier units 2239. The modular drive carrier unit 2239 comprises a drive carrier housing which is formed from drive carrier housing top section 2952 and drive carrier housing bottom section 2954. The drive carrier housing top section 2952 has a drive carrier housing top wall 2956, drive carrier housing left side wall 2957, and drive carrier housing right side wall 2958. The drive carrier housing bottom section 2954 has a drive carrier housing bottom wall 2960; a drive carrier housing rear wall 2962; a left side wall support bracket 2964; and a right side wall support bracket 2966.

The drive carrier housing top section 2952 and drive carrier housing bottom section 2954 thus fit together to define an enclosed cavity 2968 which accommodates a number of devices, including drive 2970 and ventilation fan 2972. The drive 2970 resides centrally in an open front end of the cavity and thus substantially occludes the front of the cavity. A front bezel of drive 2970 has drive bezel louvers 2973 formed thereon.

The fan 2972 is situated in a left rear corner of cavity 2968 and is secured by fasteners to drive carrier housing rear wall 2962. The drive carrier housing rear wall 2962 has an aperture formed therein through which a fan louver 2974 is inserted directly behind fan 2972. Ventilation of the cavity 2968 and particularly of drive 2970 of drive carrier unit 2239 occurs as drawn by fan 2972 passes through drive bezel louvers 2973, through ventilation ports provided on a top and/or rear panel of 2970, through fan 2972, and out fan louver 2974.

The rear wall 2962 also a pair of connector slots 2976 formed therein for receiving a corresponding pair of connectors 2977 of ribbon cables 2978. A connector 2979 on an opposite end of ribbon cables 2978 mates with connector 2980 at the rear of drive 2970. A serial control ribbon cable 2982 for drive 2970 extends from a left side of drive 2970 and passes under drive 2970 where it terminates with serial control ribbon connector 2983 (see also FIG. 34). A drive load status cable 2984 extends from a drive door opening assembly (encircled by broken line 2985) around the right side of drive 2970 and terminates in a drive load status signal cable connector 2986. The drive door opening assembly serves to open a door of drive 2970 upon insertion of a cartridge in drive 2970. Such elements are also illustrated, but unnumbered, in various other views of modular drive carrier unit 2239, including FIG. 32.

A circuit board assembly 3000 is floatingly connected to an underside of the drive carrier housing, particularly to an underside of drive carrier housing bottom wall 2960. The circuit board assembly 3000 is at least partially protected by a shield 3002 which is also secured to the underside of drive carrier housing bottom wall 2960. As explained in more detail subsequently, circuit board assembly 3000 has components or leads thereon which protrude through an aperture 3004 formed in drive carrier housing bottom wall 2960.

Figure 40:
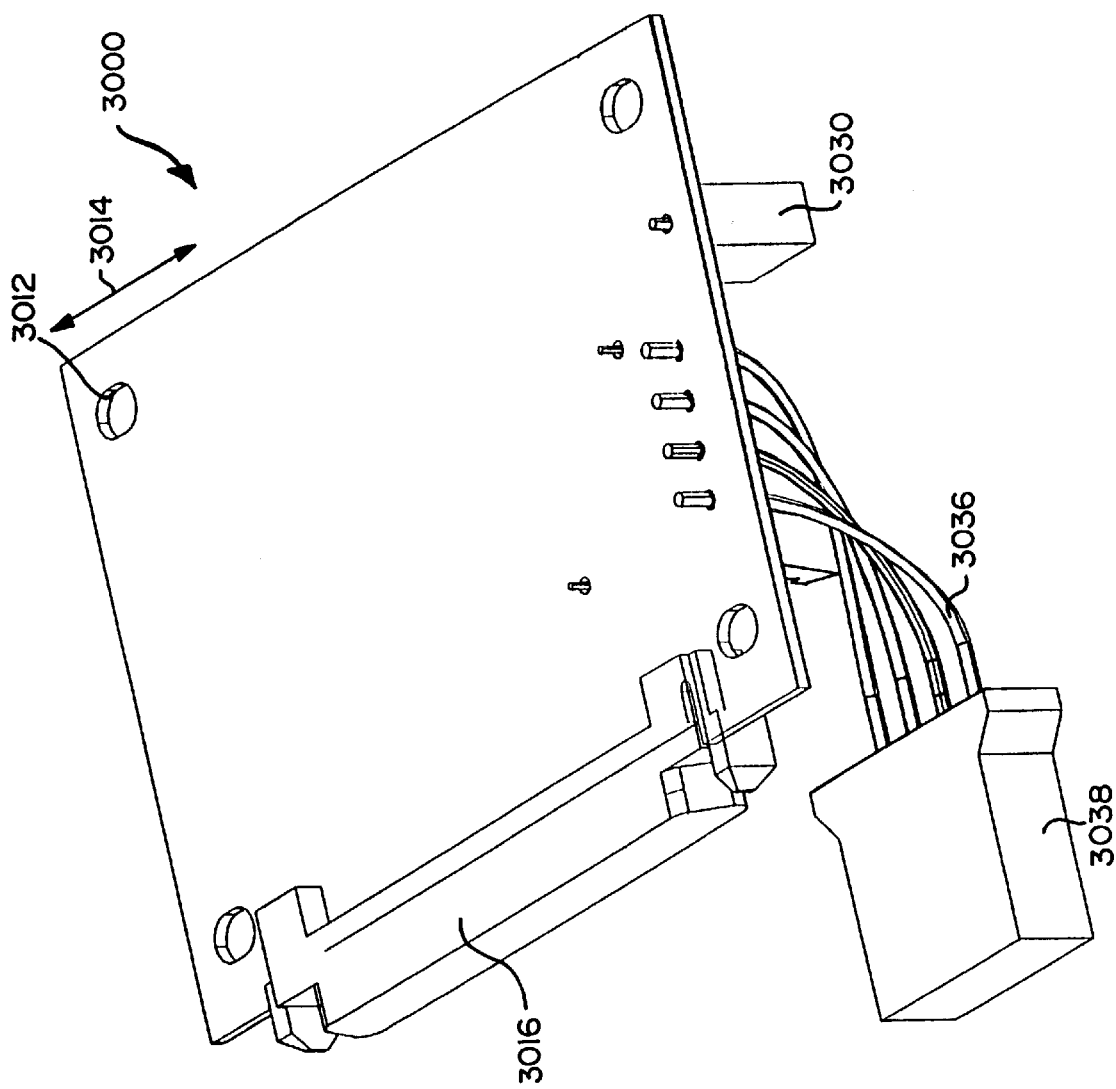
FIG. 40 is a top perspective view of a circuit board assembly employed by the drive carrier of FIG. 32.
Figure 42:
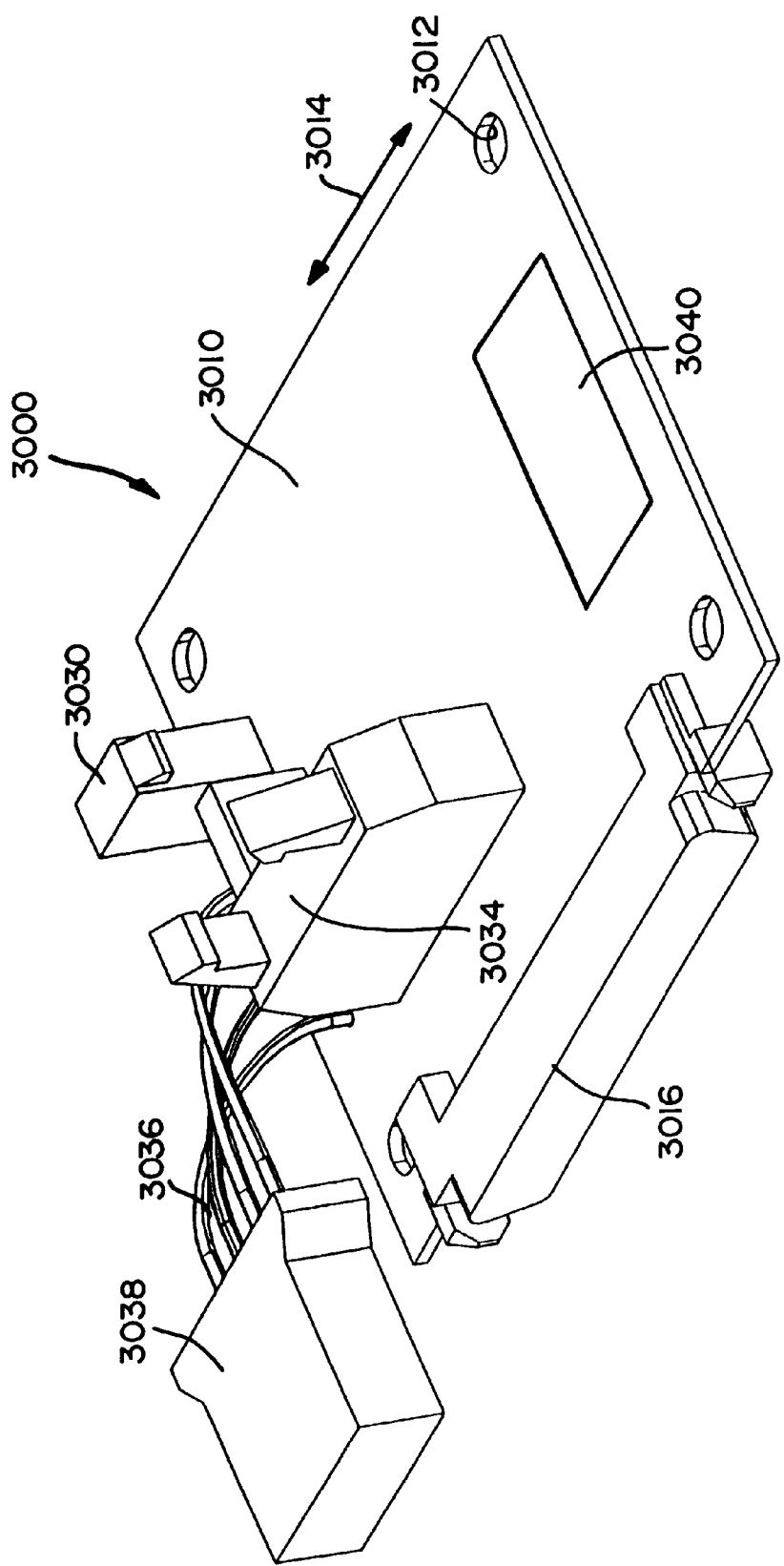
FIG. 42 is an enlarged perspective view of an inverted circuit board for use with the drive carrier of FIG. 32.

As seen in FIG. 42, circuit board assembly 3000 comprises a circuit board 3010 which has four mechanical connection holes 3012 formed therein, one hole 3012 in each corner. The mechanical connection holes 3012 are elongated or oblong along the axis 3014 shown in FIG. 40 and FIG. 42, thereby allowing a floating of circuit board assembly 3000 along the axis 3014. On its front edge, circuit board assembly 3000 has a straddle connector 3016 formed thereon.

Figure 39:
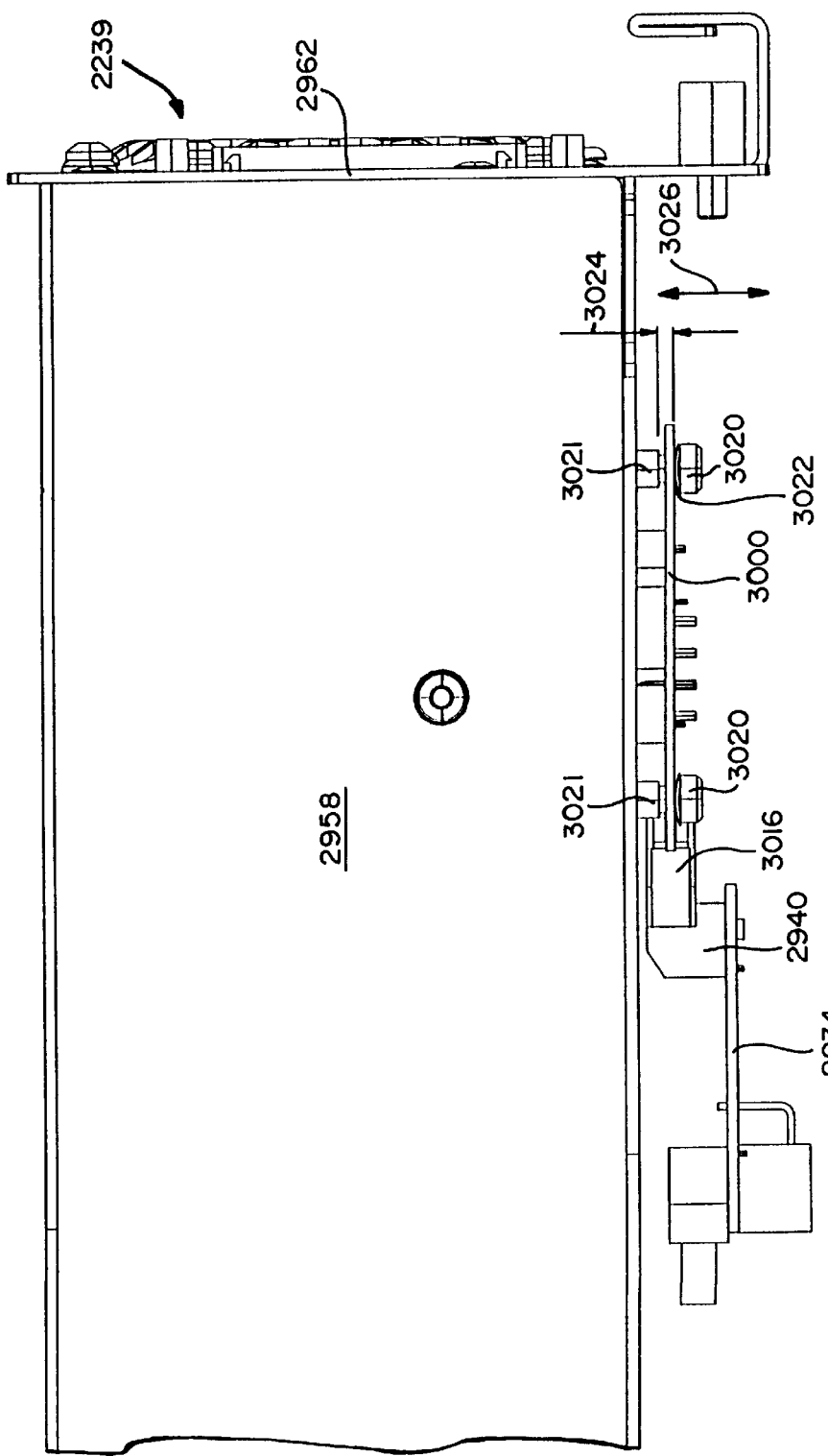
FIG. 39 is a right side view of the drive carrier of FIG. 32, showing a circuit board assembly with circuit board shield removed and a drive carrier shelf of the library.

FIG. 39 shows a circuit board mounting assembly for mounting circuit board assembly 3000 to the underside of drive carrier housing bottom wall 2960. Four threaded fasteners 3020 extend through respective ones of the four mechanical connection holes 3012 and are retained in anchors 3021 provided on the underside of drive carrier housing bottom wall 2960. The circuit board assembly 3000 is essentially suspended between the drive carrier housing bottom wall 2960 and enlarged heads of the fasteners 3020. Interposed between the enlarged heads of each of fasteners 3020 and circuit board assembly 3000 are respective wave washers 3022. The suspension of circuit board assembly 3000 provides a potential clearance 3024 between circuit board assembly 3000 and anchors 3021. The wave washers 3022 keep circuit board assembly 3000 in a nominal (fully suspended) position, but allow the circuit board assembly 3000 to "float", or move vertically upward in the direction 3026, in the clearance 3024, when the modular drive carrier unit 2239 is being inserted into its drive carrier bay 2902.

On its top surface, circuit board assembly 3000 carries fan power connector 3030 which mates with a connector on a fan power ribbon cable 3032 connected to fan 2972; a drive serial connector 3034 which mates with serial control ribbon connector 2983 (see FIG. 34); leads 3036 which connect to a drive power connector 3038; and drive load status signal connector 3040. The drive power connector 3038 mates with serial control ribbon connector 2983 (see, e.g., FIG. 34). The drive load status signal connector 3040 mates with drive load status signal cable connector 2986. Thus, circuit board assembly 3000 is employed to transmit electrical power to both drive 2970 and fan 2972; to provide serial control connections (via drive serial connector 3034) to drive 2970; and to transmit signals pertaining to drive door opening assembly (encircled by broken line 2985) [via drive load status signal connector 3040].

Figure 41:
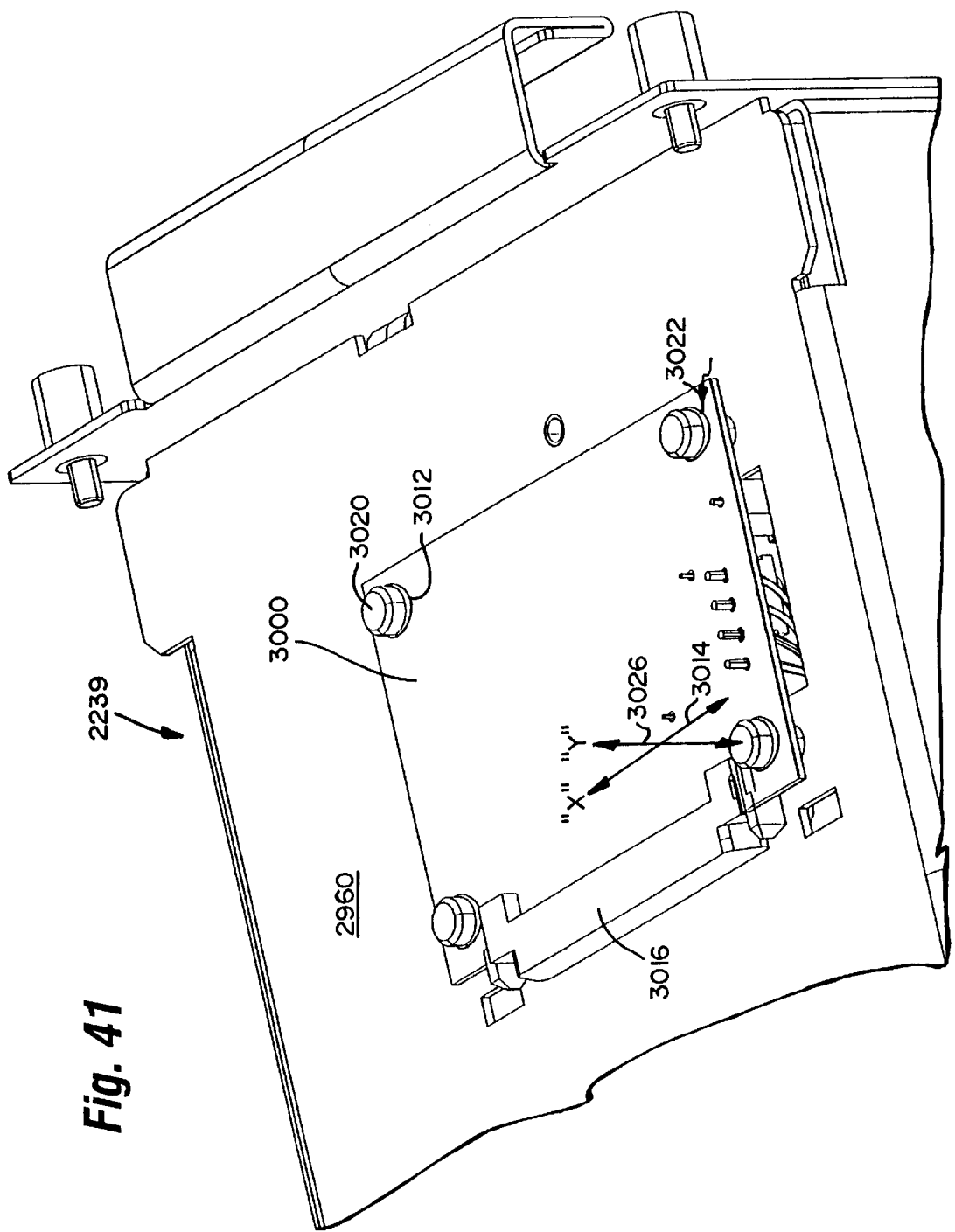
FIG. 41 is an enlarged view of the inverted drive carrier of FIG. 32 with circuit board shield removed.

Returning to FIG. 31, each modular drive carrier unit 2239 is inserted from the rear of cartridge handling library 2230 into its respective drive carrier bay 2902. In the insertion process, the drive carrier housing bottom wall 2960 slides on shelf 2900 as the modular drive carrier unit 2239 is pushed forwardly into its drive carrier bay 2902. The shelf 2900 does not interfere with the circuit board assembly 3000 suspended beneath modular drive carrier unit 2239, in view of the shelf aperture 2930 formed in shelf 2900. As the modular drive carrier unit 2239 moves forwardly into its drive carrier bay 2902, circuit board assembly 3000 is free to float vertically (in the direction 3026) and horizontally (in the direction 3014) as described above (but preferably not in the Z axis of FIG. 41). The floating suspension of circuit board assembly 3000 facilitates mating of straddle connector 3016 with connector 2940, as illustrated in FIG. 39. Near its farthest extent of travel, modular drive carrier unit 2239 catches the retainer elements 2920 formed at the front of its drive carrier bay 2902 (see FIG. 31).

FIG. 42 illustrates another embodiment of a drive carrier according to the invention, particularly drive carrier 2239'. The drive carrier 2239' basically resembles the drive carrier previously described, but accommodates a different type drive, e.g., drive 2970'. The drive 2970' is a drive which does not have ventilation louvers on a front bezel thereof, and in one embodiment is an Exabyte Mammoth™ 8 millimeter tape drive.

Figure 43:
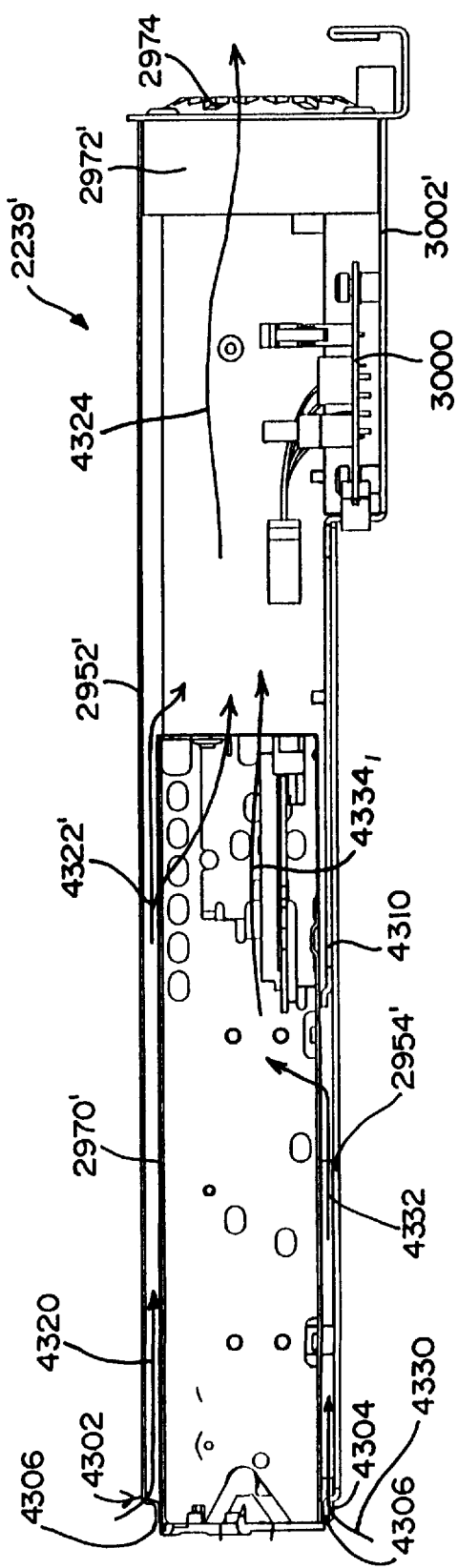
FIG. 43 is a sectioned side view of a drive carrier of another embodiment of the invention.

In order to accommodate drive 2970', a drive carrier housing top section 2952' and drive carrier housing bottom section 2954' have respective lips 4302 and 4304 formed on front edges thereof One or more of the lips 4302 and 4304 have ventilation holes 4306 formed across the front edges thereof, e.g., along a direction perpendicular to the plane of the paper of FIG. 43. In addition, drive carrier housing bottom section 2954' has a drive support baffle 4310, formed on an intermediate section thereof, which extends substantially across a width of the drive carrier 2239'.

The drive carrier 2239' has a ventilation fan 2972' and circuit board 3000 in much the same manner as the previously described embodiment. For drive carrier 2239', however, the aperture corresponding to aperture 3004 of the previous embodiment occupies a substantial portion of the rear of drive carrier housing bottom section 2954'. Consequently, the shield 3002' of the drive carrier 2239' is larger than for the previous embodiment. However, it should be understood that the circuit board assembly 3000 still resides in a location comparable to that of the first embodiment, and is floatingly mounted, etc.

FIG. 43 shows how drive carrier 2239' is ventilated. Air entering the vent holes 4306 at upper lip 4302 (as shown by arrow 4320) can pass over the top of drive 2970 or pass through drive vent holes formed in the top and back panels of drive 2970', as shown by split arrow 4322 in FIG. 43. From the interior of drive carrier 2239' the air is impelled through fan 2972' and out louvers 2974. Air entering the vent holes 4306 at lower lip 4304 (as shown by arrow 4330) is forced by baffle 4310 to pass through vent holes formed on a bottom panel of 2970, as indicated by arrow 4332. Such air exits drive 2970 through rear vent holes of the drive (see arrow 4334). From the interior of drive carrier 2239' the air is impelled through fan 2972' and out louvers 2974. Thus, drive carrier 2239' provides effective ventilation of drive 2970 as well as of the cavity defined by the enclosed housing of drive carrier 2239'.

It should be understood that principles of the library 30 of the first embodiment, although not expressly discussed in connection with the cartridge handling library 2230 of the second embodiment, are nevertheless applicable thereto. Such principles include, but are not limited to, the detection and calibration operations thereof. Moreover, unless otherwise indicated or manifest from the drawings, structure described with reference to the first embodiment is similar to that of the second embodiment. Such commonality of structure include the magazines 70 and magazine mounting assemblies 60, for example.

As used herein, magazine mounting assembly 60 and cartridge storage positions (e.g., positions $602_1$ and $602_2$) are examples of cartridge-receiving units. It should be understood that the drives can also be considered as cartridge-receiving units.

It should be understood that the libraries described herein can be scaled for cartridges of different sizes. Moreover, although the present discussion uses a ½ inch magnetic tape cartridge as an example, the invention is not limited to any particular type or size of medium. The term data storage unit or "unit" is used interchangeably herein for "cartridge", which is also known in the industry as "cassette".

As used herein, the term "library" is intended to include systems of varying degrees of intelligence and automation, including cartridge stackers and autoloaders. Moreover, it should also be understood that the term "cartridge" as employed herein is a synonym for cassette and other commonly employed terms describing a housing wherein transducable media is contained.

The number magazines and the number of cells therein as shown in the libraries described above is merely illustrative. Greater or lesser numbers of magazines and cells can be provided.

Further, the controllers of the libraries of the present invention can perform further operations, including (for example) communications with the drives for facilitating e.g., processing of cartridges and/or insertion/ejection of cartridges.

It should be realized that other ways of sweeping indicia of the present invention are also within the scope of the present invention. For example, rather than moving cartridge gripper assembly, a drum can be rotated.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A magazine mounting assembly for selectively engaging a magazine, the magazine having plural cells for accommodating a plurality of cartridges of information storage media, the magazine mounting assembly comprising a magazine mounting surface, the magazine mounting surface having a reflection region which is of contrasting reflectivity with another region of the magazine mounting assembly, the reflection region extending sufficiently along a plane of the magazine mounting surface whereby at least a portion of the reflection region is exposed through every cell not having a cartridge contained therein.

2. The apparatus of claim 1, wherein the reflection region is a reflection plate which is secured to the magazine mounting assembly.

3. The apparatus of claim 2, wherein the reflection plate fits over an internal cavity of the magazine mounting assembly.

4. The apparatus of claim 3, wherein the reflection plate is formed to have a snap fit into the internal cavity of the magazine mounting assembly.

5. The apparatus of claim 1, wherein the magazine mounting assembly further comprises two side walls extending from a rear of the magazine mounting surface, planes of the two side walls being angularly inclined toward one another whereby a rear section of the magazine mounting assembly forms a wedge.

6. The apparatus of claim 5, wherein rear edges of the two side walls intersect with a backwall, the backwall forming a semicylindrical concavity.

7. The apparatus of claim 6, wherein the backwall has at least one dowel extending therefrom.

8. The apparatus of claim 1, wherein the magazine mounting assembly further comprises a magazine guide flange extending from the magazine mounting surface, the magazine guide flange having a location for bearing signage formed thereon for each cell of the magazine, each location for bearing signage being aligned with a corresponding cell.

9. The apparatus of claim 8, wherein the magazine guide flange is angularly inclined with respect to the magazine mounting surface.

10. The apparatus of claim 9, wherein a cartridge label is secured to the location for bearing signage.

11. The apparatus of claim 1, wherein the reflection region is formed from or coated with an optically reflective material.

12. The apparatus of claim 1, wherein the magazine mounting assembly further comprises a magazine guide flange extending forwardly from the magazine mounting surface, the magazine guide flange having magazine guide ribs formed both on a front surface of the magazine guide flange and a rear surface of the magazine guide flange.

13. The apparatus of claim 1, wherein the magazine mounting assembly further comprises a magazine guide flange extending forwardly from the magazine mounting surface, the magazine guide flange having magazine guide ribs formed both on a front surface of the magazine guide flange and a rear surface of the magazine guide flange.

14. An automated cartridge library comprising:

a library frame;

a magazine mounting assembly for mounting at least one magazine to the frame, the magazine having plural cells for accommodating a plurality of cartridges of information storage media;

a drive for transducing information relative to the information storage media of the cartridge;

a cartridge transport system for transporting cartridges between the magazine and the drive;

wherein the magazine mounting assembly comprises a magazine mounting surface, the magazine mounting surface having a reflection region which is of contrasting reflectivity with another region of the magazine mounting assembly, the reflection region extending sufficiently along a plane of the magazine mounting surface whereby at least a portion of the reflection region is exposed through every cell not having a cartridge contained therein.

15. The apparatus of claim 14, wherein the reflection region is a reflection plate which is secured to the magazine mounting assembly.

16. The apparatus of claim 15, wherein the reflection plate fits over an internal cavity of the magazine mounting assembly.

17. The apparatus of claim 16, wherein the reflection plate is formed to have a snap fit into the internal cavity of the magazine mounting assembly.

18. The apparatus of claim 14, wherein the magazine mounting assembly further comprises two side walls extending from a rear of the magazine mounting surface, planes of the two side walls being angularly inclined toward one another whereby a rear section of the magazine mounting assembly forms a wedge.

19. The apparatus of claim 18, wherein rear edges of the two side walls intersect with a backwall, the backwall forming a semicylindrical concavity.

20. The apparatus of claim 19, wherein the backwall has at least one dowel extending therefrom.

21. The apparatus of claim 14, wherein the magazine mounting assembly further comprises a magazine guide flange extending from the magazine mounting surface, the magazine guide flange having a location for bearing signage formed thereon for each cell of the magazine, each location for bearing signage being aligned with a corresponding cell.

22. The apparatus of claim 21, wherein the magazine guide flange is angularly inclined with respect to the magazine mounting surface.

23. The apparatus of claim 22, wherein a cartridge label is secured to the location for bearing signage.

24. The apparatus of claim 14, wherein the reflection region is formed from or coated with an optically reflective material.

25. The apparatus of claim 14, wherein the magazine mounting assembly further comprises a magazine guide flange extending forwardly from the magazine mounting surface, the magazine guide flange having magazine guide ribs formed both on a front surface of the magazine guide flange and a rear surface of the magazine guide flange.

* * * * *